US011924060B2

(12) United States Patent
Smith et al.

(10) Patent No.: US 11,924,060 B2
(45) Date of Patent: Mar. 5, 2024

(54) MULTI-ACCESS EDGE COMPUTING (MEC) SERVICE CONTRACT FORMATION AND WORKLOAD EXECUTION

(71) Applicant: Intel Corporation, Santa Clara, CA (US)

(72) Inventors: Ned M. Smith, Beaverton, OR (US); Sanjay Bakshi, Beaverton, OR (US); Farid Adrangi, Lake Oswego, OR (US); Francesc Guim Bernat, Barcelona (ES)

(73) Assignee: Intel Corporation, Santa Clara, CA (US)

( * ) Notice: Subject to any disclaimer, the term of this patent is extended or adjusted under 35 U.S.C. 154(b) by 908 days.

(21) Appl. No.: 16/570,153

(22) Filed: Sep. 13, 2019

(65) Prior Publication Data
US 2020/0007414 A1 Jan. 2, 2020

(51) Int. Cl.
*H04L 41/5006* (2022.01)
*G06Q 30/08* (2012.01)
(Continued)

(52) U.S. Cl.
CPC ......... *H04L 41/5006* (2013.01); *G06Q 30/08* (2013.01); *H04L 41/5009* (2013.01);
(Continued)

(58) Field of Classification Search
CPC . H04L 41/5006; H04L 41/5009; H04L 67/10; H04L 67/121; H04L 67/566;
(Continued)

(56) References Cited

U.S. PATENT DOCUMENTS 9,805,345 B1 * 10/2017 Dailianas ............ G06F 9/45533
11,063,745 B1 * 7/2021 Du ........................ H04L 9/0825
(Continued)

FOREIGN PATENT DOCUMENTS

KR         2209941 B1 *  2/2021
WO   WO-2011008219 A1 *  1/2011 ........... G06F 9/5044
(Continued)

OTHER PUBLICATIONS

Hegyi et al, Application orchestration in mobile edge cloud—Placing of IoT applications to the edge, IEEE 1st International Workshops on Foundations and Applications of Self* Systems, 2016, IEEE, p. 230-235 (Year: 2016).*
(Continued)

*Primary Examiner* — Emmanuel L Moise
*Assistant Examiner* — Robert A Shaw
(74) *Attorney, Agent, or Firm* — Schwabe, Williamson & Wyatt, P.C.

(57) ABSTRACT

Embodiments herein may include systems, apparatuses, methods, and computer-readable media, for a multi-access edge computing (MEC) system. A MEC orchestrator is to receive a request for service that includes a workload from a user agent; and facilitate formation of a SLA for servicing the workload. To facilitate the formation of the SLA includes to obtain, via a decentralized contracting system, bids from a plurality of service providers to respectively service a plurality of functions or tasks of the workload. The MEC orchestrator is also to translate the workload into the plurality of functions or tasks, and schedule servicing of the functions of tasks with the one or more service providers, including one or more edge computing devices, in accordance with the SLA. Other embodiments may be described and/or claimed.

19 Claims, 18 Drawing Sheets

(51) Int. Cl.
*H04L 41/5009* (2022.01)
*H04L 67/10* (2022.01)
*H04L 67/566* (2022.01)
*H04L 67/61* (2022.01)

(52) U.S. Cl.
CPC ............ *H04L 67/10* (2013.01); *H04L 67/566* (2022.05); *H04L 67/61* (2022.05); *G06F 2209/5015* (2013.01); *G06F 2209/5017* (2013.01)

(58) Field of Classification Search
CPC . H04L 67/06; G06Q 30/08; G06F 2209/5015; G06F 2209/5017; G06F 9/5072
See application file for complete search history.

(56) References Cited

U.S. PATENT DOCUMENTS

| | | | |
|---|---|---|---|
| 2007/0240161 A1* | 10/2007 | Prabhakar | G06F 9/505 718/104 |
| 2008/0046266 A1* | 2/2008 | Gudipalley | G06Q 10/00 705/305 |
| 2009/0089078 A1* | 4/2009 | Bursey | G06Q 30/0281 382/293 |
| 2009/0281818 A1* | 11/2009 | Li | G06Q 10/04 705/301 |
| 2011/0016214 A1* | 1/2011 | Jackson | G06F 9/505 718/101 |
| 2011/0145153 A1* | 6/2011 | Dawson | G06Q 10/10 707/610 |
| 2011/0153824 A1* | 6/2011 | Chikando | G06F 9/5088 718/100 |
| 2012/0173708 A1* | 7/2012 | Bartfai-Walcott | G06F 9/5072 709/224 |
| 2013/0060933 A1* | 3/2013 | Tung | H04L 41/5003 709/224 |
| 2015/0040133 A1* | 2/2015 | Caufield | G06F 9/505 718/103 |
| 2015/0063166 A1* | 3/2015 | Sif | G06F 9/541 455/418 |
| 2015/0277987 A1* | 10/2015 | Di Balsamo | G06F 9/5083 718/104 |
| 2016/0094639 A1* | 3/2016 | Bhattacharyya | H04L 67/1008 709/219 |
| 2017/0034643 A1* | 2/2017 | Young | H04W 4/60 |
| 2017/0250892 A1* | 8/2017 | Cooper | H04L 41/5009 |
| 2018/0077080 A1* | 3/2018 | Gazier | H04L 41/0897 |
| 2018/0096412 A1* | 4/2018 | Scott-Nash | G06Q 30/0635 |
| 2018/0270073 A1* | 9/2018 | Senarath | H04L 41/0894 |
| 2018/0302299 A1* | 10/2018 | Sun | H04L 67/10 |
| 2018/0332485 A1* | 11/2018 | Senarath | H04L 41/044 |
| 2018/0351824 A1* | 12/2018 | Giust | G06Q 30/0635 |
| 2018/0351876 A1* | 12/2018 | Ren | H04L 47/83 |
| 2018/0368053 A1* | 12/2018 | Wei | H04W 48/14 |
| 2019/0052579 A1* | 2/2019 | Senarath | H04L 47/82 |
| 2019/0089780 A1* | 3/2019 | Yousaf | G06F 9/45533 |
| 2019/0116128 A1 | 4/2019 | Guo et al. | |
| 2019/0132197 A1* | 5/2019 | Saxena | H04L 41/5003 709/224 |
| 2019/0140919 A1 | 5/2019 | Smith et al. | |
| 2019/0141119 A1 | 5/2019 | Bernat et al. | |
| 2019/0173802 A1* | 6/2019 | Xia | H04L 41/5045 |
| 2019/0230002 A1 | 7/2019 | Bernat et al. | |
| 2019/0317812 A1* | 10/2019 | Gebara | H04L 41/5045 |
| 2019/0342379 A1* | 11/2019 | Shukla | H04L 67/2823 |
| 2019/0379530 A1* | 12/2019 | Suthar | H04L 12/14 |
| 2020/0177671 A1* | 6/2020 | Tofighbakhsh | H04L 67/12 |
| 2020/0220791 A1* | 7/2020 | Aiello | G06F 9/45533 |
| 2020/0371893 A1* | 11/2020 | Bhorkar | H04L 47/83 |
| 2020/0374974 A1* | 11/2020 | Sun | H04L 41/20 |
| 2020/0379805 A1* | 12/2020 | Porter | H04L 41/044 |
| 2022/0166667 A1* | 5/2022 | Celozzi | H04L 41/40 |

FOREIGN PATENT DOCUMENTS

| | | | | |
|---|---|---|---|---|
| WO | WO-2017088905 A1 * | 6/2017 | ......... | G06F 9/45558 |
| WO | WO-2018009159 A1 * | 1/2018 | ............ | H04L 29/08 |
| WO | WO-2018089417 A1 * | 5/2018 | | |
| WO | WO-2018134911 A1 * | 7/2018 | ............... | G06F 9/46 |
| WO | WO-2018144060 A1 * | 8/2018 | .......... | G06F 9/5061 |
| WO | WO-2018215046 A1 * | 11/2018 | ......... | H04L 67/1021 |

OTHER PUBLICATIONS

Giust et al, Multi-Access Edge Computing: An Overview of ETSI MEC ISG, IEEE 5G Tech Focus: vol. 1, No. 4, Dec. 2017 https://futurenetworks.ieee.org/tech-focus/december-2017/multi-access-edge-computing-overview-of-etsi (Year: 2017).*

Kekki et al, ETSI White Paper No. 28 MEC in 5G networks First edition—Jun. 2018 (Year: 2018).*

Kapassa, Evgenia, et al. "5G & SLAs: Automated proposition and management of agreements towards QoS enforcement." 2018 21st Conference on Innovation in Clouds, Internet and Networks and Workshops (ICIN). IEEE, 2018. (Year: 2018).*

Freitas et al, "An integrated approach for specifying and enforcing SLAs for cloud services." 2012 IEEE Fifth International Conference on Cloud Computing. IEEE, 2012. (Year: 2012).*

"Mobile Edge Computing (MEC) Technology", Mar. 2016, 7 pages, ETSI GS MEC 001 v1.1.1.

"Mobile Edge Computing (MEC); Technical Requirements", Mar. 2016, 40 pages, ETSI GS MEC 002 v1.1.1.

"Mobile Edge Computing (MEC); Framework and Reference Architecture", Mar. 2016, 18 pages, ETSI GS MEC 003 v1.1.1.

"Mobile-Edge Computing (MEC); Service Scenarios", Nov. 2015, 16 pages, ETSI GS MEC-IEG 004 v1.1.1.

"Mobile-Edge Computing (MEC); Proof of Concept Framework", Aug. 2015, 14 pages, ETSI GS MEC-IEG 005 v1.1.1.

"Mobile Edge Computing (MEC); Mobile Edge Platform Application Enablement", Jul. 2017, 55 pages, ETSI GS MEC 011 v1.1.1.

Extended European Search Report dated Dec. 4, 2020 for European Patent Application No. 20181254.2; 13 pages.

European Office Action dated Jan. 17, 2023 for European Patent Application No. 20181254.2, 9 pages.

* cited by examiner

MULTI-ACCESS EDGE COMPUTING (MEC) SERVICE CONTRACT FORMATION AND WORKLOAD EXECUTION

RELATED DOCUMENTS

The present application is related to multi-access edge computing (MEC), formerly known as Mobile Edge Computing. European Telecommunications Standards Institute (ETSI) is currently producing standards for MEC, e.g., "Mobile Edge Computing (MEC) Terminology," ETSI GS MEC 001, March, 2016; "Mobile Edge Computing (MEC); Technical Requirements," ETSI GS MEC 002, March, 2016; "Mobile Edge Computing (MEC); Framework and Reference Architecture," ETSI GS MEC 003, April 2016; "Mobile-Edge Computing (MEC); Service Scenarios," ETSI GS MEC-IEG 004, November, 2015; "Mobile-Edge Computing (MEC); Proof of Concept Framework," ETSI GS MEC-IEG 005, August, 2015; "Mobile Edge Computing (MEC); Mobile Edge Platform Application Enablement," ETSI GS MEC 011, July 2017; the contents of which are hereby incorporated by reference in their entireties.

FIELD

Various embodiments generally may relate to the field of computing, and in particular, may relate to multi-access edge computing (MEC) systems, methods and storage media.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Multi-access edge computing (MEC), also referred to as mobile edge computing, may offer application developers and content providers cloud-computing capabilities and an information technology service environment at the edge of a network. MEC technology may have some advantages when compared to traditional centralized could computing environments. For example, MEC technology may provide a service by service providers to user agent or a user equipment (UE) with a lower latency, a lower cost, a higher bandwidth, a closer proximity, and/or an exposure to real-time radio network and context information. However, the current MEC technology may have some problems with determining fair and efficient execution of workloads by service providers for a UE or a user agent.

BRIEF DESCRIPTION OF THE FIGURES

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
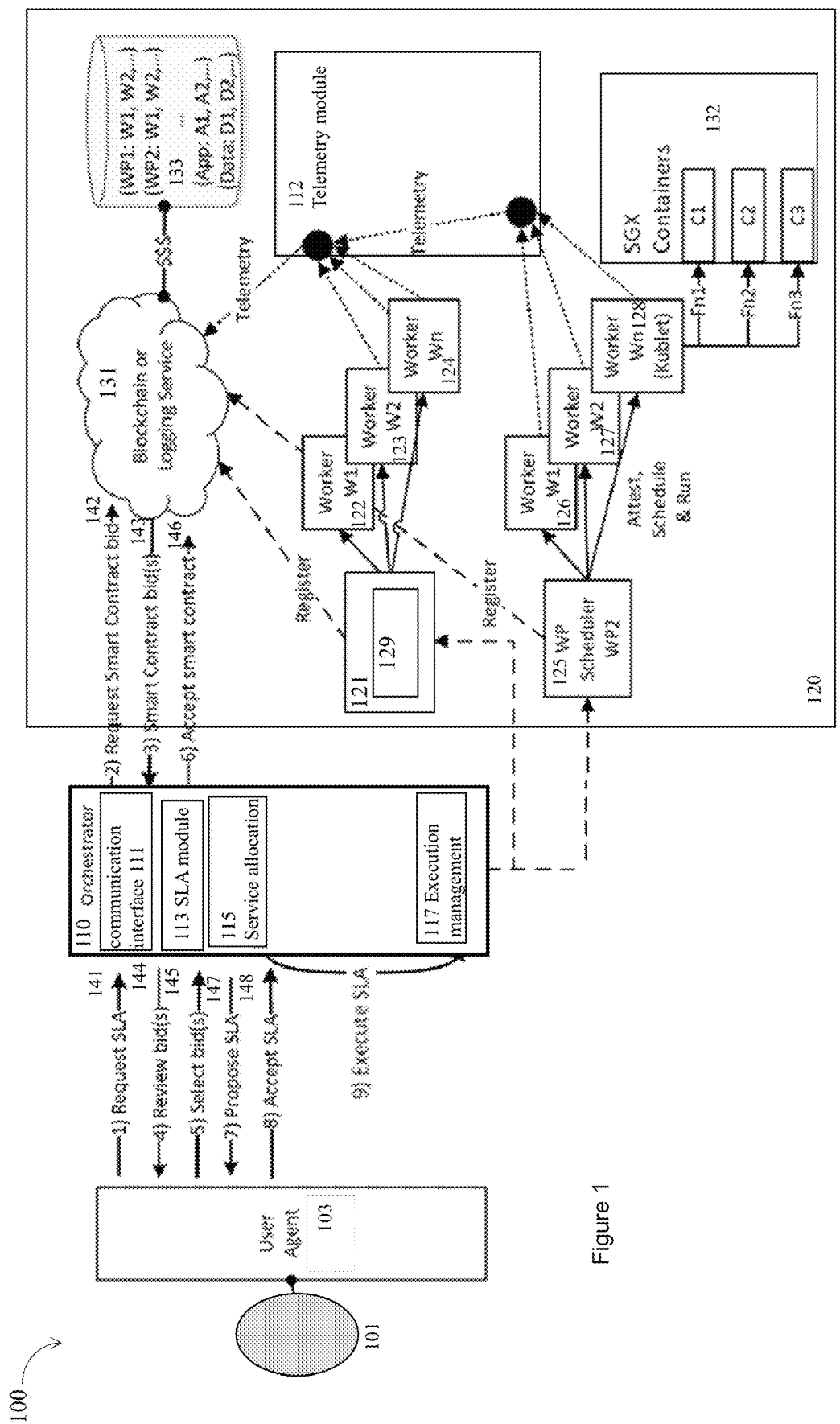
FIG. 1 illustrates an example multi-access edge computing (MEC) system including a MEC orchestrator having various components for contract formation and workload execution facilitated by a decentralized contracting system, in accordance with various embodiments.
Figure 2:
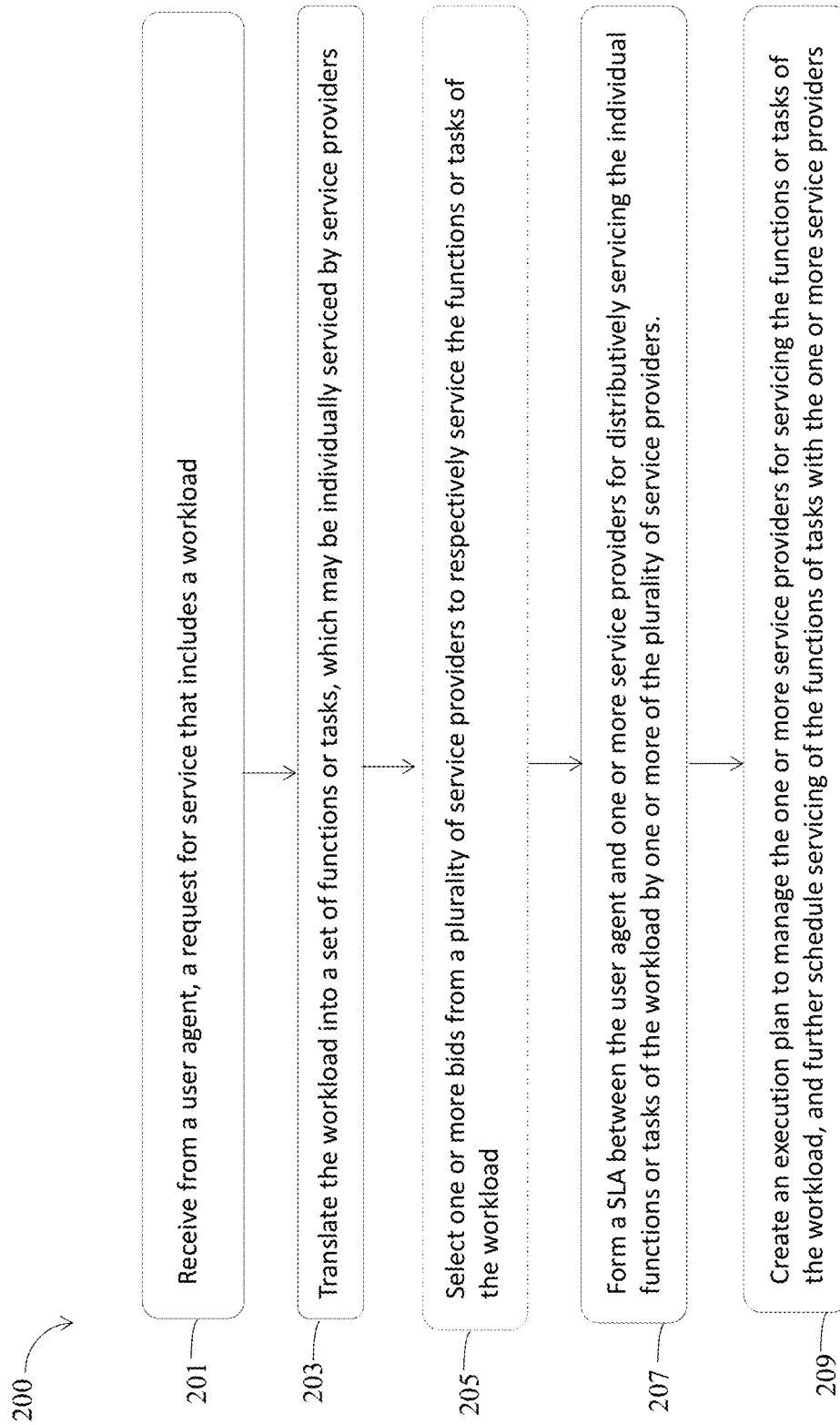
FIGS. 2-6 illustrate example processes performed by various components of a MEC system for contract formation and workload execution facilitated by a decentralized contracting system, in accordance with various embodiments.

When compared to traditional centralized could computing environments, multi-access edge computing (MEC) technology may provide a service to a user with many potential advantages. A user may interact with the MEC system using a user equipment (UE) or a user agent operating on a UE. A MEC system may include a MEC orchestrator, or a MEC platform manager, which manage the provision of a service to a UE or a user agent by a service provider, through one or more access points, or one or more MEC hosts. In some current MEC environment, a central orchestrator makes all decisions regarding which ecosystem vendor or service providers may be used to satisfy a user request for service. As a consequence, the MEC orchestrator may have a conflict of interest, since the MEC orchestrator may supply workload and function execution services, as well as authorize the vetting of ecosystem vendors or service providers of workload and function executions. A vendor of service, or a vendor, may be referred to as a service provider as well. For example, in some current MEC system, an entity that operates the MEC orchestrator in charge of service level agreement (SLA) contracts also determines which vendors and service providers are used to implement the SLA. The user has little or no access to the vendor community, their reputation, competitive bids, telemetry and track record for providing the same or similar services to other customers or users. It is a challenge for a MEC orchestrator in a current MEC system to provide a solution that allows high interoperability of service providers while having workload execution according to a SLA contract formed. In some embodiments, a contract may be formed based on the service level objective (SLO) for the application, e.g., 10 frames per second of video analytics.

Embodiments herein integrate elements from MEC orchestration, e.g. European Telecommunications Standards Institute (ETSI)-MEC, cloud computing, decentralized contracting system, e.g., Ethereum or other blockchain contract system, and platform security features, e.g., Software Guard Extensions (SGX) by Intel®, to allow dynamic negotiation of a SLA using a decentralized contract system. Service providers that satisfy a subset of the user's expected workload vie for the subset of workload they specialize in. An orchestrator performs the decomposition of the workload into functional elements and creates an execution plan that may be scheduled among the vendors who won rights to execute their subset of the workload. As such, the contract or SLA establishes, in a fair way, which vendors win the right to satisfy which portion of the workload including terms of service and compensation. The user agrees to or approves the negotiated terms as part of SLA creation. Another important aspect of current embodiments is that once the SLA has been established, according to such SLA, telemetry can be collected to validate compliance with the SLA as well. Hence, embodiments herein provide a mechanism to guarantee, or at least check, that the observed performance corresponds to the given SLA.

In embodiments, users have more flexibility to tailor a MEC SLA according to available service providers who actively compete in an open marketplace. Competition increases the likelihood that low-cost, high-value services are available to the user. In addition, the complexity of the bidding process, workload decomposition and execution planning, scheduling and termination are hidden from the user by the orchestration provider in the embodiments. Hence, embodiments herein reduce conflict of interest decisions made by the orchestrator while still providing a high degree of complexity hiding for user app developers/users. Furthermore, mechanism to validate established e-contracts or SLA can allow a customer or a user paying for the contracts to check what is being received, or validate the SLA has been fulfilled.

In embodiments, one or more computer-readable medium (CRM) having instructions stored therein configured to cause an apparatus, in response to execution of the instructions by one or more processors of the apparatus, to perform various operations for a MEC orchestrator. For example, the apparatus, in response to execution of the instructions by one or more processors of the apparatus, is to receive a request for service that includes a workload from a user agent; and in response to receipt of the request, facilitate formation of a SLA for servicing the workload. In more detail, to facilitate the formation of the SLA includes to: obtain, via a decentralized contracting system, bids from a plurality of service providers to respectively service a plurality of functions or tasks of the workload; relay the bids to the user agent; receive one or more selections of the bids from the user agent; propose to the user agent, the SLA for respectively servicing the functions or tasks of the workload with one or more of the plurality of bidding service providers, based at least in part on the one or more selections of the bids by the user agent, for acceptance by the user agent.

In embodiments, an apparatus for MEC includes a communication interface, one or more computer processors coupled to the communication interface, and a service allocation module operated by the one or more computer processors. The communication interface is arranged to interface with a user agent and a plurality of service providers including a plurality of edge computing devices. In more detail, to interface with the user agent includes to receive, from the user agent, a request for service that includes a workload, and to receive SLA or an acceptance of a SLA for distributive servicing of the workload by one or more of the plurality of service providers including one or more of the plurality of edge computing devices. The service allocation module is arranged to translate the workload into a set of functions or tasks, and schedule servicing of the functions of tasks with the one or more service providers, including the one or more edge computing devices, in accordance with the SLA.

In embodiments, an apparatus for MEC includes one or more computer processors, and a service provision manager operated by the one or more processors. The service provision manager is arranged to manage a set of workers disposed at edges of a network, where a worker of the set of workers is equipped to service at least a function or a task of a workload of a user agent of a multi-access edge computing service, the function or task being among a set of functions or tasks of the workload included in a service level agreement (SLA) formed for the user agent via a decentralized contracting system. The service provision manager is further arranged to register the workers with the decentralized contracting system, where each registration includes capabilities of the corresponding worker; and submit one or more bids to service the function or task of the workload, where a bid of the one or more bids for the function or task of the workload includes service performance indicators and service price.

In embodiments, a system for MEC includes a contract module or system. The contract module/system is arranged to receive a request from a MEC orchestrator for a function to be performed, where the function is among a set of functions of a workload included in a SLA from a user agent, and the orchestrator is to decompose the workload into the set of functions based on the SLA. The contract module/system is arranged to receive one or more bids for the function by one or more service providers for one or more workers managed by the one or more service providers to perform the function.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail.

Further, various operations will be described as multiple discrete operations, in turn, in a manner that is most helpful in understanding the illustrative embodiments; however, the order of description should not be construed as to imply that these operations are necessarily order dependent. In particular, these operations may not be performed in the order of presentation.

The description may use the phrases "in an embodiment," "in embodiments," "in some embodiments," and/or "in various embodiments," which may each refer to one or more of the same or different embodiments. Furthermore, the terms "comprising," "including," "having," and the like, as used with respect to embodiments of the present disclosure, are synonymous.

The phrase "A and/or B" means (A), (B), or (A and B). The phrases "A/B" and "A or B" mean (A), (B), or (A and B), similar to the phrase "A and/or B." For the purposes of the present disclosure, the phrase "at least one of A and B" means (A), (B), or (A and B).

As used hereinafter, including the claims, the term "unit," "engine," "module," or "routine" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Example embodiments may be described as a process depicted as a flowchart, a flow diagram, a data flow diagram, a structure diagram, or a block diagram. Although a flowchart may describe the operations as a sequential process, many of the operations may be performed in parallel, concurrently, or simultaneously. In addition, the order of the operations may be re-arranged. A process may be terminated when its operations are completed, but may also have additional steps not included in the figure(s). A process may correspond to a method, a function, a procedure, a subroutine, a subprogram, and the like. When a process corresponds to a function, its termination may correspond to a return of the function to the calling function and/or the main function.

Example embodiments may be described in the general context of computer-executable instructions, such as program code, software modules, and/or functional processes, being executed by one or more of the aforementioned circuitry. The program code, software modules, and/or functional processes may include routines, programs, objects, components, data structures, etc., that perform particular tasks or implement particular data types. The program code, software modules, and/or functional processes discussed herein may be implemented using existing hardware in existing communication networks. For example, program code, software modules, and/or functional processes discussed herein may be implemented using existing hardware at existing network elements or control nodes.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

The terms "coupled with" and "coupled to" and the like may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. By way of example and not limitation, "coupled" may mean two or more elements or devices are coupled by electrical connections on a printed circuit board such as a motherboard, for example. By way of example and not limitation, "coupled" may mean two or more elements/devices cooperate and/or interact through one or more network linkages such as wired and/or wireless networks. By way of example and not limitation, a computing apparatus may include two or more computing devices "coupled" on a motherboard or by one or more network linkages.

As used herein, the term "circuitry" refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD), (for example, a field-programmable gate array (FPGA), a programmable logic device (PLD), a complex PLD (CPLD), a high-capacity PLD (HCPLD), a structured ASIC, or a programmable System on Chip (SoC)), digital signal processors (DSPs), etc., that are configured to provide the described functionality. In some embodiments, the circuitry may execute one or more software or firmware programs to provide at least some of the described functionality.

As used herein, the term "interface" or "interface circuitry" may refer to, is part of, or includes circuitry providing for the exchange of information between two or more components or devices. The term "interface circuitry" may refer to one or more hardware interfaces (for example, buses, input/output (I/O) interfaces, peripheral component interfaces, network interface cards, and/or the like).

As used herein, the term "processor circuitry" may refer to, is part of, or includes circuitry capable of sequentially and automatically carrying out a sequence of arithmetic or logical operations; recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. As used herein, the term "interface circuitry" may refer to, is part of, or includes circuitry providing for the exchange of information between two or more components or devices. The term "interface circuitry" may refer to one or more hardware interfaces (for example, buses, input/output (I/O) interfaces, peripheral component interfaces, network interface cards, and/or the like). As used herein, the terms "instantiate," "instantiation," and the like may refer to the creation of an instance, and an "instance" may refer to a concrete occurrence of an object, which may occur, for example, during execution of program code.

As used herein, the term "computer device" may describe any physical hardware device capable of sequentially and automatically carrying out a sequence of arithmetic or logical operations, equipped to record/store data on a machine readable medium, and transmit and receive data from one or more other devices in a communications network. A computer device may be considered synonymous to, and may hereafter be occasionally referred to, as a computer, computing platform, computing device, etc. The term "computer system" may include any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources. As used herein, the term "user equipment" or "UE" may refer to a device, such as a computer device, with radio communication capabilities and may describe a remote user of network resources in a communications network. The term "user equipment" or "UE" may be considered synonymous to, and may hereafter be occasionally referred to as client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc.

Examples of "computer devices", "computer systems", "UEs", etc. may include cellular phones or smart phones, feature phones, tablet personal computers, wearable computing devices, an autonomous sensors, laptop computers, desktop personal computers, video game consoles, digital media players, handheld messaging devices, personal data assistants, an electronic book readers, augmented reality devices, server computer devices (e.g., stand-alone, rack-mounted, blade, etc.), cloud computing services/systems, network elements, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, machine-type communications (MTC) devices, machine-to-machine (M2M), Internet of Things (IoT) devices, and/or any other like electronic devices. Moreover, the term "vehicle-embedded computer device" may refer to any computer device and/or computer system physically mounted on, built in, or otherwise embedded in a vehicle.

As used herein, the term "network element" may be considered synonymous to and/or referred to as a networked computer, networking hardware, network equipment, router, switch, hub, bridge, radio network controller, radio access network device, gateway, server, and/or any other like device. The term "network element" may describe a physical computing device of a wired or wireless communication network and be configured to host a virtual machine. Furthermore, the term "network element" may describe equipment that provides radio baseband functions for data and/or voice connectivity between a network and one or more users. The term "network element" may be considered synonymous to and/or referred to as a "base station." As used herein, the term "base station" may be considered synonymous to and/or referred to as a node B, an enhanced or evolved node B (eNB), next generation nodeB (gNB), base transceiver station (BTS), access point (AP), roadside unit (RSU), etc., and may describe equipment that provides the radio baseband functions for data and/or voice connectivity between a network and one or more users. The term "RSU" may refer to any transportation infrastructure entity implemented in an gNB/eNB or a stationary (or relatively stationary) UE. An RSU implemented in a UE may be referred to as a "UE-type RSU" and an RSU implemented in an eNB may be referred to as an "eNB-type RSU." As used herein, the terms "vehicle-to-vehicle" and "V2V" may refer to any communication involving a vehicle as a source or destination of a message. Additionally, the terms "vehicle-to-vehicle" and "V2V" as used herein may also encompass or be equivalent to vehicle-to-infrastructure (V2I) communications, vehicle-to-network (V2N) communications, vehicle-to-pedestrian (V2P) communications, or V2X communications.

As used herein, the term "channel" may refer to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" may refer to a connection between two devices through a Radio Access Technology (RAT) for the purpose of transmitting and receiving information.

FIG. 1 illustrates an example MEC system 100 including a MEC orchestrator 110 having various components for contract formation and workload execution facilitated by a decentralized contracting system 131, in accordance with various embodiments. FIGS. 2-6 illustrate example processes performed by various components of a MEC system for contract formation and workload execution facilitated by a decentralized contracting system, in accordance with various embodiments.

In embodiments, the MEC system 100 may include the MEC orchestrator 110, a user 101, a user agent 103 that may be operated on a UE to interact with the user 101. In addition, the MEC system 100 further includes various service providers, e.g., a service provider 121, a service provider 125, the decentralized contracting system 131, a database 133, a telemetry module 112, and a security environment 132. The MEC orchestrator 110 includes a communication interface 111, a SLA module 113, a service allocation module 115, and an execution management module 117. The MEC orchestrator 110 may include one or more computer processors, not shown, coupled to the communication interface 111 to operate the various components. For example, the SLA module 113, the service allocation module 115, and the execution management module 117 may be operated on the one or more computer processors of the MEC orchestrator 110.

The service provider 121 is to manage a plurality of workers, e.g., a worker 122, a worker 123, and a worker 124. A worker, e.g., a MEC host, may be disposed at edges of a network. Similarly, the service provider 125 is to manage a plurality of workers, e.g., a worker 126, a worker 127, and a worker 128. A service provider, e.g., the service provider 121, may include a service provision manager 129 operated by one or more processors, not shown. Various components, e.g., the decentralized contracting system 131, the service provider 121, the service provider 125, may be located in edge cloud or remote cloud 120. For example, the service provider 121, or the service provider 125 may include a plurality of edge computing devices, which may include one or more of a WiFi® or cellular network access point, or an edge server dispose at an edge of a network. The edge computing devices for the service provider 121 or the service provider 125 may have access to the edge cloud or remote cloud by various technologies, e.g., long term evolution (LTE) technology, wireless local area network (WLAN), or new radio (NR) technology. More details for the edge cloud or remote cloud 120 are shown in FIGS. 7-16.

In embodiments, the MEC orchestrator 110 provides an interface between the user agent 103 and a plurality of service providers, e.g., the service provider 121, or the service provider 125. In some embodiments, the MEC system 100 operates according to a process 200 illustrated in FIG. 2.

In embodiments, the process 200 starts at an interaction 201. During the interaction 201, a MEC orchestrator receives from a user agent, a request for service that includes a workload. For example, the MEC orchestrator, e.g., the communication interface 111, receives from the user agent 103, a request for service that includes a workload. During an interaction 203, the MEC orchestrator translates the workload into a set of functions or tasks, which may be individually serviced by various service providers. For example, the MEC orchestrator 110, e.g., by using the service allocation module 115, translates the workload into a set of functions or tasks, which may be individually serviced by various ones of the service providers. For example, a worker, e.g., the worker 122, specializes in video transcoding, and is equipped to service at least a function or a task of a workload related to video transcoding. In addition, during an interaction 207, a SLA may be formed between the user agent and one or more service providers for distributive servicing the individual functions or tasks of the workload by one or more of the plurality of service providers. For example, a SLA may be formed between the user agent 103 and one or more service providers, e.g., the service provider 121, or the service provider 125, for distributive servicing the individual functions or tasks of the workload.

In embodiments, the SLA may be formed with the assistance of the SLA module 113, based on one or more bids from a plurality of service providers to respectively service the functions or tasks of the workload. Accordingly, the process 200 may optionally include an interaction 205, when one or more bids from a plurality of service providers are selected by the user agent to respectively service the functions or tasks of the workload. The bids may be received through the decentralized contracting system 131 and orchestrator 110. For example, a first service provider is selected to perform a first function of the set of functions of the workload, a second service provider is selected to perform a second function of the set of functions of the workload, and the first service provider is different from the second service provider. The selection of the one or more service providers to service the set of functions of the workload may be performed by the user agent 103, the MEC orchestrator 110, and/or the decentralized contracting system 131, in cooperation with each other. For example, the MEC orchestrator 110 and/or the decentralized contracting system 131 may have the freedom to select from a community of service providers all willing to satisfy the contract terms, and present to the users. The user agent 103 may select one or more proposed service providers according to a preferred cost and scheduling latency. The user agent 103 may also select a redundant set of service providers to improve resiliency.

In embodiments, during an interaction 209, an execution plan is created to manage the one or more service providers for servicing the functions or tasks of the workload, and further schedule servicing of the functions of tasks with the one or more service providers. For example, the service allocation module 115 may create an execution plan to manage the one or more service providers for servicing the functions or tasks of the workload, and further schedule servicing of the functions of tasks with the one or more service providers, e.g., the service provider 121, or the service provider 125, in accordance with the SLA and the execution plan.

In embodiments, the SLA includes description of the workload, resources to perform the workload, performance parameters for the workload, quality of service (QoS) for the workload, cost for performing the workload, payment for performing the workload, or contract terms determined by the decentralized contracting system. In embodiments, a bid may include some performance indicators for a function or a task of the workload, and a price to perform the function or task of the workload. Furthermore, a bid may include some contract terms determined by the decentralized contracting system 131. The workload may be related to a user case, e.g., video analytics, location services, Internet-of-Things (IoT), Network Functions Virtualisation (NFV) technologies, autonomous driving, speech recognition, Function as a Service (FaaS), medical applications, augmented reality, optimized local content distribution, data caching, or other relate applications. The description of the workload may include any description for any workload in the view of a person having ordinary skill in the art. For example, the description of the workload includes a list of functions of the workload, resource requirements for the workload, or data dependencies between inputs and outputs for the workload. The same principle applies to other terms such as resources to perform the workload, performance parameters for the workload, quality of service (QoS) for the workload, cost for performing the workload, payment for performing the workload, or contract terms determined by the decentralized contracting system. For example, the resources to perform the workload include computing resources, communication resources, acceleration resources, memory, or storage; the performance parameters for the workload include amount of memory space used, amount of computing resources in terms of core areas or number of accelerators, amount of input/output bandwidth, or amount of latency; the cost includes financial cost or latency used in performing the workload; and the contract terms include relationship among the workload, the resources to perform the workload, the performance parameters for the workload, the quality of service (QoS) for the workload, the cost for performing the workload, or the payment for performing the workload. It is noted that the examples provided herein for the terms included in SLA are for examples only, and are not limiting. There may be other examples not provided herein. For example, a contract term may further include any contract term that may be included in a business transaction between entities to carry out the workload.

In embodiments, the user agent 103 interact with the service providers through various components of the MEC orchestrator 110. For example, the MEC orchestrator 110 may utilize the communication interface 111 to receive or transmit various messages or information between the user agent 103, the plurality of service providers, the decentralized contracting system 131, the database 133, the telemetry module 112, and the security environment 132. For example, the communication interface 111 receives from the user agent 103, at the interaction 141, a SLA or a request for service that includes a workload, or an acceptance of a SLA at an interaction 148. The communication interface 111 also receives or transmits other messages in other interactions, which are described in more details below.

In embodiments, the SLA module 113 may perform operations or coordinate operations performed by multiple parties for forming a SLA, based on bids to the decentralized contracting system 131 from a plurality of service providers. For example, the SLA module 113 may receive, from the user agent 103, at the interaction 141, a request for service that includes a workload. In response to receipt of the request, the SLA module 113 facilitates formation of a SLA for servicing the workload. In detail, the SLA module 113 may obtain, via the decentralized contracting system 131, at an interaction 142 and an interaction 143, bids from a plurality of service providers to respectively service a plurality of functions or tasks of the workload. The SLA module 113 may relay, at an interaction 144, the bids to the user agent 103. The SLA module 113 may further receive, at an interaction 145, one or more selections of the bids from the user agent 103. The SLA module 113 may also accept, at an interaction 146, contract terms for the selected bids from the decentralized contracting system 131. In addition, the SLA module 113 may propose to the user agent 103, at an interaction 147, the SLA for respectively servicing the functions or tasks of the workload with one or more of the plurality of bidding service providers, based at least in part on the one or more selections of the bids by the user agent 103 received at the interaction 145. Afterwards, the SLA module 113 may receive, at an interaction 148, an acceptance of the proposed SLA from the user agent 103.

In embodiments, the sequences of interactions for the SLA module 113 are shown in FIG. 1 for examples only. Other different kinds of interactions may be performed by the SLA module 113 to form a SLA. For example, a SLA may be received from the user agent 103 without being negotiated based on the one or more selections of the bids, and hence without the interaction 147 and the interaction 148. In some other embodiments, the one or more bids to service a plurality of functions or tasks of the workload may be selected directly by the decentralized contracting system 131. In general, any interaction shown in FIG. 1, may be performed by a different component shown in FIG. 1 in different embodiments, which are not shown or described in details.

In addition, in embodiments, the SLA module 113 may validate that the SLA has been fulfilled based on telemetry and statistics data collected for the plurality of service providers, e.g., the service provider 121, the service provider 125. In detail, the telemetry module 112 is to collect telemetry and statistics data produced one or more service providers, e.g., the service provider 121, the service provider 125, for servicing the functions of tasks of the workload. Based on the collected telemetry and statistics data, the SLA module 113 may validate that the SLA has been fulfilled. Furthermore, the SLA module 113 may calculate a reputation statistics for the plurality of service providers based on their servicing the plurality of functions or tasks of the workload. The telemetry and statistics data may are collected for the plurality of service providers, where the telemetry and statistics data may include data related to the description of the workload, the resources to perform the workload, the performance parameters for the workload, the QoS for the workload, the cost for performing the workload, or the payment for performing the workload, so that the telemetry and statistics data may be used to validate that the SLA has been fulfilled. Based on the validation of the SLA being fulfilled or not, reputation statistics may be calculated for a service provider. For example, a reputation statistics may include a percentage of times the service provider fulfills its tasks or functions. A reputation statistics may also include relative ranks among multiple service providers, derived based on the collected telemetry and statistics data, or any feedback based on the performance for servicing the functions of tasks of the workload.

Figure 3:
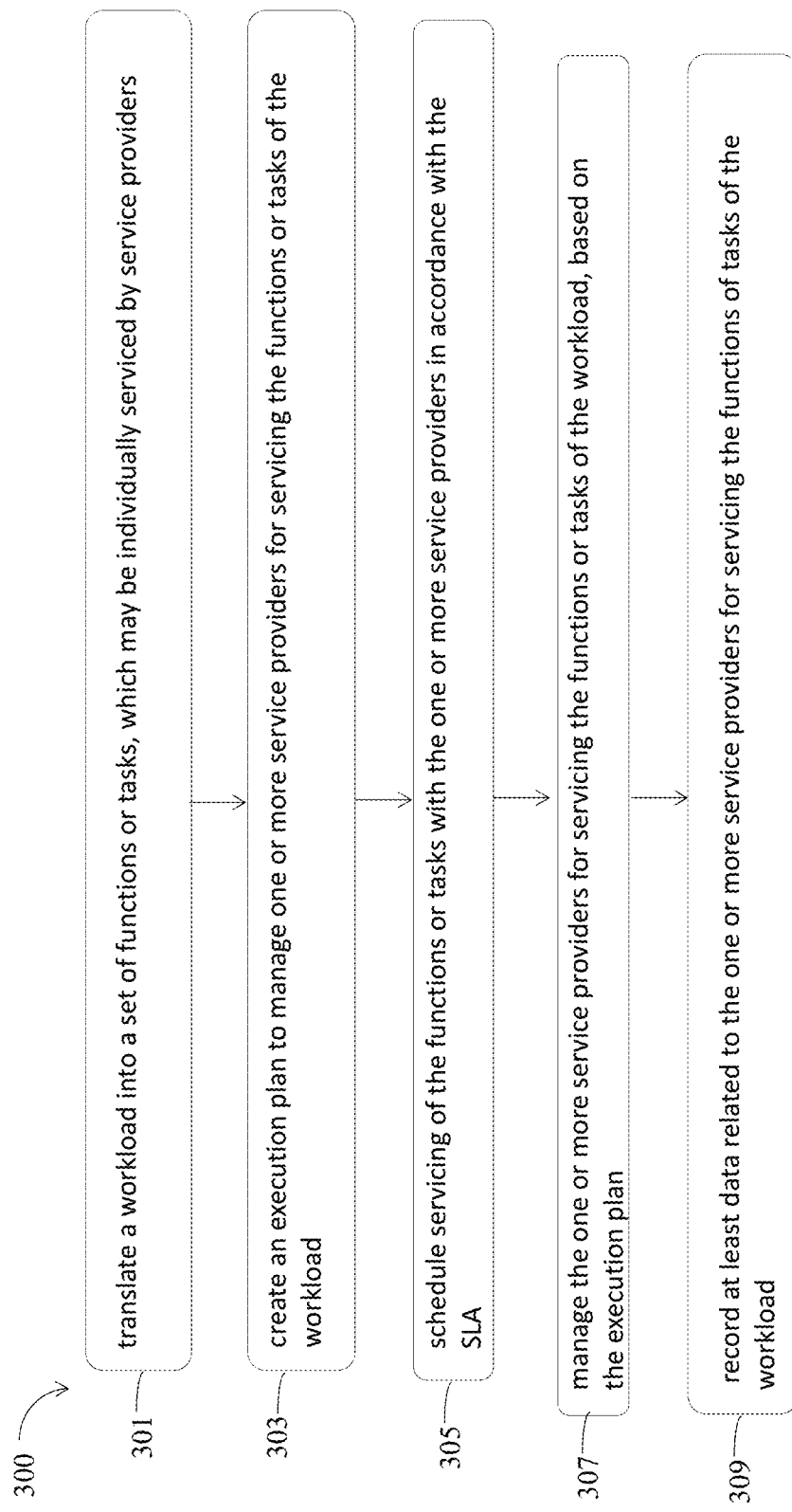

In embodiments, the service allocation module 115 and the execution management module 117 may perform various operations illustrated by a process 300 for contract formation and workload execution facilitated by the decentralized contracting system 131, as shown in FIG. 3.

The process 300 may start at an interaction 301. During the interaction 301, the service allocation module 115 is to translate a workload into a set of functions or tasks, e.g., serverless functions (FaaS), which may be individually serviced by service providers. During an interaction 303, the service allocation module 115 is to create an execution plan to manage one or more service providers for servicing the functions or tasks of the workload. In some embodiments, a service provider may be referred to as a FaaS provider. In addition, during an interaction 305, the service allocation module 115 is to schedule servicing of the functions or tasks with the one or more service providers in accordance with the SLA, which may be formed by the SLA module 113.

In embodiments, during an interaction 307, the execution management module 117 is to manage the one or more service providers for servicing the functions of tasks of the workload, based on the execution plan created by the service allocation module 115. When the execution plan includes a security plan, the execution management module 117 is to manage the one or more service providers for servicing the functions of tasks of the workload accord to the security plan, in the secure environment 132. For example, the secure environment 132 includes different SGX containers C1, C2, and C3, while a function f1 is to be executed within the container C1, a function f2 is to be executed within the container C2, and a function f3 is to be executed within the container C3. Furthermore, during an interaction 309, the execution management module 117 is to record at least data related to the one or more service providers for servicing the functions of tasks of the workload.

Figure 4:
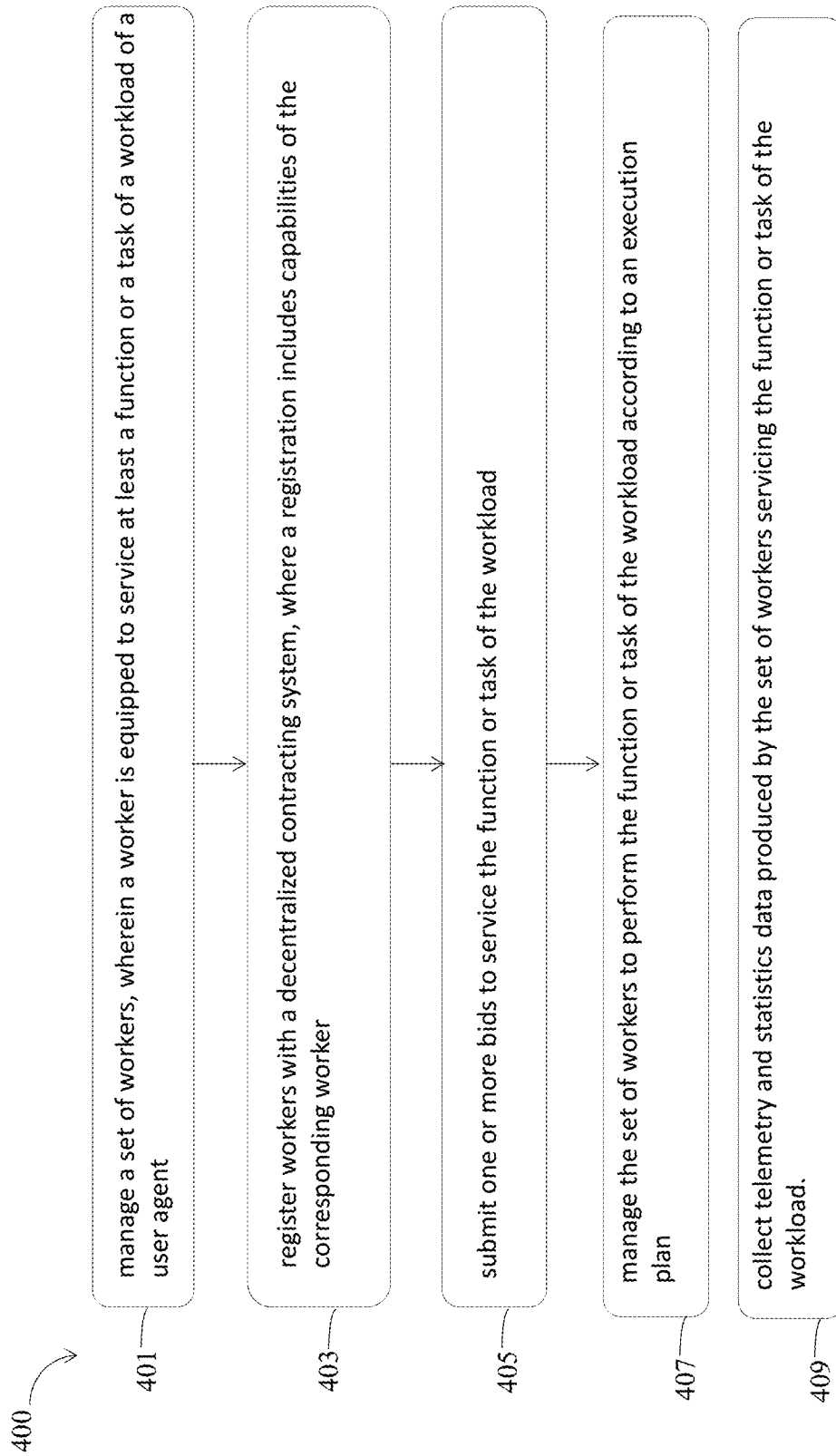

In embodiments, a service provider, e.g., the service provider 121, or the service provider 125, may include one or more computer processors, not shown, and a service provision manager, e.g., the service provision manager 129, operated by the one or more processors. A service provider, or a service provision manager of a service provider may perform various operations illustrated by a process 400 for contract formation and workload execution facilitated by the decentralized contracting system 131, as shown in FIG. 4.

In embodiments, during an interaction 401, the service provision manager 129 is to manage a set of workers, wherein a worker is equipped to service at least a function or a task of a workload of a user agent. During an interaction 403, the service provision manager 129 is to register the service provide including its workers with the decentralized contracting system 131, where a registration includes capabilities of the corresponding worker. During an interaction 405, the service provision manager 129 is arranged to submit one or more bids to service the function or task of the workload. During an interaction 407, the service provision manager 129 is to manage the set of workers to perform the function or task of the workload according to an execution plan determined by an orchestrator orchestrated the formation of the SLA. For example, the service provision manager 129 is to accept a manifest containing specific instructions regarding how best to apply workload execution. The manifest may be similar to a MEC service level operation (SLO). In some embodiments, the execution plan may include a security plan, and the service provision manager is to manage the set of workers to perform the function or task of the workload according to the security plan. During an interaction 409, the service provision manger 129 may further to collect telemetry and statistics data produced by the set of workers servicing the function or task of the workload. In some embodiments, an off-chain logging service may maintain telemetry and statistics regarding SLA performance where contents of the log may be privacy sensitive. However, it is understood that users (customer) may retain access to log information independent of orchestration oversight. For example, the logging entity may issue access tokens or the decentralized contracting system 131, e.g., blockchain, may be configured as a private or semipermissioned decentralized contracting system.

Figure 5:
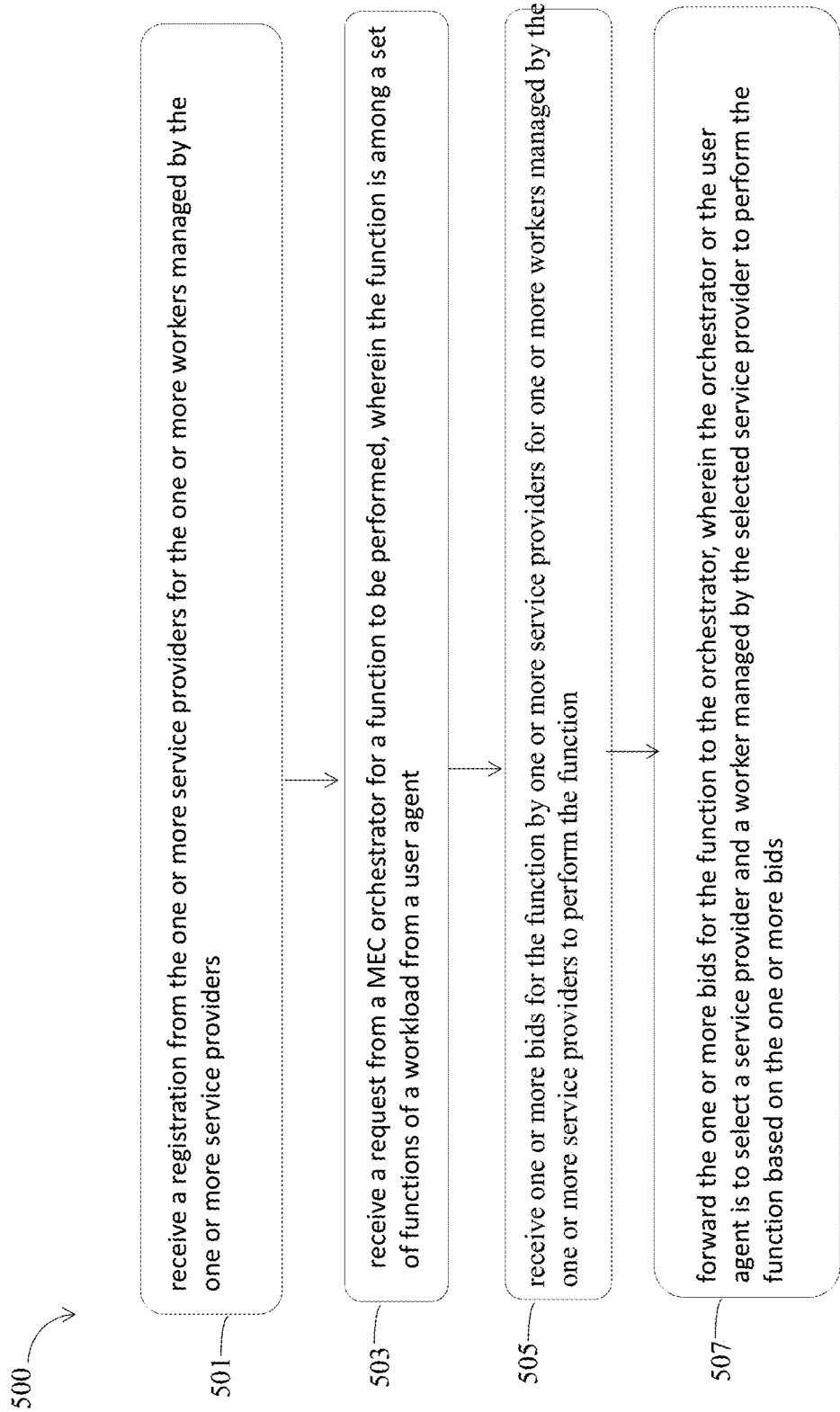

In embodiments, the decentralized contracting system 131 may perform various operations illustrated by a process 500 for contract formation and workload execution, as shown in FIG. 5. In embodiments, the decentralized contracting system 131, which may be referred to as a contract module, may include a blockchain contract system.

The process 500 may start at an interaction 501. During an interaction 501, the decentralized contracting system 131 is arranged to receive a registration from the one or more service providers for the one or more workers managed by the one or more service providers, where the registration includes an indication of a capability of a worker of the one or more workers to provide services for various functions/tasks. During the interaction 503, the decentralized contracting system 131 is arranged to receive a request from a MEC orchestrator for a function/task to be performed, where the function/task is among a set of functions of a workload from a user agent. The orchestrator is to receive the workload (or descriptions thereof) from the user agent, decompose the workload into the set of functions/tasks, and provide descriptions of the functions/tasks to the service providers via the decentralized contracting system 131. During an interaction 505, the decentralized contracting system 131 is arranged to receive one or more bids for the function/task by one or more service providers for one or more workers managed by the one or more service providers to perform the function/task. During an interaction 507, the decentralized contracting system 131 is arranged to forward the one or more bids for the function/task to the orchestrator, wherein the orchestrator or the user agent is to select a service provider and a worker managed by the selected service provider to perform the function/task based on the one or more bids.

Various components, the telemetry module 112, the security environment 132, the communication interface 111, the SLA module 113, the service allocation module 115, and the execution management module 117, are examples of components of the MEC system 100, the MEC orchestrator 110, or the decentralized contracting system 131. In some embodiments, those components may be referred by different names, or structured or divided into different forms to perform functions similar to those functions described in the current disclosure.

Figure 6:
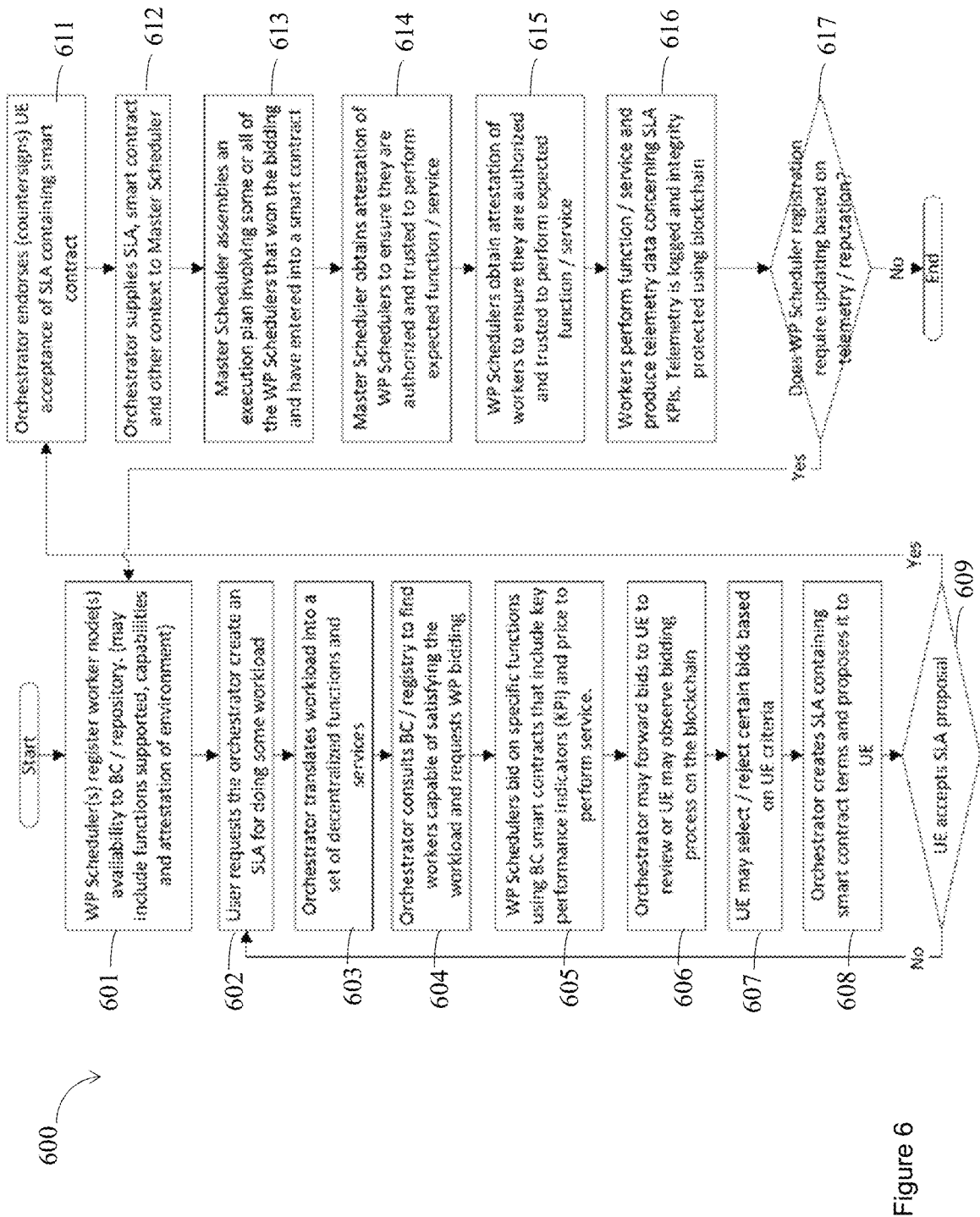

FIG. 6 illustrates an example process performed by various components of a MEC system for contract formation and workload execution facilitated by a decentralized contracting system, in accordance with various embodiments. A WP scheduler may refer to a service provider, or a FaaS provider; a decentralized contracting system may be referred to as a blockchain (BC), while a Master scheduler may perform the functions of a service allocation module or an execution management module, e.g., the service allocation module 115 or the execution management module 117 as shown in FIG. 1.

The process 600 may start at an interaction 601. During the interaction 601, a service provider is to register itself and its workers availability to a decentralized contracting system repository. The registration may include descriptions about functions supported by the worker, capabilities of the worker, and attestation of environments for the workers.

During an interaction 602, a user is to request a MEC orchestrator to create a SLA for doing some workload. During an interaction 603, the MEC orchestrator is to translate the workload into a set of discrete functions or tasks. During an interaction 604, the MEC orchestrator is to consult the decentralized contracting system repository to find workers capable of satisfying the functions/tasks of workload, and further request bidding for servicing the functions/tasks by the capable workers. During an interaction 605, the service provider is to bid on specific functions using the decentralized contracting system, where a bid may include performance indicators and price to perform the service. During an interaction 606, the MEC orchestrator is to forward bids to the UE to review. Additionally and alternatively, the UE may observe the bidding process on the decentralized contracting system. The service providers, orchestrator or other actors participating in the service supply chain ecosystem may additionally provide attestation evidence regarding the trustworthiness of the hosting environments available for hosting a UE workload. The attestation evidence may be observed by the UE or may be relayed to the UE by the orchestrator or by some other evidence collector, aggregator or verifier service such that the UE may incorporate trustworthiness metrics into the bid acceptance decision. During an interaction 607, the UE is to select or reject certain bids based on UE criteria. During an interaction 608, the MEC orchestrator is to create a SLA containing contract terms, e.g., smart contract terms, and propose the contract terms to the UE. The SLA may further contain UE requirements for trustworthiness such that a trusted computing "trust level" may be achieved as a condition of servicing the SLA. Additionally or alternatively, there may be a separate Trust Level Agreement (TLA) that may represent the trusted computing level of service requirements. During an interaction 609, the UE is to decide whether to accept the proposed SLA.

In embodiments, if the UE is not to accept the proposed SLA, the process 600 goes back to the interaction 602, and the user is to request the MEC orchestrator to create a SLA for doing the workload. On the other hand, if the UE is to accept the proposed SLA, the process 600 goes further to an interaction 611.

During the interaction 611, the MEC orchestrator is to endorse, countersign, or co-sign, the UE acceptance of the SLA. During an interaction 612, the MEC orchestrator is to supply the SLA, with contract terms, and other context to the service allocation module. During an interaction 613, the service allocation module is to assemble an execution plan involving some or all of the service providers that won the bidding and have entered into the contract according to the SLA. During an interaction 614, the service allocation module is to obtain attestation of service providers to ensure the service providers are authorized and trusted to perform expected functions or services. During an interaction 615, the service providers are to obtain attestation of workers managed by the service providers to ensure the workers are authorized and trusted to perform expected functions or services. During an interaction 616, the workers are to perform functions or services, and produce telemetry data concerning SLA performance indicators, e.g., key performance indicators (KPI). Telemetry is logged and integrity protected using blockchain. During an interaction 617, the service providers are to determine whether registrations require updating based on the telemetry or reputation data. If the registrations require updating, the process 600 moves to the interaction 601. Otherwise, the process 600 ends.

Figure 7:
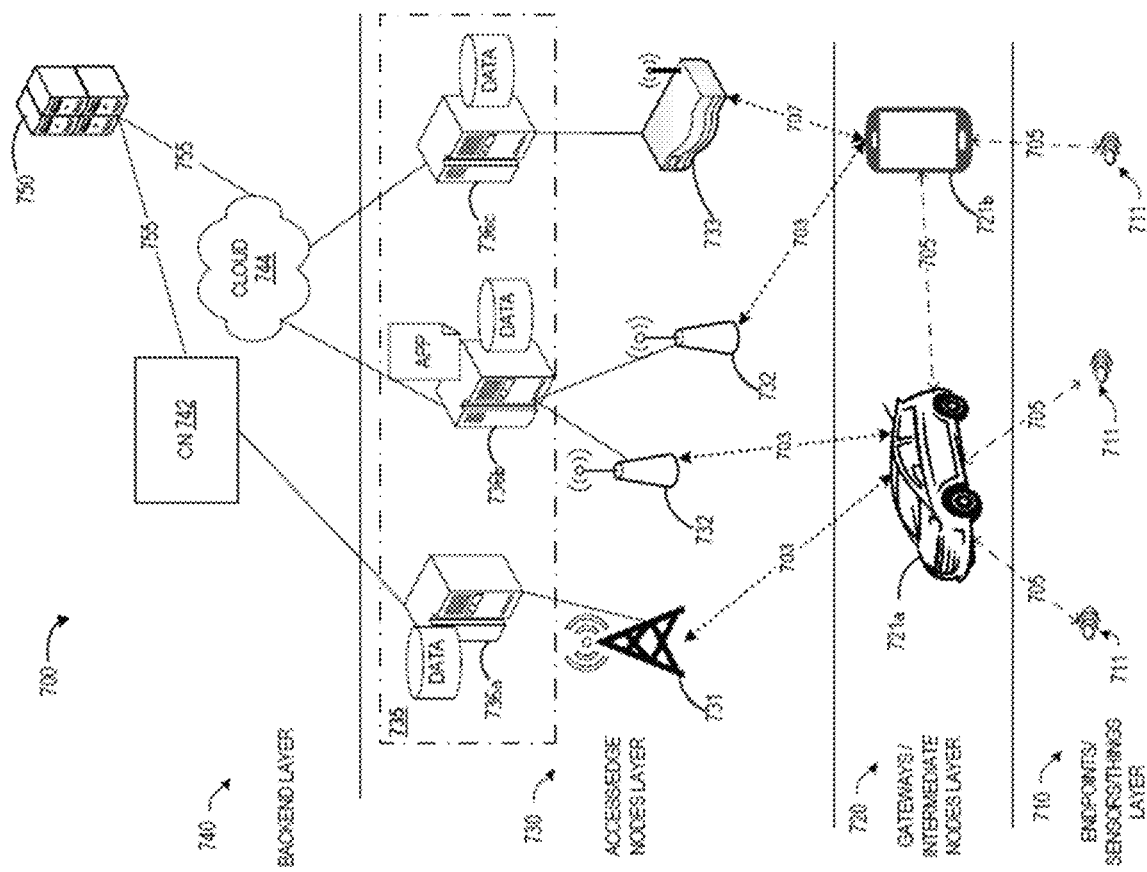
FIG. 7 illustrates a multi-access computing (MEC) environment, in accordance with various embodiments.

FIG. 7 illustrates a multi-access computing (MEC) environment, in accordance with various embodiments.

In embodiments, FIG. 7 specifically illustrates the different layers of communication occurring within the environment 700, starting from endpoint sensors or things layer 710 (e.g., operating in an Internet of Things (IoT) network topology) comprising one or more IoT devices 711 (also referred to as edge endpoints 710 or the like); increasing in sophistication to gateways or intermediate node layer 720 comprising one or more user equipment (UEs) 721*a* and 721*b* (also referred to as intermediate nodes 720 or the like), which facilitate the collection and processing of data from endpoints 710; increasing in processing and connectivity sophistication to access or edge node layer 730 comprising a plurality of access nodes (ANs) 731, 732, and 733 (also referred to as edge compute nodes 730 or the like); and increasing in connectivity and processing sophistication to a backend layer 740 comprising core network (CN) 742 and cloud 744. The processing at the backend layer 740 may be enhanced by network services as performed by a remote application server 750 and/or other cloud services.

An end-user device, such as an intermediate node 720 or endpoint 710 has access to multiple communication networks based on different technologies, for example, LTE or NR/5G cellular technology (e.g., as provided by AN 731 and/or ANs 732), WiFi (e.g., as provided by AN 733 and/or ANs 732), DSL, MuLTEfire, etc., for accessing application services. Different technologies exhibit benefits and limitations in different scenarios, and application performance in different scenarios becomes dependent on the choice of the access networks (e.g., WiFi, LTE, etc.) and the used network and transport protocols (e.g., VPN, MPTCP, GRE etc.). For example, WiFi may provide high throughput for intermediate nodes 720 and endpoints 710 when under relatively good coverage, but the throughput degrades significantly as the user moves closer to the edge of WiFi coverage area or when an 733 serves a relatively large user population (e.g., due to contention based WiFi access scheme). In LTE or NR networks, the capacity is often constrained by the limited availability of licensed spectrum, but the quality of the service is predictable even in multi-user scenarios due to the exclusivity of the licensed spectrum and the controlled scheduling provided by a serving base station.

Unlike LTE and NR networks that use licensed spectrum, WiFi is a shared medium that operates in the unlicensed radiofrequency (RF) of 2.4 GHz and 5 GHz ranges. The 3GPP variant of unlicensed access is called LAA. LAA, aims to design LTE and/or NR specifications for global harmonization that allow for fair coexistence with WiFi and other networks in a shared medium. LAA employs a medium access scheme similar to WiFi's EDCA. The coexistence impact on fairness and throughput with respect to LTE and/or NR is also a current challenge for both standards. One issue that may arise when utilizing network technologies that operated in a shared medium is that packets may be lost during transmission due to, for example, temporary interference, packet collisions, congestion, and buffer overflow. In current WiFi-based protocols, MAC protocols support limited retransmissions to recover lost packets. In particular, a WiFi transmitter will give up and drop a packet when a maximum retransmission limit is reached. Additionally, the WiFi-based retransmission method is not applicable when a packet is dropped due to temporary congestion and/or buffer overflow. Similarly, LAA uses a contention window size (CWS) for retransmitting lost packets, where the CWS increases in an exponential manner based on the HARQ-ACK in the MAC layer.

Referring back to FIG. 7, the environment 700 is shown to include a UE 721*a* and UE 721*b* (collectively referred to as "UE 721" or "UEs 721"). In this example, the UE 721*a* is illustrated as a vehicle UE, and UE 721*b* is illustrated as a smartphone (e.g., handheld touchscreen mobile computing device connectable to one or more cellular networks). However, these UEs 721 may comprise any mobile or non-mobile computing device, such as tablet computers, wearable devices, PDAs, pagers, desktop computers, laptop computers, wireless handsets, unmanned vehicles or drones, IVIs, ICEs, an Instrument Clusters, HUDs, OBDs, DMEs, MDTs, OBUs, EMS, EEMS, ECUs, ECMs, embedded systems, microcontrollers, control modules, networked or "smart" appliances, MTC devices, M2M, IoT devices, and/or any type of computing device including a wireless communications interface.

Environment 700 also includes IoT devices 711, which are uniquely identifiable embedded computing devices (e.g., within the Internet infrastructure) that comprise a network access layer designed for low-power IoT applications utilizing short-lived UE connections. The IoT devices 711 may be any objects, devices, sensors, or "things" that are embedded with hardware and/or software components that enable the objects, devices, sensors, or "things" capable of capturing and/or recording data associated with an event, and capable of communicating such data with one or more other devices over a network with little or no user intervention. For instance, in various embodiments, IoT devices 711 may be abiotic devices such as autonomous sensors, gauges, meters, image capture devices, microphones, light emitting devices, audio emitting devices, audio and/or video playback devices, electro-mechanical devices (e.g., switch, actuator, etc.), and the like. The IoT devices 711 can utilize technologies such as M2M or MTC for exchanging data with an MTC server (e.g., a server 750), a MEC server 736 and/or MEC system, or device via a PLMN, ProSe or D2D communication, sensor networks, or IoT networks. The M2M or MTC exchange of data may be a machine-initiated exchange of data.

The IoT devices 711 may execute background applications (e.g., keep-alive messages, status updates, etc.) to facilitate the connections of the IoT network. Where the IoT devices 711 are, or are embedded in, sensor devices, the IoT network may be a WSN. An IoT network describes an interconnecting IoT UEs, such as the IoT devices 711 being connected to one another over respective direct links 705. The IoT devices may include any number of different types of devices, grouped in various combinations (referred to as an "IoT group") that may include IoT devices that provide one or more services for a particular user, customer, organizations, etc. A service provider (e.g., an owner/operator of server 750, CN 742, and/or cloud 744) may deploy the IoT devices in the IoT group to a particular area (e.g., a geolocation, building, etc.) in order to provide the one or more services. In some implementations, the IoT network may be a mesh network of IoT devices 711, which may be termed a fog device, fog system, or fog, operating at the edge of the cloud 744. The fog involves mechanisms for bringing cloud computing functionality closer to data generators and consumers wherein various network devices run cloud application logic on their native architecture. Fog computing is a system-level horizontal architecture that distributes resources and services of computing, storage, control, and networking anywhere along the continuum from cloud 744 to Things (e.g., IoT devices 711). The fog may be established in accordance with specifications released by the OFC, the OCF, among others. In some embodiments, the fog may be a tangle as defined by the IOTA foundation.

The fog may be used to perform low-latency computation/aggregation on the data while routing it to an edge cloud computing service (e.g., edge nodes 730) and/or a central cloud computing service (e.g., cloud 744) for performing heavy computations or computationally burdensome tasks. On the other hand, edge cloud computing consolidates human-operated, voluntary resources, as a cloud. These voluntary resource may include, inter-alia, intermediate nodes 720 and/or endpoints 710, desktop PCs, tablets, smartphones, nano data centers, and the like. In various implementations, resources in the edge cloud may be in one to two-hop proximity to the IoT devices 711, which may result in reducing overhead related to processing data and may reduce network delay.

In some embodiments, the fog may be a consolidation of IoT devices 711 and/or networking devices, such as routers and switches, with high computing capabilities and the ability to run cloud application logic on their native architecture. Fog resources may be manufactured, managed, and deployed by cloud vendors, and may be interconnected with high speed, reliable links. Moreover, fog resources reside farther from the edge of the network when compared to edge systems but closer than a central cloud infrastructure. Fog devices are used to effectively handle computationally intensive tasks offloaded by edge resources.

In embodiments, the fog may operate at the edge of the cloud 744. The fog operating at the edge of the cloud 744 may overlap or be subsumed into an edge network 730 of the cloud 744. The edge network of the cloud 744 may overlap with the fog, or become a part of the fog. Furthermore, the fog may be an edge-fog network that includes an edge layer and a fog layer. The edge layer of the edge-fog network includes a collection of loosely coupled, voluntary and human-operated resources (e.g., the aforementioned edge compute nodes or edge devices). The Fog layer resides on top of the edge layer and is a consolidation of networking devices such as the intermediate nodes 720 and/or endpoints 710 of FIG. 7.

Data may be captured, stored/recorded, and communicated among the IoT devices (or, for example, among the intermediate nodes 720 and/or endpoints 710 that have direct links 705 with one another as shown by FIG. 7). Analysis of the traffic flow and control schemes may be implemented by aggregators that are in communication with the IoT devices 711 and each other through a mesh network. The aggregators may be a type of IoT device 711 and/or network appliance. In the example of FIG. 7, the aggregators may be edge nodes 730, or one or more designated intermediate nodes 720 and/or endpoints 710. Data may be uploaded to the cloud 744 via the aggregator, and commands can be received from the cloud 744 through gateway devices that are in communication with the IoT devices 711 and the aggregators through the mesh network. Unlike the traditional cloud computing model, in some implementations, the cloud 744 may have little or no computational capabilities and only serves as a repository for archiving data recorded and processed by the fog. In these implementations, the cloud 744 centralized data storage system and provides reliability and access to data by the computing resources in the fog and/or edge devices. Being at the core of the architecture, the Data Store of the cloud 744 is accessible by both Edge and Fog layers of the aforementioned edge-fog network.

The UEs 721 and IoT devices 711 may be configured to connect, for example, communicatively couple, with Radio Access Network (RAN) including one or more of the ANs 731, 732, and/or 733. In embodiments, the RAN may be an NG RAN or a 5G RAN, an E-UTRAN, or a legacy RAN, such as a UTRAN or GERAN. As used herein, the term "NG RAN" may refer to a RAN that operates in an NR or 5G system, and the term "E-UTRAN" or the like may refer to a RAN that operates in an LTE or 4G system. The UEs 721 and IoT devices 711 may utilize respective connections (or channels) 703, respectively, each of which comprises a physical communications interface or layer. In this example, the connections 703 are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein.

In embodiments, the UEs 721 and IoT devices 711 may further directly exchange communication data via respective direct interfaces (or links) 705. In some implementations the interfaces 705 may be a WiFi based link or a personal area network (PAN) based link (e.g., IEEE 802.15.4 based protocols including ZigBee, IPv6 over Low power Wireless Personal Area Networks (6LoWPAN), WirelessHART, MiWi, Thread, etc.; WiFi-direct; Bluetooth/Bluetooth Low Energy (BLE) protocols). In other implementations, the interface 705 may be an LTE/NR Proximity Services (ProSe) link or PC5 interface.

According to various embodiments, the UEs 721 and IoT devices 711 and the RAN nodes 731/732 communicate data (e.g., transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band. To operate in the unlicensed spectrum, the UEs 721 and IoT devices 711 and the RAN nodes 731/732 may operate using LAA, enhanced LAA (eLAA), and/or further eLAA (feLAA) mechanisms. In these implementations, the UEs 721 and IoT devices 711 and the RAN nodes 731/732 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol. LBT is a mechanism whereby equipment (e.g., UEs 721 and IoT devices 711, RAN nodes 731/732, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

The UE 721b is shown to be configured to access an access point (AP) 733 via a connection 707. The connection 707 can comprise a local wireless connection, such as a connection consistent with any IEEE 802.11 protocol, wherein the AP 733 would comprise a wireless fidelity (WiFi®) router. In this example, the AP 733 is shown to be connected to the Internet without connecting to the CN 742 of the wireless system. In various embodiments, the UE 721b, RAN nodes 731/732, and AP 733 may be configured to utilize LWA operation and/or LWIP operation. The LWA operation may involve the UE 721b being configured by a RAN node 721/732 to utilize radio resources of LTE/NR and WLAN. LWIP operation may involve the UE 721b using WLAN radio resources (e.g., connection 707) via IPsec protocol tunneling to authenticate and encrypt packets (e.g., IP packets) sent over the connection 707. IPsec tunneling includes encapsulating the entirety of original IP packets and adding a new packet header, thereby protecting the original header of the IP packets.

The RAN can include one or more AN nodes or RAN nodes 731 and 732 (collectively referred to as "RAN nodes" or "RAN node") that enable the connections 703. As used herein, the terms "access node," "access point," or the like may describe equipment that provides the radio baseband functions for data and/or connectivity between a network and one or more users. The network may be a cellular network, a wireless LAN, or any other like network.

In this example, the RAN node 731 is embodied as a NodeB, evolved NodeB (eNB), or a next generation NodeB (gNB), and the RAN nodes 732 are embodied as Road Side Unites (RSUs). Any other type of ANs can be used, and the ANs may comprise ground stations (e.g., terrestrial access points) or satellite stations providing coverage within a geographic area (e.g., a cell). As used herein, the term "NG RAN node" or the like may refer to a RAN node 711 that operates in an NR or 5G system (for example, a gNB), and the term "E-UTRAN node" or the like may refer to a RAN node 731 that operates in an LTE or 4G system (e.g., an eNB). According to various embodiments, the RAN nodes 731 may be implemented as one or more of a dedicated physical device such as a macrocell base station, and/or a low power base station for providing femtocells, picocells or other like cells having smaller coverage areas, smaller user capacity, or higher bandwidth compared to macrocells.

In some embodiments, all or parts of the RAN nodes 731/732 may be implemented as one or more software entities running on server computers as part of a virtual network, which may be referred to as a cloud RAN (CRAN) and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes 731/732; a MAC/PHY split wherein RRC, PDCP, RLC, and MAC layers are operated by the CRAN/vBBUP and the PHY layer is operated by individual RAN nodes 731/732; or a "lower PHY" split wherein RRC, PDCP, RLC, MAC layers and upper portions of the PHY layer are operated by the CRAN/vBBUP and lower portions of the PHY layer are operated by individual RAN nodes 731/732. This virtualized framework allows the freed-up processor cores of the RAN nodes 731/732 to perform other virtualized applications. In some implementations, an individual RAN node 721/732 may represent individual gNB-DUs that are connected to a gNB-CU via individual interfaces (not shown by FIG. 7). In these implementations, the gNB-DUs include one or more remote radio heads or RFEMs (see, e.g., FIGS. 13-14 infra), and the gNB-CU may be operated by a server that is located in the RAN (not shown) or by a server pool in a similar manner as the CRAN/vBBUP. Additionally or alternatively, one or more of the RAN nodes 731/732 may be next generation eNBs (ng-eNBs), which are RAN nodes 731/732 that provide E-UTRA user plane and control plane protocol terminations toward the UEs 721, and are connected to a 5GC via an NG interface.

Any of the RAN nodes 731/732 can terminate the air interface protocol and can be the first point of contact for the UEs 721 and IoT devices 711. In some embodiments, any of the RAN nodes 731/732 can fulfill various logical functions for the RAN including, but not limited to, radio network controller (RNC) functions such as radio bearer management, uplink and downlink dynamic radio resource management and data packet scheduling, and mobility management. In embodiments, the UEs 721 and IoT devices 711 can be configured to communicate using OFDM communication signals with each other or with any of the RAN nodes 731/732 over a multicarrier communication channel in accordance with various communication techniques, such as, but not limited to, an OFDMA communication technique (e.g., for downlink communications) and/or an SC-FDMA communication technique (e.g., for uplink and ProSe or sidelink communications), although the scope of the embodiments is not limited in this respect.

The RAN nodes 731/732 may be configured to communicate with one another via respective interfaces or links (not shown), such as an X2 interface for LTE implementations (e.g., when CN 742 is an Evolved Packet Core (EPC)), an Xn interface for 5G or NR implementations (e.g., when CN 742 is an Fifth Generation Core (5GC)), or the like.

The ANs 731 and 732 are communicatively coupled to CN 742. In embodiments, the CN 742 may be an evolved packet core (EPC) network, a NextGen Packet Core (NPC) network, a 5G core (5GC), or some other type of CN. The CN 742 may comprise a plurality of network elements, which are configured to offer various data and telecommunications services to customers/subscribers (e.g., users of UEs 721 and IoT devices 711) who are connected to the CN 742 via a RAN. The components of the CN 742 may be implemented in one physical node or separate physical nodes including components to read and execute instructions from a machine-readable or computer-readable medium (e.g., a non-transitory machine-readable storage medium). In some embodiments, Network Functions Virtualization (NFV) may be utilized to virtualize any or all of the above-described network node functions via executable instructions stored in one or more computer-readable storage mediums (described in further detail infra). A logical instantiation of the CN 742 may be referred to as a network slice, and a logical instantiation of a portion of the CN 742 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more CN 742 components/functions.

The CN 742 is shown to be communicatively coupled to an application server 750 and a network 750 via an IP communications interface 755. the one or more server(s) 750 comprise one or more physical and/or virtualized systems for providing functionality (or services) to one or more clients (e.g., UEs 721 and IoT devices 711) over a network (e.g., cloud 744). The server(s) 750 may include various computer devices with rack computing architecture component(s), tower computing architecture component(s), blade computing architecture component(s), and/or the like. The server(s) 750 may represent a cluster of servers, a server farm, a cloud computing service, or other grouping or pool of servers, which may be located in one or more datacenters. The server(s) 730 may also be connected to, or otherwise associated with one or more data storage devices (not shown). Moreover, the server(s) 750 may include an operating system (OS) that provides executable program instructions for the general administration and operation of the individual server computer devices, and may include a computer-readable medium storing instructions that, when executed by a processor of the servers, may allow the servers to perform their intended functions. Suitable implementations for the OS and general functionality of servers are known or commercially available, and are readily implemented by persons having ordinary skill in the art. Generally, the server(s) 750 offer applications or services that use IP/network resources. As examples, the server(s) 750 may provide traffic management services, cloud analytics, content streaming services, immersive gaming experiences, social networking and/or microblogging services, and/or other like services. In addition, the various services provided by the server(s) 750 may include initiating and controlling software and/or firmware updates for applications or individual components implemented by the UEs 721 and IoT devices 711. The server(s) 750 can also be configured to support one or more communication services (e.g., Voice-over-Internet Protocol (VoIP) sessions, PTT sessions, group communication sessions, social networking services, etc.) for the UEs 721 and IoT devices 711 via the CN 742.

The cloud 744 may represent a cloud computing service, the Internet, a local area network (LAN) or a wide area network (WAN) including proprietary and/or enterprise networks for a company or organization, or combinations thereof. The cloud 744 may be a network that comprises computers, network connections among the computers, and software routines to enable communication between the computers over network connections. In this regard, the cloud 744 comprises one or more network elements that may include one or more processors, communications systems (e.g., including network interface controllers, one or more transmitters/receivers connected to one or more antennas, etc.), and computer readable media. Examples of such network elements may include wireless access points (WAPs), home/business servers (with or without RF communications circuitry), routers, switches, hubs, radio beacons, base stations, picocell or small cell base stations, backbone gateways, and/or any other like network device. Connection to the cloud 744 may be via a wired or a wireless connection using the various communication protocols discussed infra. More than one network may be involved in a communication session between the illustrated devices. Connection to the cloud 744 may require that the computers execute software routines which enable, for example, the seven layers of the OSI model of computer networking or equivalent in a wireless (cellular) phone network. Cloud 744 may be used to enable relatively long-range communication such as, for example, between the one or more server(s) 750 and one or more UEs 721 and IoT devices 711. In some embodiments, the cloud 744 may represent the Internet, one or more cellular networks, local area networks, or wide area networks including proprietary and/or enterprise networks, Transfer Control Protocol (TCP)/Internet Protocol (IP)-based network, or combinations thereof. In such embodiments, the cloud 744 may be associated with network operator who owns or controls equipment and other elements necessary to provide network-related services, such as one or more base stations or access points, one or more servers for routing digital data or telephone calls (e.g., a core network or backbone network), etc. The backbone links 755 may include any number of wired or wireless technologies, and may be part of a local area network (LAN), a wide area network (WAN), or the Internet. In one example, the backbone links 755 are fiber backbone links that couple lower levels of service providers to the Internet, such as the CN 742 and cloud 744.

In some embodiments, at least some of the edge nodes 720 may include or be part of a MEC system 735. The term "MEC system" refers to a collection of MEC hosts (or MEC servers) and MEC management necessary to run MEC applications. The MEC system 735 includes a collection of MEC servers 736 (including MEC server 736a and MEC server 736b in FIG. 7) and MEC management systems (not shown by FIG. 7) necessary to run MEC applications (e.g., MEAs 1336 of FIG. 13) within an operator network or a subset of an operator network. The MEC servers 736a, 736b, 736c (collectively referred to as "MEC servers 736" or "MEC server 736") are physical computer systems (e.g., server compute nodes) that include a MEC platform (e.g., MEP 1337 of FIG. 13) and a virtualization infrastructure (e.g., VI 1338 of FIG. 13), and provide compute, storage, and network resources to MEC applications. The MEC servers 736 may also be referred to as "MEC hosts 736" or "edge servers." In various embodiments, the MEC servers 736 correspond to the MSP servers 136 of FIG. 1. The VI of the MEC servers 736 provide virtualized environments and virtualized resources (e.g., "virtualized infrastructure") for the MEC hosts 736, and the MEC applications may run as virtual machines (VMs) and/or application containers on top of the VI. The components and/or entities of the MEC system 735 are discussed in more detail infra with respect to FIGS. 13-15.

As shown by FIG. 7, each of the (R)AN nodes 721/732 and AP 733 are co-located with MEC servers 736a, 736b, and 736c, respectively. These implementations may be small-cell clouds (SCCs) where a MEC server 736 is co-located with a small cell (e.g., pico-cell, femto-cell, etc.), or may be mobile micro clouds (MCCs) where a MEC server 736 is co-located with a macrocell (e.g., an eNB, gNB, etc.). The MEC servers 736 may be deployed in a multitude of arrangements other than as shown by FIG. 7. In a first example, the MEC servers 736 may be co-located or operated by RNCs, which may be the case for legacy network deployments, such as 3G networks. In a second example, the MEC servers 736 may be deployed at cell aggregation sites or at multi-RAT aggregation points that can be located either within an enterprise or used in public coverage areas. In a third example, the MEC servers 736 may be deployed at the edge of CN 742. These implementations may be used in follow-me clouds (FMC), where cloud services running at distributed data centers follow the UEs 721 as they roam throughout the network.

Figure 8:
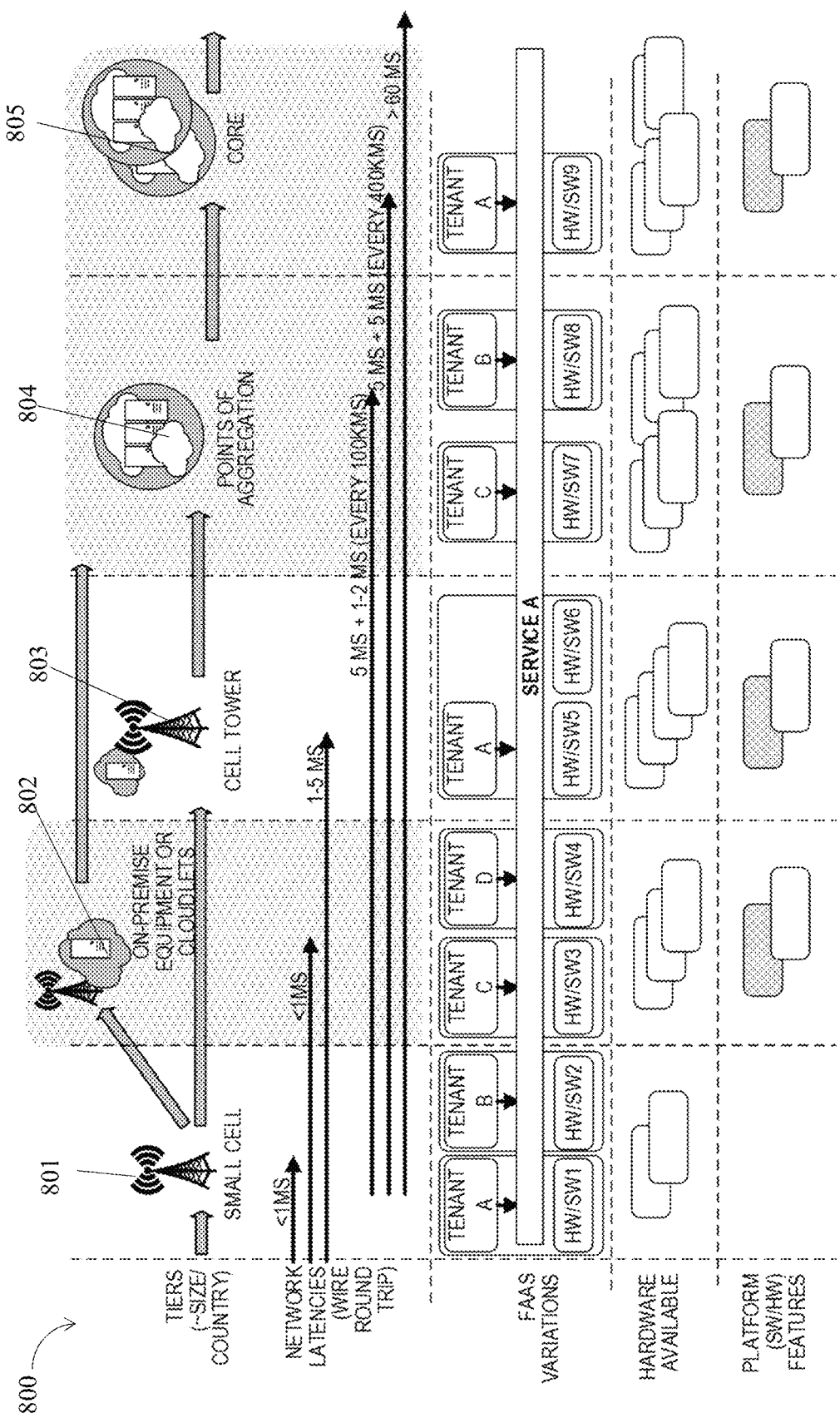
FIG. 8 illustrates an example MEC hosting architecture based on differential latency capability, in accordance with various embodiments.

FIG. 8 illustrates an example MEC hosting architecture based on differential latency capability, in accordance with various embodiments.

In embodiments, the MEC hosting architecture 800 includes various devices, e.g., a small cell 801, an on premise equipment or a cloudlet 802, a cell tower 803, points of aggregation 804, disposed at edges of a network, and core network servers 805. Any of the devices, e.g., the small cell 801, the on premise equipment or the cloudlet 802, the cell tower 803, the points of aggregation 804, disposed at edges of a network, or the core network servers 805 can be an example of a service provider, e.g., the service provider 121 or the service provider 125, as shown in FIG. 1. Different devices are located in different locations with various latency costs associated with scheduling choices, e.g., ranging from less than 1 ms for the small cells, disposed at edges of a network, to more than 60 ms for the core network servers. A selection of a server to perform a function is in consideration of the function needed, scheduling latency, computational latency and data localization. For example, the latency associated with scheduling is added to the latency associated with performing the function at a particular server. Large compute intensive workloads may perform better on core servers as scheduling latency becomes a small percentage of overall cost. However, small compute tasks occurring frequently may prefer the small cell or base station server because scheduling latency becomes the dominant resource constraint. Service hosting environments (801-805) may partition hosting resources according to tenant isolation and trustworthiness requirements that may further be reflected in service or trust level agreements with the UE. Tenant isolation technology may include containers (i.e. Kubernetes, Kata Containers, Linux namespaces etc. . . . ), virtual machines (e.g. Intel VT-x), secure enclaves (e.g. Intel SGX), physical partitioning, secure offload (e.g. Intel CSME/ME), accelerators (e.g. GPU, FPGA or ASIC) and the like.

Figure 9:
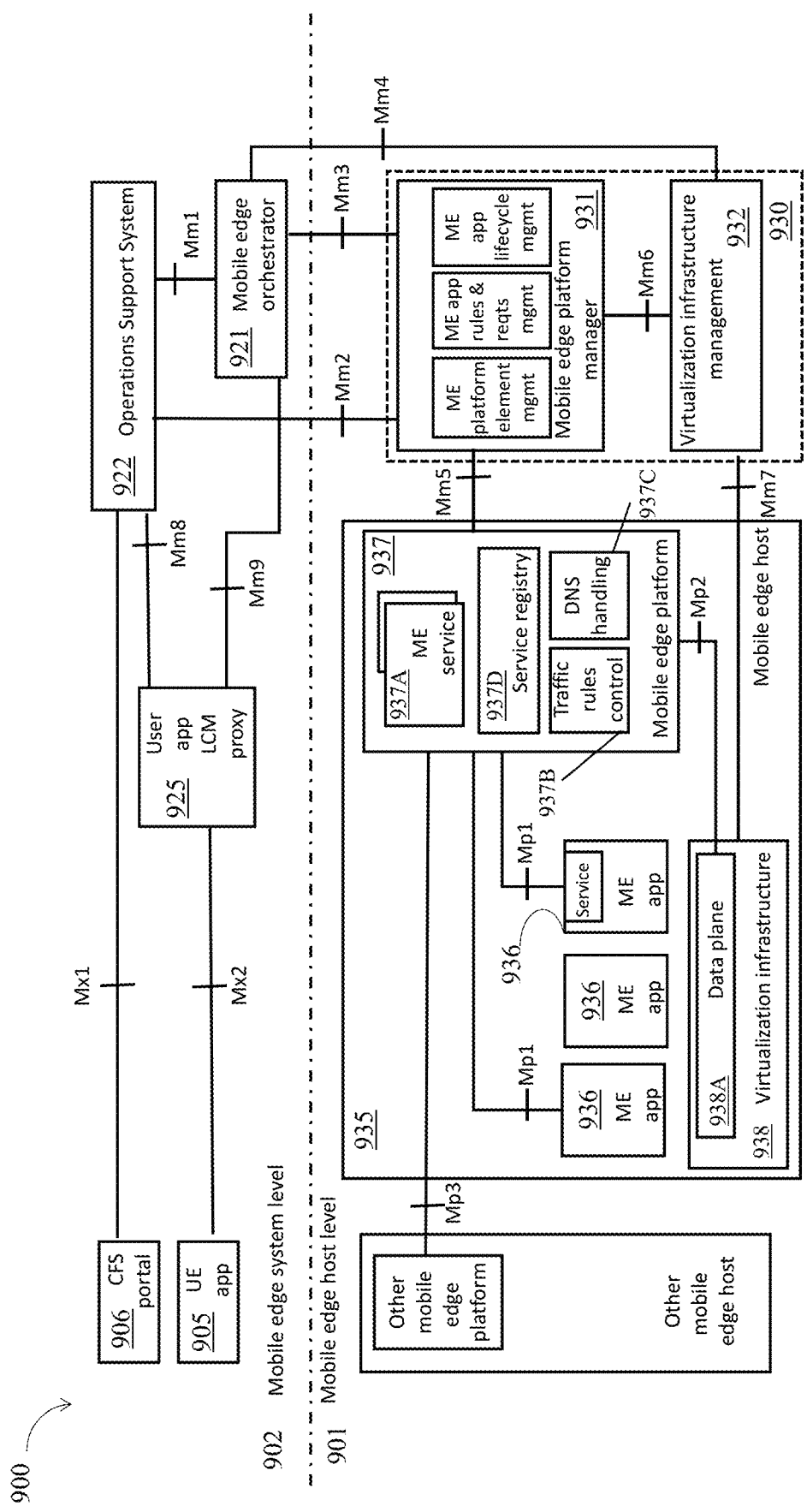
FIG. 9 illustrates an example MEC system architecture, in accordance with various embodiments.

FIG. 9 illustrates an example MEC system architecture 900 in accordance with various embodiments. The MEC system 900 may be an example of aspects of the MEC system 100, and may include a mobile edge host level 901 and a mobile edge system level 902. The mobile edge host level 901 may include mobile edge hosts 935 and mobile edge management 930, which provide functionality to run mobile edge applications (ME apps) 936 within an operator network or a subset of an operator network.

The mobile edge host 935 may be an entity that contains a mobile edge platform 937 and a virtualization infrastructure 938 which provides compute, storage, and network resources, for the purpose of running ME apps 936. The virtualization infrastructure 938 includes a data plane 938A that executes the traffic rules received by the mobile edge platform, and routes the traffic among applications (e.g., ME apps 936), ME services 937A, DNS server/proxy (see e.g., via DNS handling entity 937C), and 3GPP network, local networks, and external networks.

The mobile edge platform 937 within the mobile edge host 935 may be a collection of essential functionalities required to run ME apps 936 on a particular virtualization infrastructure 938 and enable them to provide and consume mobile edge services 937A. The mobile edge platform 937 can also provide various services and/or functions, such as offering an environment where the ME apps 936 can discover, advertise, consume and offer mobile edge services 937A (discussed infra), including mobile edge services available via other platforms when supported. The mobile edge platform 937 may receive traffic rules from the mobile edge platform manager 931, applications, or services, and instruct the data plane accordingly (see e.g., Traffic Rules Control 937B). The mobile edge platform 937 may send instructions to the data plane 938A within the virtualization infrastructure 938 via the Mp2 reference point. The Mp2 reference point between the mobile edge platform 937 and the data plane 938A of the virtualization infrastructure 938 may be used to instruct the data plane 938A on how to route traffic among applications, networks, services, etc. In some implementations, the mobile edge platform 937 may translate tokens representing UEs in the traffic rules into specific internet protocol (IP) addresses. The mobile edge platform 937 may also receive DNS records from the mobile edge platform manager 931 and configure a DNS proxy/server accordingly. The mobile edge platform 937 may host mobile edge services 937A including the mobile edge services discussed infra, and provide access to persistent storage and time of day information. Furthermore, the mobile edge platform may communicate with other mobile edge platforms via the Mp3 reference point.

Mobile edge applications (ME apps) 936 are instantiated on the virtualization infrastructure 938 of the mobile edge host 935 based on configuration or requests validated by the mobile edge management 930. ME apps 936 may run as virtual machines (VM) on top of the virtualization infrastructure 938 provided by the mobile edge host 935, and can interact with the mobile edge platform 937 to consume and provide mobile edge services 937A. In some embodiments, the ME apps 936 can also interact with the mobile edge platform 937 to perform certain support procedures related to the lifecycle of the ME apps 936, such as indicating availability, preparing relocation of user state, etc. The ME apps 936 may have a certain number of rules and requirements associated to them, such as required resources, maximum latency, required or useful services, etc. These requirements may be validated by the mobile edge system level management 930, and can be assigned to default values if missing.

A mobile edge service (ME service) 937A is a service provided and consumed either by the mobile edge platform 937 or a mobile edge application 936. When provided by an application, it can be registered in the list of services 937D to the mobile edge platform 937 over the Mp1 reference point. Additionally, the ME apps 936 can subscribe to one or more services 937A for which it is authorized over the Mp1 reference point.

As shown by FIG. 9, the Mp1 reference point is between the mobile edge platform 937 and the ME apps 936. The Mp1 reference point may provide service registration 937D, service discovery, and communication support for various services, such as the mobile edge services 937A. In addition, the Mp1 interface may provide application availability, session state relocation support procedures, traffic rules and DNS rules activation, access to persistent storage and time of day information, and/or the like. The Mp1 reference point may be used for consuming and providing service specific functionality.

Examples of ME services 937A may include radio network information services, location services, and bandwidth management services. Radio network information services, when available, may provide authorized ME apps 936 with radio network related information, and expose appropriate up-to-date radio network information to the ME apps 936. The radio network information may include, inter alia, radio network conditions, measurement and statistics information related to the user plane, information (e.g., UE context and radio access bearers) related to UEs served by the radio node(s) associated with the mobile edge host, changes on information related to UEs served by the radio node(s) associated with the mobile edge host, and/or the like. The radio network information may be provided at the relevant granularity (e.g., per UE, per cell, per period of time).

The location services, when available, may provide authorized ME apps with location-related information, and expose such information to the ME apps. The location information may include, inter alia, the location of specific UEs currently served by the radio node(s) associated with the mobile edge host, information about the location of all UEs currently served by the radio node(s) associated with the mobile edge host, information about the location of a certain category of UEs currently served by the radio node(s) associated with the mobile edge host, a list of UEs in a particular location, information about the location of all radio nodes currently associated with the mobile edge host, and/or the like. The location information may be in the form of a geolocation, a Global Navigation Satellite Service (GNSS) coordinate, a Cell identity (ID), and/or the like.

The bandwidth manager services may allow allocation of bandwidth to certain traffic routed to and from ME apps and the prioritization of certain traffic.

Referring back to FIG. 9, the mobile edge management comprises mobile edge system level management and the mobile edge host level management. The mobile edge host level management comprises the mobile edge platform manager 931 and the virtualization infrastructure manager 932, and handles the management of the mobile edge specific functionality of a particular mobile edge host 935 and the applications running on it.

The mobile edge platform manager 931 is responsible for the following functions: managing the life cycle of applications including informing the mobile edge orchestrator 921 of relevant application related events; providing element management functions to the mobile edge platform 937; managing the application rules and requirements including service authorizations, traffic rules, DNS configuration and resolving conflicts. The mobile edge platform manager 931 also receives virtualized resources fault reports and performance measurements from the virtualization infrastructure manager 932 for further processing.

The Mm5 reference point between the mobile edge platform manager 931 and the mobile edge platform 937 is used to perform platform configuration, configuration of the application rules and requirements, application lifecycle support procedures, management of application relocation, etc.

The virtualization infrastructure manager 932 may be an entity that allocates, manages and releases virtualized (compute, storage and networking) resources of the virtualization infrastructure 938, and prepares the virtualization infrastructure 938 to run a software image. To do so, the virtualization infrastructure manager 932 may communicate with the virtualization infrastructure 938 over the Mm7 reference point between the virtualization infrastructure manager 932 and the virtualization infrastructure 938. Preparing the virtualization infrastructure 938 may include configuring the virtualization infrastructure 938, and receiving/storing the software image. When supported, the virtualization infrastructure manager 932 may provide rapid provisioning of applications, such as described in "Openstack++ for Cloudlet Deployments", available at http://reports-archive.adm.cs.cmu.edu/anon/2015/CMU-CS-15-123.pdf.

The virtualization infrastructure manager 932 may also collect and report performance and fault information about the virtualized resources, and perform application relocation when supported. For application relocation from/to external cloud environments, the virtualization infrastructure manager 932 may interact with an external cloud manager to perform the application relocation, for example using the mechanism described in "Adaptive VM Handoff Across Cloudlets", and/or possibly through a proxy. Furthermore, the virtualization infrastructure manager 932 may communicate with the mobile edge platform manager 931 via the Mm6 reference point, which may be used to manage virtualized resources, for example, to realize the application lifecycle management. Moreover, the virtualization infrastructure manager 932 may communicate with the mobile edge orchestrator 921 via the Mm4 reference point, which may be used to manage virtualized resources of the mobile edge host 935, and to manage application images. Managing the virtualized resources may include tracking available resource capacity, etc.

The mobile edge system level management includes the mobile edge orchestrator 921 as a core component, which has an overview of the complete mobile edge system 900. The mobile edge orchestrator 921 may maintain an overall view of the mobile edge system 900 based on deployed mobile edge hosts 935, available resources, available mobile edge services 937A, and topology. The Mm3 reference point between the mobile edge orchestrator 921 and the mobile edge platform manager 930 may be used for the management of the application lifecycle, application rules and requirements and keeping track of available mobile edge services 937A. The mobile edge orchestrator 921 may communicate with the user application lifecycle management proxy 925 via the Mm9 reference point in order to manage ME apps 936 requested by UE application 905.

The mobile edge orchestrator 921 may also be responsible for on-boarding of application packages, including checking the integrity and authenticity of the packages, validating application rules and requirements and if necessary adjusting them to comply with operator policies, keeping a record of on-boarded packages, and preparing the virtualization infrastructure manager(s) 932 to handle the applications. The mobile edge orchestrator 921 may select appropriate mobile edge host(s) 935 for application instantiation based on constraints, such as latency, available resources, and available services. The mobile edge orchestrator 921 may trigger application instantiation and termination, as well as trigger application relocation as needed and when supported.

The Operations Support System (OSS) 922 refers to the OSS of an operator that receives requests via the Customer Facing Service (CFS) portal 906 (and over the Mx1 reference point) and from UE applications 905 for instantiation or termination of ME apps 936, and decides on the granting of these requests. The CFS portal 906 (and the Mx1 interface) may be used by third-parties to request the mobile edge system 900 to run applications 906 in the mobile edge system 900. Granted requests are forwarded to the mobile edge orchestrator 921 for further processing. When supported, the OSS 922 also receives requests from UE applications 905 for relocating applications between external clouds and the mobile edge system 900. The Mm2 reference point between the OSS 922 and the mobile edge platform manager 930 is used for the mobile edge platform 930 configuration, fault and performance management. The Mm1 reference point between the mobile edge orchestrator 921 and the OSS 922 is used for triggering the instantiation and the termination of mobile edge applications 936 in the mobile edge system 900.

The user application lifecycle management proxy ("user app LCM proxy") 925 may authorize requests from UE applications 905 in the UE and interacts with the OSS 922 and the mobile edge orchestrator 921 for further processing of these requests. The user app LCM proxy 925 may interact with the OSS 922 via the Mm8 reference point, and is used to handle UE applications 905 requests for running applications in the mobile edge system 900. A user application 905 may be an ME app 936 that is instantiated in the mobile edge system 900 in response to a request of a user via an application running in the UE (e.g., UE application 905). The user app LCM proxy 925 allows UE applications 905 to request on-boarding, instantiation, termination of user applications and when supported, relocation of user applications in and out of the mobile edge system 900. It also allows informing the UE applications 905 about the state of the user applications 905. The user app LCM proxy 925 is only accessible from within the mobile network, and may only be available when supported by the mobile edge system 900. A UE application 905 may use the Mx2 reference point between the user app LCM proxy 925 and the UE application 905 to request the mobile edge system 900 to run an application in the mobile edge system 900, or to move an application in or out of the mobile edge system 900. The Mx2 reference point may only be accessible within the mobile network and may only be available when supported by the mobile edge system.

Figure 10A:
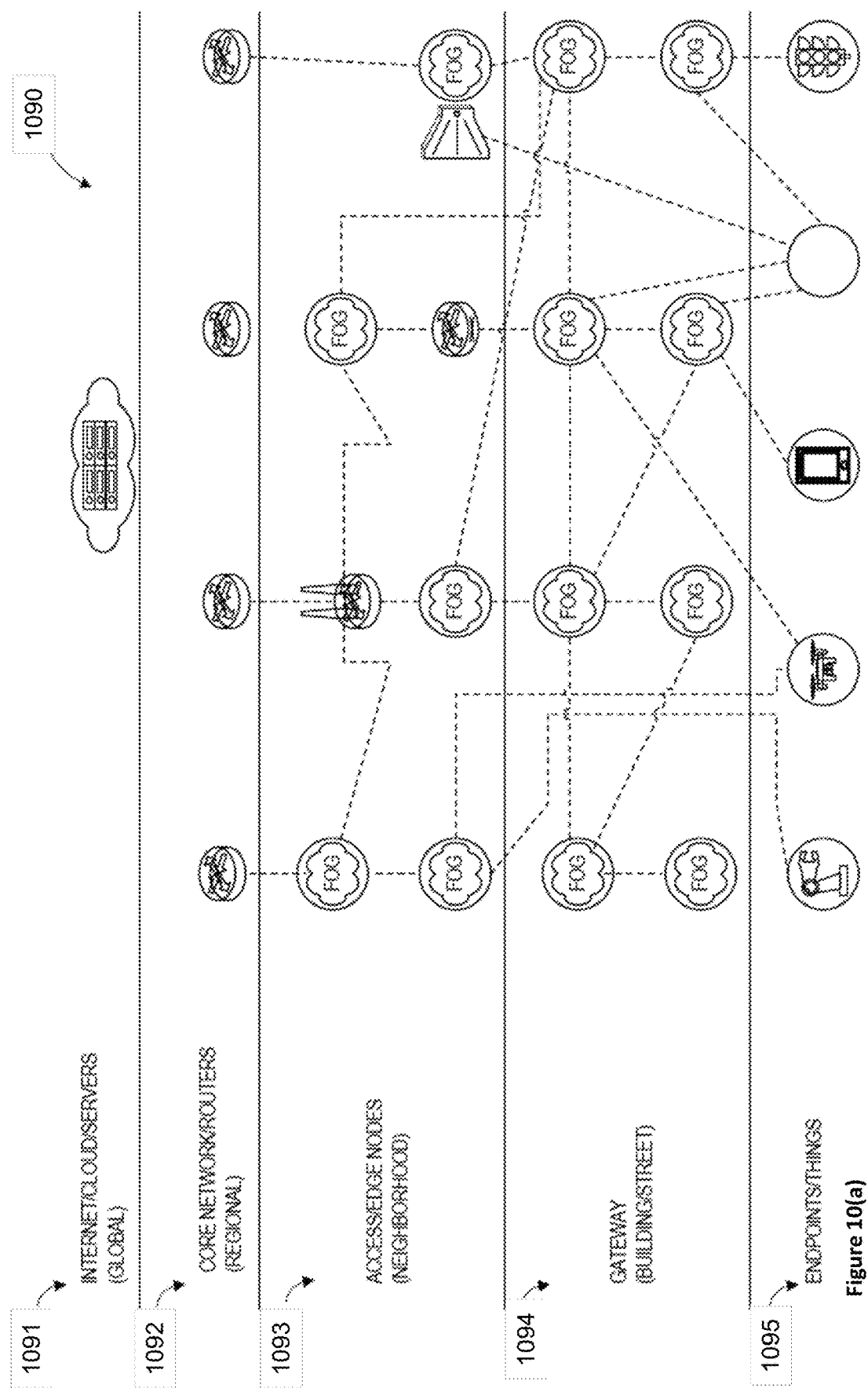
FIGS. 10(a)-10(b) illustrate a MEC and FOG network topology and an example cellular communications system architecture of a network, in accordance with various embodiments.
Figure 10B:
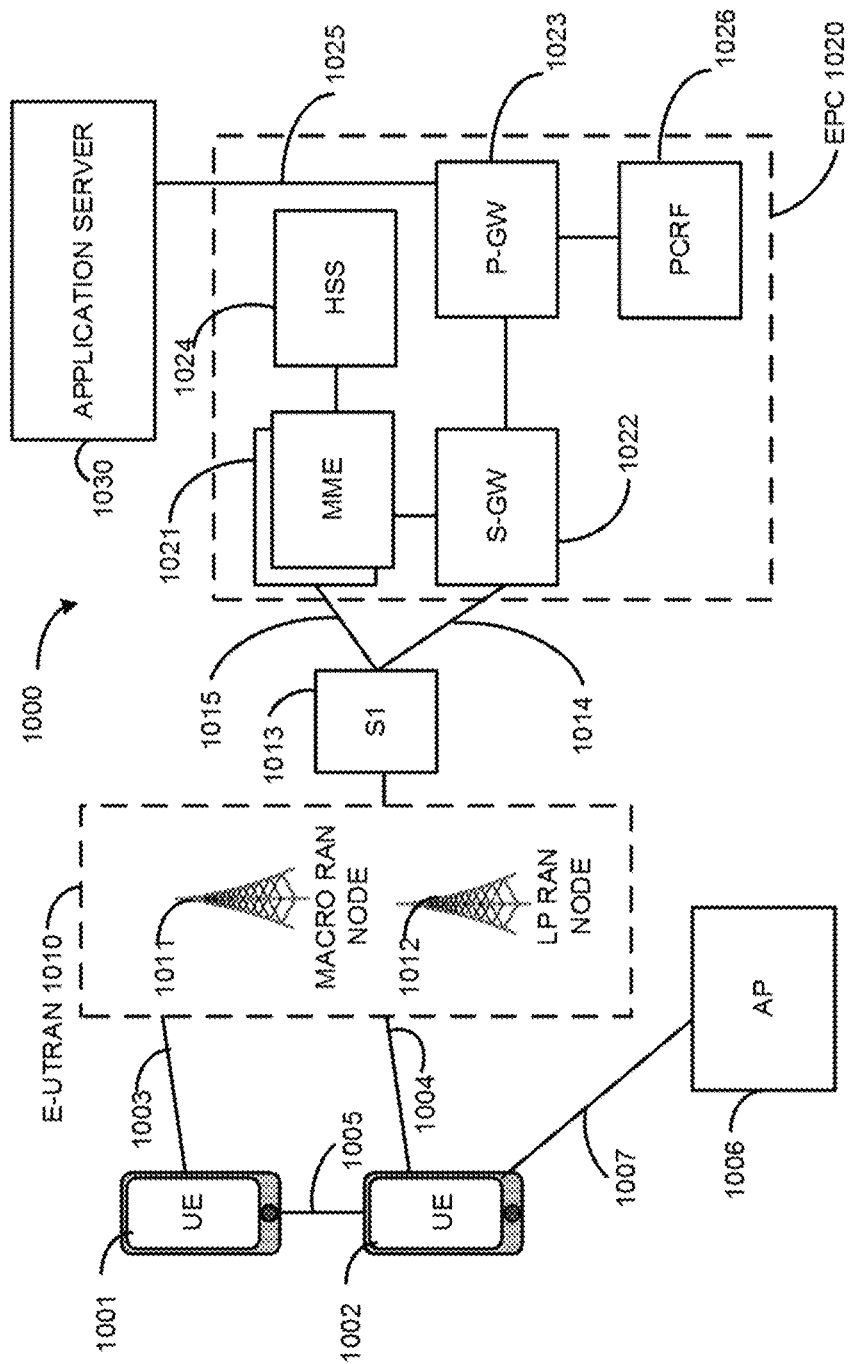

FIGS. 10(a)-10(b) illustrate a MEC and FOG network topology and an example cellular communications system architecture of a network, in accordance with various embodiments.

FIG. 10(a) illustrates a MEC and FOG network topology 1090 according to an example embodiment. Referring to FIG. 10(a), the network topology 1090 can include a number of conventional networking layers, may be extended through use of the various embodiments discussed herein. Specifically, the relationships between endpoints (at endpoints/things network layer 1095), gateways (at gateway layer 1094), access or edge computing nodes (e.g., at neighborhood nodes layer 1093), core network or routers 1092 (e.g., at regional or central office layer 1092), and internet or cloud or servers 1091, may be represented through the use of data communicated via MEC systems/hosts located at various nodes within the topology 1090.

A FOG network (e.g., established at gateway layer 1094) may represent a dense geographical distribution of near-user edge devices (e.g., FOG nodes), equipped with storage capabilities (e.g., to avoid the need to store data in cloud data centers), communication capabilities (e.g., rather than routed over the internet backbone), control capabilities, configuration capabilities, measurement and management capabilities (rather than controlled primarily by network gateways such as those in the LTE core network), among others. In this context, FIG. 10(a) illustrates a general architecture that integrates a number of MEC and FOG nodes—categorized in different layers (based on their position, connectivity and processing capabilities, etc.), with each node implementing the various embodiments discussed herein that can enable a MEC app or other entity of a MEC enabled node to communicate with other nodes. It will be understood, however, that such FOG nodes may be replaced or augmented by edge computing processing nodes.

FOG nodes may be categorized depending on the topology and the layer where they are located. In contrast, from a MEC standard perspective, each FOG node may be considered as a MEC host, or a simple entity hosting a MEC app and a light-weighted MEC platform.

In an example, a MEC or FOG node may be defined as an application instance, connected to or running on a device (MEC host) that is hosting a MEC platform. Here, the application consumes MEC services and is associated to a MEC host in the system. The nodes may be migrated, associated to different MEC hosts, or consume MEC services from other (e.g., local or remote) MEC platforms.

FIG. 10(b) illustrates an architecture of a system 1000 of a network in accordance with some embodiments. The system 1000 is shown to include a user equipment (UE) 1001 and a UE 1002. The UEs 1001 and 1002 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 1001 and 1002 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 1001 and 1002 may be configured to connect, e.g., communicatively couple, with a radio access network (RAN) 1010—the RAN 1010 may be, for example, an Evolved Universal Mobile Telecommunications System (UMTS) Terrestrial Radio Access Network (E-UTRAN), a NextGen RAN (NG RAN), or some other type of RAN. The UEs 1001 and 1002 utilize connections 1003 and 1004, respectively, each of which comprises a physical communications interface or layer (discussed in further detail below); in this example, the connections 1003 and 1004 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 1001 and 1002 may further directly exchange communication data via a ProSe interface 1005. The ProSe interface 1005 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH). In various implementations, the SL interface 1005 may be used in vehicular applications and communications technologies, which are often referred to as V2X systems. V2X is a mode of communication where UEs (for example, UEs 1001 and 1002) communicate with each other directly over the PC5/SL interface 1005 and can take place when the UEs 1001 and 1002 are served by RAN nodes 1011/1012 or when one or more UEs are outside a coverage area of the RAN 1010. V2X may be classified into four different types: vehicle-to-vehicle (V2V), vehicle-to-infrastructure (V2I), vehicle-to-network (V2N), and vehicle-to-pedestrian (V2P). These V2X applications can use "cooperative awareness" to provide more intelligent services for end-users. For example, vUEs 1001/1002, RAN nodes 1011/1012, application servers, and pedestrian UEs, may collect knowledge of their local environment (for example, information received from other vehicles or sensor equipment in proximity) to process and share that knowledge in order to provide more intelligent services, such as cooperative collision warning, autonomous driving, and the like. In these implementations, the UEs 1001 and 1002 may be implemented/employed as Vehicle Embedded Communications Systems (VECS) or VUEs.

The UE 1002 is shown to be configured to access an access point (AP) 1006 via connection 1007. The connection 1007 can comprise a local wireless connection, such as a connection consistent with any IEEE 802.11 protocol, wherein the AP 1006 would comprise a wireless fidelity (WiFi®) router. In this example, the AP 1006 is shown to be connected to the Internet without connecting to the core network of the wireless system (described in further detail below).

The RAN 1010 can include one or more access nodes that enable the connections 1003 and 1004. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 1010 may include one or more RAN nodes for providing macrocells, e.g., macro RAN node 1011, and one or more RAN nodes for providing femtocells or picocells (e.g., cells having smaller coverage areas, smaller user capacity, or higher bandwidth compared to macrocells), e.g., low power (LP) RAN node 1012.

Any of the RAN nodes 1011 and 1012 can terminate the air interface protocol and can be the first point of contact for the UEs 1001 and 1002. In some embodiments, any of the RAN nodes 1011 and 1012 can fulfill various logical functions for the RAN 1010 including, but not limited to, radio network controller (RNC) functions such as radio bearer management, uplink and downlink dynamic radio resource management and data packet scheduling, and mobility management.

In accordance with some embodiments, the UEs 1001 and 1002 can be configured to communicate using Orthogonal Frequency-Division Multiplexing (OFDM) communication signals with each other or with any of the RAN nodes 1011 and 1012 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 1011 and 1012 to the UEs 1001 and 1002, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 1001 and 1002. The physical downlink control channel (PDCCH) may carry information about the transport format and resource allocations related to the PDSCH channel, among other things. It may also inform the UEs 1001 and 1002 about the transport format, resource allocation, and H-ARQ (Hybrid Automatic Repeat Request) information related to the uplink shared channel. Typically, downlink scheduling (assigning control and shared channel resource blocks to the UE 1002 within a cell) may be performed at any of the RAN nodes 1011 and 1012 based on channel quality information fed back from any of the UEs 1001 and 1002. The downlink resource assignment information may be sent on the PDCCH used for (e.g., assigned to) each of the UEs 1001 and 1002.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 1010 is shown to be communicatively coupled to a core network (CN) 1020—via an S1 interface 1013. In embodiments, the CN 1020 may be an evolved packet core (EPC) network, a NextGen Packet Core (NPC) network, or some other type of CN. In this embodiment the S1 interface 1013 is split into two parts: the S1-U interface 1014, which carries traffic data between the RAN nodes 1011 and 1012 and the serving gateway (S-GW) 1022, and the S1-mobility management entity (MME) interface 1015, which is a signaling interface between the RAN nodes 1011 and 1012 and MMEs 1021.

In this embodiment, the CN 1020 comprises the MMEs 1021, the S-GW 1022, the Packet Data Network (PDN) Gateway (P-GW) 1023, and a home subscriber server (HSS) 1024. The MMEs 1021 may be similar in function to the control plane of legacy Serving General Packet Radio Service (GPRS) Support Nodes (SGSN). The MMEs 1021 may manage mobility aspects in access such as gateway selection and tracking area list management. The HSS 1024 may comprise a database for network users, including subscription-related information to support the network entities' handling of communication sessions. The CN 1020 may comprise one or several HSSs 1024, depending on the number of mobile subscribers, on the capacity of the equipment, on the organization of the network, etc. For example, the HSS 1024 can provide support for routing/roaming, authentication, authorization, naming/addressing resolution, location dependencies, etc.

The S-GW 1022 may terminate the S1 interface 1013 towards the RAN 1010, and routes data packets between the RAN 1010 and the CN 1020. In addition, the S-GW 1022 may be a local mobility anchor point for inter-RAN node handovers and also may provide an anchor for inter-3GPP mobility. Other responsibilities may include lawful intercept, charging, and some policy enforcement.

The P-GW 1023 may terminate an SGi interface toward a PDN. The P-GW 1023 may route data packets between the EPC network 1023 and external networks such as a network including the application server 1030 (alternatively referred to as application function (AF)) via an Internet Protocol (IP) interface 1025. Generally, the application server 1030 may be an element offering applications that use IP bearer resources with the core network (e.g., UMTS Packet Services (PS) domain, LTE PS data services, etc.). In this embodiment, the P-GW 1023 is shown to be communicatively coupled to an application server 1030 via an IP communications interface 1025. The application server 1030 can also be configured to support one or more communication services (e.g., Voice-over-Internet Protocol (VoIP) sessions, PTT sessions, group communication sessions, social networking services, etc.) for the UEs 1001 and 1002 via the CN 1020.

The P-GW 1023 may further be a node for policy enforcement and charging data collection. Policy and Charging Enforcement Function (PCRF) 1026 is the policy and charging control element of the CN 1020. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 1026 may be communicatively coupled to the application server 1030 via the P-GW 1023. The application server 1030 may signal the PCRF 1026 to indicate a new service flow and select the appropriate Quality of Service (QoS) and charging parameters. The PCRF 1026 may provision this rule into a Policy and Charging Enforcement Function (PCEF) (not shown) with the appropriate traffic flow template (TFT) and QoS class of identifier (QCI), which commences the QoS and charging as specified by the application server 1030.

In embodiments, the UE 1001 or the UE 1002 may be an example of the UE 101, the macro RAN node 1011, the low power (LP) RAN node 1012, the AP 1006, the CN 1020 may be examples of the MEC orchestrator 110, the user agent 103, the service provider 121, the service provider 125, the decentralized contracting system 131, the database 133, the telemetry module 112, the security environment 132, the worker 122, as shown in FIG. 1.

Figure 11:
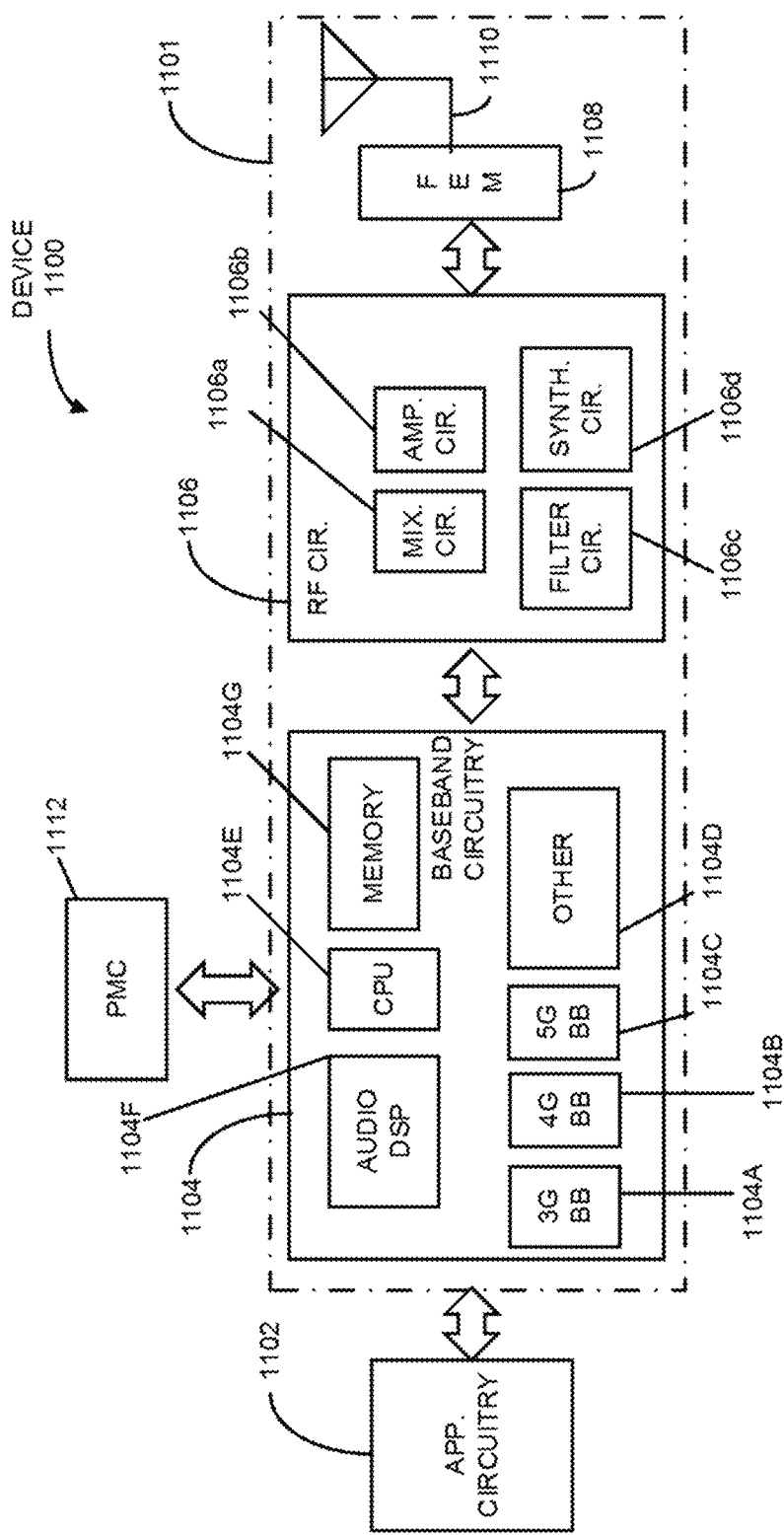
FIG. 11 illustrates an example component of an electronic device, in accordance with various embodiments.

FIG. 11 illustrates example components of a device 1100 in accordance with some embodiments. In some embodiments, the device 1100 may include application circuitry 1102, baseband circuitry 1104, Radio Frequency (RF) circuitry 1106, front-end module (FEM) circuitry 1108, one or more antennas 1110, and power management circuitry (PMC) 1112 coupled together at least as shown. The components of the illustrated device 1100 may be included in a UE or a RAN node. In some embodiments, the device 1100 may include less elements (e.g., a RAN node may not utilize application circuitry 1102, and instead include a processor/controller to process IP data received from an EPC). In some embodiments, the device 1100 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations). In embodiments, the device 1100 may implement functions of the MEC orchestrator 110, the user agent 103, the service provider 121, the service provider 125, the decentralized contracting system 131, the database 133, the telemetry module 112, the security environment 132, the worker 122, as shown in FIG. 1.

The application circuitry 1102 may include one or more application processors. For example, the application circuitry 1102 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 1100. In some embodiments, processors of application circuitry 1102 may process IP data packets received from an EPC. In some embodiments, the application circuitry 1102 may include the processor, memory, and/or storage discussed herein.

The baseband circuitry 1104 may include circuitry such as, but not limited to, one or more single-core or multi-core processors. The baseband circuitry 1104 may include one or more baseband processors or control logic to process baseband signals received from a receive signal path of the RF circuitry 1106 and to generate baseband signals for a transmit signal path of the RF circuitry 1106. Baseband processing circuitry 1104 may interface with the application circuitry 1102 for generation and processing of the baseband signals and for controlling operations of the RF circuitry 1106. For example, in some embodiments, the baseband circuitry 1104 may include a third generation (3G) baseband processor 1104A, a fourth generation (4G) baseband processor 1104B, a fifth generation (5G) baseband processor 1104C, or other baseband processor(s) 1104D for other existing generations, generations in development or to be developed in the future (e.g., second generation (2G), sixth generation (6G), etc.). The baseband circuitry 1104 (e.g., one or more of baseband processors 1104A-D) may handle various radio control functions that enable communication with one or more radio networks via the RF circuitry 1106. In other embodiments, some or all of the functionality of baseband processors 1104A-D may be included in modules stored in the memory 1104G and executed via a Central Processing Unit (CPU) 1104E. The radio control functions may include, but are not limited to, signal modulation/demodulation, encoding/decoding, radio frequency shifting, etc. In some embodiments, modulation/demodulation circuitry of the baseband circuitry 1104 may include Fast-Fourier Transform (FFT), precoding, or constellation mapping/demapping functionality. In some embodiments, encoding/decoding circuitry of the baseband circuitry 1104 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1104 may include one or more audio digital signal processor(s) (DSP) 1104F. The audio DSP(s) 1104F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1104 and the application circuitry 1102 may be implemented together such as, for example, on a system on a chip (SOC).

In some embodiments, the baseband circuitry 1104 may provide for communication compatible with one or more radio technologies. For example, in some embodiments, the baseband circuitry 1104 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 1104 is configured to support radio communications of more than one wireless protocol may be referred to as multi-mode baseband circuitry.

RF circuitry 1106 may enable communication with wireless networks using modulated electromagnetic radiation through a non-solid medium. In various embodiments, the RF circuitry 1106 may include switches, filters, amplifiers, etc. to facilitate the communication with the wireless network. RF circuitry 1106 may include a receive signal path which may include circuitry to down-convert RF signals received from the FEM circuitry 1108 and provide baseband signals to the baseband circuitry 1104. RF circuitry 1106 may also include a transmit signal path which may include circuitry to up-convert baseband signals provided by the baseband circuitry 1104 and provide RF output signals to the FEM circuitry 1108 for transmission.

In some embodiments, the receive signal path of the RF circuitry 1106 may include mixer circuitry 1106a, amplifier circuitry 1106b and filter circuitry 1106c. In some embodiments, the transmit signal path of the RF circuitry 1106 may include filter circuitry 1106c and mixer circuitry 1106a. RF circuitry 1106 may also include synthesizer circuitry 1106d for synthesizing a frequency for use by the mixer circuitry 1106a of the receive signal path and the transmit signal path. In some embodiments, the mixer circuitry 1106a of the receive signal path may be configured to down-convert RF signals received from the FEM circuitry 1108 based on the synthesized frequency provided by synthesizer circuitry 1106d. The amplifier circuitry 1106b may be configured to amplify the down-converted signals and the filter circuitry 1106c may be a low-pass filter (LPF) or band-pass filter (BPF) configured to remove unwanted signals from the down-converted signals to generate output baseband signals. Output baseband signals may be provided to the baseband circuitry 1104 for further processing. In some embodiments, the output baseband signals may be zero-frequency baseband signals, although this is not a requirement. In some embodiments, mixer circuitry 1106a of the receive signal path may comprise passive mixers, although the scope of the embodiments is not limited in this respect.

In some embodiments, the mixer circuitry 1106a of the transmit signal path may be configured to up-convert input baseband signals based on the synthesized frequency provided by the synthesizer circuitry 1106d to generate RF output signals for the FEM circuitry 1108. The baseband signals may be provided by the baseband circuitry 1104 and may be filtered by filter circuitry 1106c.

In some embodiments, the mixer circuitry 1106a of the receive signal path and the mixer circuitry 1106a of the transmit signal path may include two or more mixers and may be arranged for quadrature downconversion and upconversion, respectively. In some embodiments, the mixer circuitry 1106a of the receive signal path and the mixer circuitry 1106a of the transmit signal path may include two or more mixers and may be arranged for image rejection (e.g., Hartley image rejection). In some embodiments, the mixer circuitry 1106a of the receive signal path and the mixer circuitry 1106a may be arranged for direct downconversion and direct upconversion, respectively. In some embodiments, the mixer circuitry 1106a of the receive signal path and the mixer circuitry 1106a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1106 may include analog-to-digital converter (ADC) and digital-to-analog converter (DAC) circuitry and the baseband circuitry 1104 may include a digital baseband interface to communicate with the RF circuitry 1106.

In some dual-mode embodiments, a separate radio IC circuitry may be provided for processing signals for each spectrum, although the scope of the embodiments is not limited in this respect.

In some embodiments, the synthesizer circuitry 1106d may be a fractional-N synthesizer or a fractional N/N+1 synthesizer, although the scope of the embodiments is not limited in this respect as other types of frequency synthesizers may be suitable. For example, synthesizer circuitry 1106d may be a delta-sigma synthesizer, a frequency multiplier, or a synthesizer comprising a phase-locked loop with a frequency divider.

The synthesizer circuitry 1106d may be configured to synthesize an output frequency for use by the mixer circuitry 1106a of the RF circuitry 1106 based on a frequency input and a divider control input. In some embodiments, the synthesizer circuitry 1106d may be a fractional N/N+1 synthesizer.

In some embodiments, frequency input may be provided by a voltage controlled oscillator (VCO), although that is not a requirement. Divider control input may be provided by either the baseband circuitry 1104 or the applications processor 1102 depending on the desired output frequency. In some embodiments, a divider control input (e.g., N) may be determined from a look-up table based on a channel indicated by the applications processor 1102.

Synthesizer circuitry 1106d of the RF circuitry 1106 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1106d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1106 may include an IQ/polar converter.

FEM circuitry 1108 may include a receive signal path which may include circuitry configured to operate on RF signals received from one or more antennas 1110, amplify the received signals and provide the amplified versions of the received signals to the RF circuitry 1106 for further processing. FEM circuitry 1108 may also include a transmit signal path which may include circuitry configured to amplify signals for transmission provided by the RF circuitry 1106 for transmission by one or more of the one or more antennas 1110. In various embodiments, the amplification through the transmit or receive signal paths may be done solely in the RF circuitry 1106, solely in the FEM 1108, or in both the RF circuitry 1106 and the FEM 1108.

In some embodiments, the FEM circuitry 1108 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 1106). The transmit signal path of the FEM circuitry 1108 may include a power amplifier (PA) to amplify input RF signals (e.g., provided by RF circuitry 1106), and one or more filters to generate RF signals for subsequent transmission (e.g., by one or more of the one or more antennas 1110).

In some embodiments, the PMC 1112 may manage power provided to the baseband circuitry 1104. In particular, the PMC 1112 may control power-source selection, voltage scaling, battery charging, or DC-to-DC conversion. The PMC 1112 may often be included when the device 1100 is capable of being powered by a battery, for example, when the device is included in a UE. The PMC 1112 may increase the power conversion efficiency while providing desirable implementation size and heat dissipation characteristics. In some embodiments, the PMC 1112 may be part of the battery monitor/charger.

While FIG. 11 shows the PMC 1112 coupled only with the baseband circuitry 1104. However, in other embodiments, the PMC 1112 may be additionally or alternatively coupled with, and perform similar power management operations for, other components such as, but not limited to, application circuitry 1102, RF circuitry 1106, or FEM 1108.

In some embodiments, the PMC 1112 may control, or otherwise be part of, various power saving mechanisms of the device 1100. For example, if the device 1100 is in an RRC Connected state, where it is still connected to the RAN node as it expects to receive traffic shortly, then it may enter a state known as Discontinuous Reception Mode (DRX) after a period of inactivity. During this state, the device 1100 may power down for brief intervals of time and thus save power.

If there is no data traffic activity for an extended period of time, then the device 1100 may transition off to an RRC Idle state, where it disconnects from the network and does not perform operations such as channel quality feedback, handover, etc. The device 1100 goes into a very low power state and it performs paging where again it periodically wakes up to listen to the network and then powers down again. The device 1100 may not receive data in this state, in order to receive data, it must transition back to RRC Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 1102 and processors of the baseband circuitry 1104 may be used to execute elements of one or more instances of a protocol stack. For example, processors of the baseband circuitry 1104, alone or in combination, may be used execute Layer 3, Layer 2, or Layer 1 functionality, while processors of the application circuitry 1104 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

The baseband circuitry 1104 may further include one or more interfaces to communicatively couple to other circuitries/devices, such as a memory interface (e.g., an interface to send/receive data to/from memory external to the baseband circuitry 1104), an application circuitry interface (e.g., an interface to send/receive data to/from the application circuitry 1102 of FIG. 11), an RF circuitry interface (e.g., an interface to send/receive data to/from RF circuitry 1106 of FIG. 11), a wireless hardware connectivity interface (e.g., an interface to send/receive data to/from Near Field Communication (NFC) components, Bluetooth® components (e.g., Bluetooth® Low Energy), Wi-Fi® components, and other communication components), and a power management interface (e.g., an interface to send/receive power or control signals to/from the PMC 1112.

Figure 12:
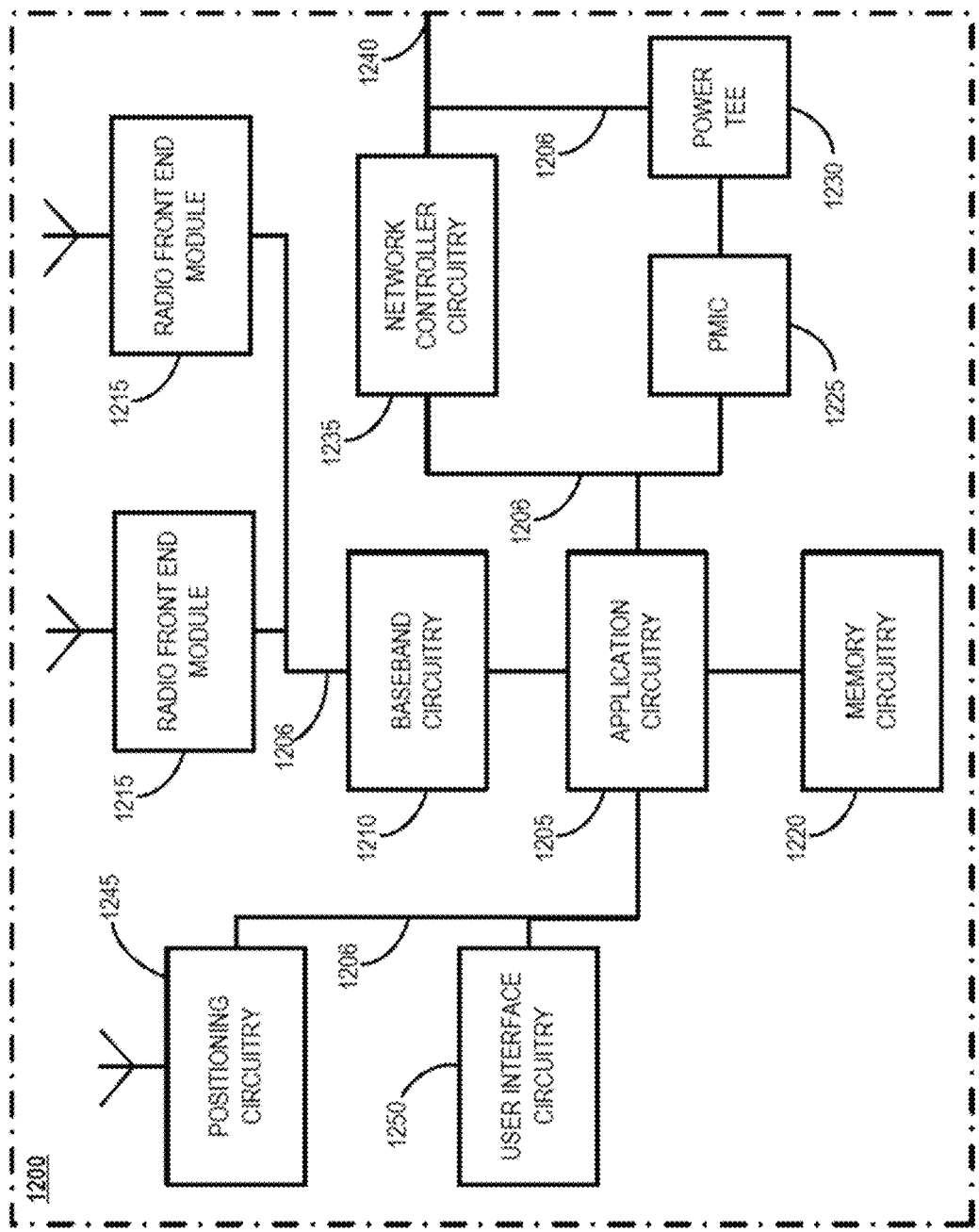
FIG. 12 illustrates an example of an infrastructure equipment, in accordance with various embodiments.

FIG. 12 illustrates an example of an infrastructure equipment, in accordance with various embodiments. The infrastructure equipment 1200 (or "system 1200") may be implemented as a base station, radio head, access network node (e.g., the edge nodes 730 shown and described previously), MEC servers 736, server(s) 750, and/or any other element/device discussed herein. In other examples, the system 1200 could be implemented in or by an intermediate node 720 or endpoint 710.

The system 1200 includes application circuitry 1205, baseband circuitry 1210, one or more radio front end modules (RFEMs) 1215, memory circuitry 1220, power management integrated circuitry (PMIC) 1225, power tee circuitry 1230, network controller circuitry 1235, network interface connector 1240, positioning circuitry 1245, and user interface 1250. In some embodiments, the device 1200 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations.

Application circuitry 1205 includes circuitry such as, but not limited to one or more processors (or processor cores), cache memory, and one or more of low drop-out voltage regulators (LDOs), interrupt controllers, serial interfaces such as SPI, I²C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 1205 may be coupled with or may include memory/storage elements and may be configured to execute instructions stored in the memory/storage to enable various applications or operating systems to run on the system 1200. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 1205 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more DSPs, one or more FPGAs, one or more PLDs, one or more ASICs, one or more microprocessors or controllers, or any suitable combination thereof. In some embodiments, the application circuitry 1205 may comprise, or may be, a special-purpose processor/controller to operate according to the various embodiments herein. As examples, the processor(s) of application circuitry 1205 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the system 1200 may not utilize application circuitry 1205, and instead may include a special-purpose processor/controller to process IP data received from an EPC or 5GC, for example.

In some implementations, the application circuitry 1205 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more field-programmable gate arrays (FPGAs); programmable logic devices (PLDs) such as complex PLDs (CPLDs), high-capacity PLDs (HCPLDs), and the like; ASICs such as structured ASICs and the like; programmable SoCs (PSoCs); and/or the like. In such implementations, the circuitry of application circuitry 1205 may comprise logic blocks or logic fabric, and other interconnected resources that may be programmed to perform various functions, such as the procedures, methods, functions, etc. of the various embodiments discussed herein. In such embodiments, the circuitry of application circuitry 1205 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like.

In some implementations, such as implementations where subsystems of the edge nodes 730, intermediate nodes 720, and/or endpoints 710 of FIG. 7 are individual software agents or AI agents, each agent is implemented in a respective hardware accelerator that are configured with appropriate bit stream(s) or logic blocks to perform their respective functions. In these implementations, processor(s) and/or hardware accelerators of the application circuitry 1205 may be specifically tailored for operating the agents and/or for machine learning functionality, such as a cluster of AI GPUs, tensor processing units (TPUs) developed by Google® Inc., a Real AI Processors (RAPs™) provided by AlphaICs®, Nervana™ Neural Network Processors (NNPs) provided by Intel® Corp., Intel® Movidius™ Myriad™ X Vision Processing Unit (VPU), NVIDIA® PX™ based GPUs, the NM500 chip provided by General Vision®, Hardware 3 provided by Tesla®, Inc., an Epiphany™ based processor provided by Adapteva®, or the like. In some embodiments, the hardware accelerator may be implemented as an AI accelerating coprocessor, such as the Hexagon 685 DSP provided by Qualcomm®, the PowerVR 2NX Neural Net Accelerator (NNA) provided by Imagination Technologies Limited®, the Neural Engine core within the Apple® A11 or A12 Bionic SoC, the Neural Processing Unit within the HiSilicon Kirin 970 provided by Huawei®, and/or the like.

The baseband circuitry 1210 may be implemented, for example, as a solder-down substrate including one or more integrated circuits, a single packaged integrated circuit soldered to a main circuit board or a multi-chip module containing two or more integrated circuits. The baseband circuitry 1210 includes one or more processing devices (e.g., baseband processors) to carry out various protocol and radio control functions. Baseband circuitry 1210 may interface with application circuitry of system 1200 for generation and processing of baseband signals and for controlling operations of the RFEMs 1215. The baseband circuitry 1210 may handle various radio control functions that enable communication with one or more radio networks via the RFEMs 1215. The baseband circuitry 1210 may include circuitry such as, but not limited to, one or more single-core or multi-core processors (e.g., one or more baseband processors) or control logic to process baseband signals received from a receive signal path of the RFEMs 1215, and to generate baseband signals to be provided to the RFEMs 1215 via a transmit signal path. In various embodiments, the baseband circuitry 1210 may implement a real-time OS (RTOS) to manage resources of the baseband circuitry 1210, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein.

Although not shown by FIG. 12, in one embodiment, the baseband circuitry 1210 includes individual processing device(s) to operate one or more wireless communication protocols (e.g., a "multi-protocol baseband processor" or "protocol processing circuitry") and individual processing device(s) to implement physical layer (PHY) functions. In this embodiment, the protocol processing circuitry operates or implements various protocol layers/entities of one or more wireless communication protocols. In a first example, the protocol processing circuitry may operate LTE protocol entities and/or 5G/NR protocol entities when the RFEMs 1215 are cellular radiofrequency communication system, such as millimeter wave (mmWave) communication circuitry or some other suitable cellular communication circuitry. In the first example, the protocol processing circuitry would operate MAC, RLC, PDCP, SDAP, RRC, and NAS functions. In a second example, the protocol processing circuitry may operate one or more IEEE-based protocols when the RFEMs 1215 are WiFi communication system. In the second example, the protocol processing circuitry would operate WiFi MAC and LLC functions. The protocol processing circuitry may include one or more memory structures (not shown) to store program code and data for operating the protocol functions, as well as one or more processing cores (not shown) to execute the program code and perform various operations using the data. The protocol processing circuitry provides control functions for the baseband circuitry 1210 and/or RFEMs 1215. The baseband circuitry 1210 may also support radio communications for more than one wireless protocol.

Continuing with the aforementioned embodiment, the baseband circuitry 1210 includes individual processing device(s) to implement PHY including HARQ functions, scrambling and/or descrambling, (en)coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, radio frequency shifting, and other related functions. etc. The modulation/demodulation functionality may include Fast-Fourier Transform (FFT), pre-coding, or constellation mapping/demapping functionality. The (en)coding/decoding functionality may include convolution, tail-biting convolution, turbo, Viterbi, or Low Density Parity Check (LDPC) coding. Embodiments of modulation/demodulation and encoder/decoder functionality are not limited to these examples and may include other suitable functionality in other embodiments.

User interface circuitry 1250 may include one or more user interfaces designed to enable user interaction with the system 1200 or peripheral component interfaces designed to enable peripheral component interaction with the system 1200. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end modules (RFEMs) 1215 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical RFEM 1215, which incorporates both mmWave antennas and sub-mmWave. The antenna array comprises one or more antenna elements, each of which is configured convert electrical signals into radio waves to travel through the air and to convert received radio waves into electrical signals. For example, digital baseband signals provided by the baseband circuitry 1210 is converted into analog RF signals (e.g., modulated waveform) that will be amplified and transmitted via the antenna elements of the antenna array including one or more antenna elements (not shown). The antenna elements may be omnidirectional, direction, or a combination thereof. The antenna elements may be formed in a multitude of arranges as are known and/or discussed herein. The antenna array may comprise microstrip antennas or printed antennas that are fabricated on the surface of one or more printed circuit boards. The antenna array may be formed in as a patch of metal foil (e.g., a patch antenna) in a variety of shapes, and may be coupled with the RF circuitry using metal transmission lines or the like.

The memory circuitry 1220 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 1220 may be implemented as one or more of solder down packaged integrated circuits, socketed memory modules and plug-in memory cards. The memory circuitry 1220 is configured to store computational logic (or "modules") in the form of software, firmware, or hardware commands to implement the techniques described herein. The computational logic or modules may be developed using a suitable programming language or development tools, such as any programming language or development tool discussed herein. The computational logic may be employed to store working copies and/or permanent copies of programming instructions for the operation of various components of appliance infrastructure equipment 1200, an operating system of infrastructure equipment 1200, one or more applications, and/or for carrying out the embodiments discussed herein. The computational logic may be stored or loaded into memory circuitry 1220 as instructions for execution by the processors of the application circuitry 1205 to provide or perform the functions described herein. The various elements may be implemented by assembler instructions supported by processors of the application circuitry 1205 or high-level languages that may be compiled into such instructions. The permanent copy of the programming instructions may be placed into persistent storage devices of memory circuitry 1220 in the factory during manufacture, or in the field through, for example, a distribution medium (not shown), through a communication interface (e.g., from a distribution server), and/or over-the-air (OTA).

The PMIC 1225 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 1230 may provide for electrical power drawn from a network cable to provide both power supply and data connectivity to the infrastructure equipment 1200 using a single cable.

The network controller circuitry 1235 provides connectivity to a network using a standard network interface protocol such as Ethernet, Ethernet over GRE Tunnels, Ethernet over Multiprotocol Label Switching (MPLS), or some other suitable protocol, such as those discussed herein. Network connectivity may be provided to/from the infrastructure equipment 1200 via network interface connector 1240 using a physical connection, which may be electrical (commonly referred to as a "copper interconnect"), optical, or wireless. The network controller circuitry 1235 may include one or more dedicated processors and/or FPGAs to communicate using one or more of the aforementioned protocols. In some implementations, the network controller circuitry 1235 may include multiple controllers to provide connectivity to other networks using the same or different protocols. In various embodiments, the network controller circuitry 1235 enables communication with associated equipment and/or with a backend system (e.g., server(s) 730 of FIG. 7), which may take place via a suitable gateway device.

The positioning circuitry 1245 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 1245 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 1245 may include a Micro-Technology for Positioning, Navigation, and Timing (Micro-PNT) IC that uses a master timing clock to perform position tracking/estimation without GNSS assistance. The positioning circuitry 1245 may also be part of, or interact with, the baseband circuitry 1210 and/or RFEMs 1215 to communicate with the nodes and components of the positioning network. The positioning circuitry 1245 may also provide position data and/or time data to the application circuitry 1205, which may use the data to synchronize operations with various other infrastructure equipment, or the like.

The components shown by FIG. 12 may communicate with one another using interface circuitry or interconnect (IX), which may include any number of bus and/or interconnect (IX) technologies such as industry standard architecture (ISA), extended ISA (EISA), inter-integrated circuit (I²C), an serial peripheral interface (SPI), point-to-point interfaces, power management bus (PMBus), peripheral component interconnect (PCI), PCI express (PCIe), Intel® Ultra Path Interface (UPI), Intel® Accelerator Link (IAL), Common Application Programming Interface (CAPI), Intel® QuickPath interconnect (QPI), Ultra Path Interconnect (UPI), Intel® Omni-Path Architecture (OPA) IX, RapidIO™ system IXs, Cache Coherent Interconnect for Accelerators (CCIA), Gen-Z Consortium IXs, Open Coherent Accelerator Processor Interface (OpenCAPI) IX, a Hyper-Transport interconnect, and/or any number of other IX technologies. The IX technology may be a proprietary bus, for example, used in an SoC based system.

Figure 13:
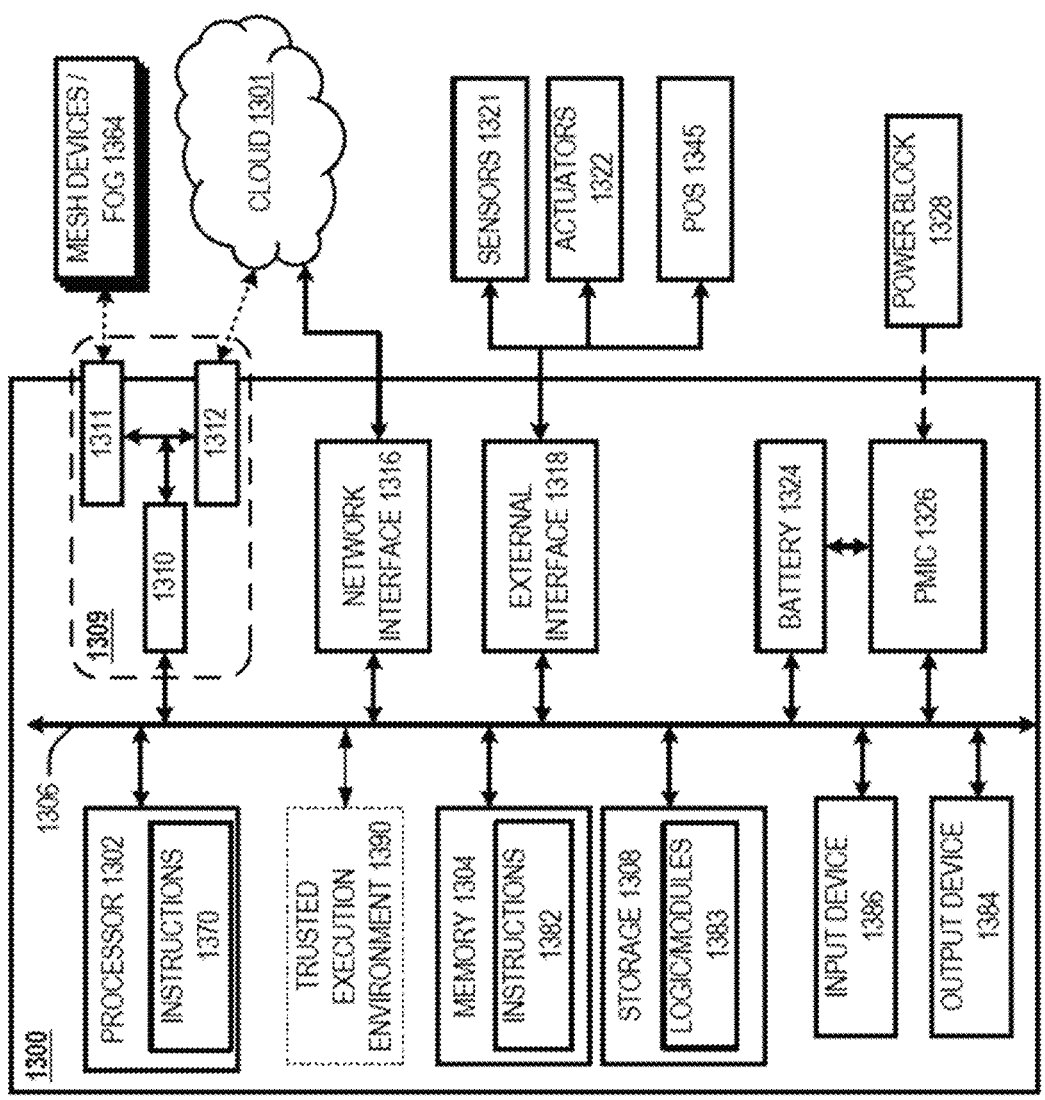
FIG. 13 illustrates example components of a computer platform, in accordance with various embodiments.

FIG. 13 illustrates example components of a computer platform 1300 also referred to as "system 1300," "device 1300," "appliance 1300," or the like), in accordance with various embodiments. In embodiments, the platform 1300 may be suitable for use as intermediate nodes 720 and/or endpoints 710 of FIG. 7, and/or any other element/device discussed herein with regard any other figure shown and described herein. Platform 1300 may also be implemented in or as a server computer system or some other element, device, or system discussed herein. The platform 1300 may include any combinations of the components shown in the example. The components of platform 1300 may be implemented as integrated circuits (ICs), portions thereof, discrete electronic devices, or other modules, logic, hardware, software, firmware, or a combination thereof adapted in the computer platform 1300, or as components otherwise incorporated within a chassis of a larger system. The example of FIG. 13 is intended to show a high level view of components of the computer platform 1300. However, some of the components shown may be omitted, additional components may be present, and different arrangement of the components shown may occur in other implementations.

The platform 1300 includes processor circuitry 1302. The processor circuitry 1302 includes circuitry such as, but not limited to one or more processor cores and one or more of cache memory, low drop-out voltage regulators (LDOs), interrupt controllers, serial interfaces such as serial peripheral interface (SPI), inter-integrated circuit (I²C) or universal programmable serial interface circuit, real time clock (RTC), timer-counters including interval and watchdog timers, general purpose input-output (I/O), memory card controllers such as secure digital/multi-media card (SD/MMC) or similar, universal serial bus (USB) interfaces, mobile industry processor interface (MIPI) interfaces and Joint Test Access Group (JTAG) test access ports. In some implementations, the processor circuitry 1302 may include one or more hardware accelerators, which may be microprocessors, programmable processing devices (e.g., FPGA, ASIC, etc.), or the like. The one or more hardware accelerators may include, for example, computer vision (CV) and/or deep learning (DL) accelerators. In some implementations, the processor circuitry 1302 may include on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of processor circuitry 1302 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more baseband processors, one or more radio-frequency integrated circuits (RFIC), one or more microprocessors or controllers, or any suitable combination thereof. The processors (or cores) of the processor circuitry 1302 may be coupled with or may include memory/storage and may be configured to execute instructions stored in the memory/storage to enable various applications or operating systems to run on the platform 1300. In these embodiments, the processors (or cores) of the processor circuitry 1302 is configured to operate application software to provide a specific service to a user of the platform 1300. In some embodiments, the processor circuitry 1302 may be a special-purpose processor/controller to operate according to the various embodiments herein.

As examples, the processor circuitry 1302 may include an Intel® Architecture Core™ based processor, such as a Quark™, an Atom™, an i3, an i5, an i7, or an MCU-class processor, Pentium® processor(s), Xeon® processor(s), or another such processor available from Intel® Corporation, Santa Clara, California. However, any number other processors may be used, such as one or more of Advanced Micro Devices (AMD) Zen® Core Architecture, such as Ryzen® or EPYC® processor(s), Accelerated Processing Units (APUs), MxGPUs, Epyc® processor(s), or the like; A5-A12 and/or S1-S4 processor(s) from Apple® Inc., Snapdragon™ or Centriq™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; the ThunderX2® provided by Cavium™, Inc.; or the like. In some implementations, the processor circuitry 1302 may be a part of a system on a chip (SoC), System-in-Package (SiP), a multi-chip package (MCP), and/or the like, in which the processor circuitry 1302 and other components are formed into a single integrated circuit, or a single package, such as the Edison™ or Galileo™ SoC boards from Intel® Corporation. Other examples of the processor circuitry 1302 are mentioned elsewhere in the present disclosure.

Additionally or alternatively, processor circuitry 1302 may include circuitry such as, but not limited to, one or more FPDs such as FPGAs and the like; PLDs such as CPLDs, HCPLDs, and the like; ASICs such as structured ASICs and the like; PSoCs; and the like. In such embodiments, the circuitry of processor circuitry 1302 may comprise logic blocks or logic fabric including and other interconnected resources that may be programmed to perform various functions, such as the procedures, methods, functions, etc. of the various embodiments discussed herein. In such embodiments, the circuitry of processor circuitry 1302 may include memory cells (e.g., EPROM, EEPROM, flash memory, static memory (e.g., SRAM, anti-fuses, etc.) used to store logic blocks, logic fabric, data, etc. in LUTs and the like.

The processor circuitry 1302 may communicate with system memory circuitry 1304 over an interconnect 1306 (e.g., a bus). Any number of memory devices may be used to provide for a given amount of system memory. As examples, the memory circuitry 1304 may be random access memory (RAM) in accordance with a Joint Electron Devices Engineering Council (JEDEC) design such as the DDR or mobile DDR standards (e.g., LPDDR, LPDDR2, LPDDR3, or LPDDR4), dynamic RAM (DRAM), and/or synchronous DRAM (SDRAM)). The memory circuitry 1304 may also include nonvolatile memory (NVM) such as high-speed electrically erasable memory (commonly referred to as "flash memory"), phase change RAM (PRAM), resistive memory such as magnetoresistive random access memory (MRAM), etc., and may incorporate three-dimensional (3D) cross-point (XPOINT) memories from Intel® and Micron®. The memory circuitry 1304 may also comprise persistent storage devices, which may be temporal and/or persistent storage of any type, including, but not limited to, non-volatile memory, optical, magnetic, and/or solid state mass storage, and so forth.

The individual memory devices of memory circuitry 1304 may be implemented as one or more of solder down packaged integrated circuits, socketed memory modules, and plug-in memory cards. The memory circuitry 1304 may be implemented as any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs. Memory circuitry 1304. In embodiments, the memory circuitry 1304 may be disposed in or on a same die or package as the processor circuitry 1302 (e.g., a same SoC, a same SiP, or soldered on a same MCP as the processor circuitry 1302).

To provide for persistent storage of information such as data, applications, operating systems (OS), and so forth, a storage circuitry 1308 may also couple to the processor circuitry 1302 via the interconnect 1306. In an example, the storage circuitry 1308 may be implemented via a solid-state disk drive (SSDD). Other devices that may be used for the storage circuitry 1308 include flash memory cards, such as SD cards, microSD cards, xD picture cards, and the like, and USB flash drives. In low power implementations, the storage circuitry 1308 may be on-die memory or registers associated with the processor circuitry 1302. However, in some examples, the storage circuitry 1308 may be implemented using a micro hard disk drive (HDD). Further, any number of new technologies may be used for the storage circuitry 1308 in addition to, or instead of, the technologies described, such resistance change memories, phase change memories, holographic memories, or chemical memories, among others.

The storage circuitry 1308 store computational logic 1383 (or "modules 1383") in the form of software, firmware, or hardware commands to implement the techniques described herein. The computational logic 1383 may be employed to store working copies and/or permanent copies of computer programs, or data to create the computer programs, for the operation of various components of platform 1300 (e.g., drivers, etc.), an operating system of platform 1300, one or more applications, and/or for carrying out the embodiments discussed herein. The computational logic 1383 may be stored or loaded into memory circuitry 1304 as instructions 1382, or data to create the instructions 1382, for execution by the processor circuitry 1302 to provide the functions described herein. The various elements may be implemented by assembler instructions supported by processor circuitry 1302 or high-level languages that may be compiled into such instructions (e.g., instructions 1370, or data to create the instructions 1370). The permanent copy of the programming instructions may be placed into persistent storage devices of storage circuitry 1308 in the factory or in the field through, for example, a distribution medium (not shown), through a communication interface (e.g., from a distribution server (not shown)), or over-the-air (OTA).

In an example, the instructions 1382 provided via the memory circuitry 1304 and/or the storage circuitry 1308 of FIG. 13 are embodied as one or more non-transitory computer readable storage media (see e.g., NTCRSM 1502 of FIG. 15) including program code, a computer program product or data to create the computer program, with the computer program or data, to direct the processor circuitry 1302 of platform 1300 to perform electronic operations in the platform 1300, and/or to perform a specific sequence or flow of actions, for example, as described with respect to the flowchart(s) and block diagram(s) of operations and functionality depicted previously. The processor circuitry 1302 accesses the one or more non-transitory computer readable storage media over the interconnect 1306.

In an example, the instructions 1370 on the processor circuitry 1302 (separately, or in combination with the instructions 1382 and/or logic/modules 1383 stored in computer-readable storage media) may configure execution or operation of a trusted execution environment (TEE) 1390. The TEE 1390 operates as a protected area accessible to the processor circuitry 1302 to enable secure access to data and secure execution of instructions. In some embodiments, the TEE 1390 may be a physical hardware device that is separate from other components of the system 1300 such as a secure-embedded controller, a dedicated SoC, or a tamper-resistant chipset or microcontroller with embedded processing devices and memory devices. In other embodiments, the TEE 1390 may be implemented as secure enclaves, which are isolated regions of code and/or data within the memory of the system 1300. Only code executed within a secure enclave may access data within the same secure enclave, and the secure enclave may only be accessible using the secure application (which may be implemented by an application processor or a tamper-resistant microcontroller). Various implementations of the TEE 1390, and an accompanying secure area in the processor circuitry 1302 or the memory circuitry 1304 and/or storage circuitry 1308 may be provided, for instance, through use of Intel® Software Guard Extensions (SGX) or ARM® TrustZone® hardware security extensions; a Desktop and mobile Architecture Hardware (DASH) compliant Network Interface Card (NIC), Intel® Management/Manageability Engine, Intel® Converged Security Engine (CSE) or a Converged Security Management/Manageability Engine (CSME), Trusted Execution Engine (TXE) provided by Intel® each of which may operate in conjunction with Intel® Active Management Technology (AMT) and/or Intel® vPro™ Technology; AMD® Platform Security coProcessor (PSP), AMD® PRO A-Series Accelerated Processing Unit (APU) with DASH manageability, the IBM® Crypto Express3®, IBM® 4807, 4808, 4809, and/or 4765 Cryptographic Coprocessors, IBM® Baseboard Management Controller (BMC) with Intelligent Platform Management Interface (IPMI), Dell™ Remote Assistant Card II (DRAC II), integrated Dell™ Remote Assistant Card (iDRAC), and the like. Other aspects of security hardening, hardware roots-of-trust, and trusted or protected operations may be implemented in the device 1300 through the TEE 1390 and the processor circuitry 1302.

Although the instructions 1382 are shown as code blocks included in the memory circuitry 1304 and the computational logic 1383 is shown as code blocks in the storage circuitry 1308, it should be understood that any of the code blocks may be replaced with hardwired circuits, for example, built into an FPGA, ASIC, or some other suitable circuitry. For example, where processor circuitry 1302 includes (e.g., FPGA based) hardware accelerators as well as processor cores, the hardware accelerators (e.g., the FPGA cells) may be pre-configured (e.g., with appropriate bit streams) with the aforementioned computational logic to perform some or all of the functions discussed previously (in lieu of employment of programming instructions to be executed by the processor core(s)).

The memory circuitry 1304 and/or storage circuitry 1308 may store program code of an operating system (OS), which may be a general purpose OS or an OS specifically written for and tailored to the computing platform 1300. For example, the OS may be Unix or a Unix-like OS such as Linux e.g., provided by Red Hat Enterprise, Windows 10™ provided by Microsoft Corp.®, macOS provided by Apple Inc.®, or the like. In another example, the OS may be a mobile OS, such as Android® provided by Google iOS® provided by Apple Inc.®, Windows 10 Mobile® provided by Microsoft Corp.®, KaiOS provided by KaiOS Technologies Inc., or the like. In another example, the OS may be a real-time OS (RTOS), such as Apache Mynewt provided by the Apache Software Foundation®, Windows 10 For IoT® provided by Microsoft Corp.®, Micro-Controller Operating Systems ("MicroC/OS" or "μC/OS") provided by Micrium®, Inc., FreeRTOS, VxWorks® provided by Wind River Systems, Inc.®, PikeOS provided by Sysgo AG®, Android Things® provided by Google Inc.®, QNX® RTOS provided by BlackBerry Ltd., or any other suitable RTOS, such as those discussed herein.

The OS may include one or more drivers that operate to control particular devices that are embedded in the platform 1300, attached to the platform 1300, or otherwise communicatively coupled with the platform 1300. The drivers may include individual drivers allowing other components of the platform 1300 to interact or control various input/output (I/O) devices that may be present within, or connected to, the platform 1300. For example, the drivers may include a display driver to control and allow access to a display device, a touchscreen driver to control and allow access to a touchscreen interface of the platform 1300, sensor drivers to obtain sensor readings of sensor circuitry 1321 and control and allow access to sensor circuitry 1321, actuator drivers to obtain actuator positions of the actuators 1322 and/or control and allow access to the actuators 1322, a camera driver to control and allow access to an embedded image capture device, audio drivers to control and allow access to one or more audio devices. The OSs may also include one or more libraries, drivers, APIs, firmware, middleware, software glue, etc., which provide program code and/or software components for one or more applications to obtain and use the data from trusted execution environment (TEE) 1390.

The components may communicate over the interconnect 1306. The interconnect 1306 may include any number of technologies, including industry standard architecture (ISA), extended ISA (EISA), peripheral component interconnect (PCI), peripheral component interconnect extended (PCIx), PCI express (PCIe), or any number of other technologies. The interconnect 1306 may be a proprietary bus, for example, used in a SoC based system. Other bus systems may be included, such as an I²C interface, an SPI interface, point-to-point interfaces, and a power bus, among others.

The interconnect 1306 couples the processor circuitry 1302 to the communication circuitry 1309 for communications with other devices. The communication circuitry 1309 is a hardware element, or collection of hardware elements, used to communicate over one or more networks (e.g., cloud 1301) and/or with other devices (e.g., mesh devices/fog 1364). The communication circuitry 1309 includes baseband circuitry 1310 (or "modem 1310") and radiofrequency (RF) circuitry 1311 and 1312.

The baseband circuitry 1310 includes one or more processing devices (e.g., baseband processors) to carry out various protocol and radio control functions. Baseband circuitry 1310 may interface with application circuitry of platform 1300 (e.g., a combination of processor circuitry 1302, memory circuitry 1304, and/or storage circuitry 1308) for generation and processing of baseband signals and for controlling operations of the RF circuitry 1311 or 1312. The baseband circuitry 1310 may handle various radio control functions that enable communication with one or more radio networks via the RF circuitry 1311 or 1312. The baseband circuitry 1310 may include circuitry such as, but not limited to, one or more single-core or multi-core processors (e.g., one or more baseband processors) or control logic to process baseband signals received from a receive signal path of the RF circuitry 1311 and/or 1312, and to generate baseband signals to be provided to the RF circuitry 1311 or 1312 via a transmit signal path. In various embodiments, the baseband circuitry 1310 may implement a real-time OS (RTOS) to manage resources of the baseband circuitry 1310, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein.

Although not shown by FIG. 13, in one embodiment, the baseband circuitry 1310 includes individual processing device(s) to operate one or more wireless communication protocols (e.g., a "multi-protocol baseband processor" or "protocol processing circuitry") and individual processing device(s) to implement PHY functions. In this embodiment, the protocol processing circuitry operates or implements various protocol layers/entities of one or more wireless communication protocols. In a first example, the protocol processing circuitry may operate LTE protocol entities and/or 5G)/NR protocol entities when the communication circuitry 1309 is a cellular radiofrequency communication system, such as millimeter wave (mmWave) communication circuitry or some other suitable cellular communication circuitry. In the first example, the protocol processing circuitry 1302 would operate MAC, RLC, PDCP, SDAP, RRC, and NAS functions. In a second example, the protocol processing circuitry may operate one or more IEEE-based protocols when the communication circuitry 1309 is WiFi communication system. In the second example, the protocol processing circuitry would operate WiFi MAC and LLC) functions. The protocol processing circuitry may include one or more memory structures (not shown) to store program code and data for operating the protocol functions, as well as one or more processing cores (not shown) to execute the program code and perform various operations using the data. The protocol processing circuitry provides control functions for the baseband circuitry 1310 and/or RF circuitry 1311 and 1312. The baseband circuitry 1310 may also support radio communications for more than one wireless protocol.

Continuing with the aforementioned embodiment, the baseband circuitry 1310 includes individual processing device(s) to implement PHY including HARQ functions, scrambling and/or descrambling, (en)coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, radio frequency shifting, and other related functions. etc. The modulation/demodulation functionality may include Fast-Fourier Transform (FFT), pre-coding, or constellation mapping/demapping functionality. The (en)coding/decoding functionality may include convolution, tail-biting convolution, turbo, Viterbi, or Low Density Parity Check (LDPC) coding. Embodiments of modulation/demodulation and encoder/decoder functionality are not limited to these examples and may include other suitable functionality in other embodiments.

The communication circuitry 1309 also includes RF circuitry 1311 and 1312 to enable communication with wireless networks using modulated electromagnetic radiation through a non-solid medium. Each of the RF circuitry 1311 and 1312 include a receive signal path, which may include circuitry to convert analog RF signals (e.g., an existing or received modulated waveform) into digital baseband signals to be provided to the baseband circuitry 1310. Each of the RF circuitry 1311 and 1312 also include a transmit signal path, which may include circuitry configured to convert digital baseband signals provided by the baseband circuitry 1310 to be converted into analog RF signals (e.g., modulated waveform) that will be amplified and transmitted via an antenna array including one or more antenna elements (not shown). The antenna array may be a plurality of microstrip antennas or printed antennas that are fabricated on the surface of one or more printed circuit boards. The antenna array may be formed in as a patch of metal foil (e.g., a patch antenna) in a variety of shapes, and may be coupled with the RF circuitry 1311 or 1312 using metal transmission lines or the like.

The RF circuitry 1311 (also referred to as a "mesh transceiver") is used for communications with other mesh or fog devices 1364. The mesh transceiver 1311 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of RF circuitry 1311, configured for a particular wireless communication protocol, may be used for the connections to the mesh devices 1364. For example, a WLAN unit may be used to implement WiFi™ communications in accordance with the IEEE 802.11 standard. In addition, wireless wide area communications, for example, according to a cellular or other wireless wide area protocol, may occur via a WWAN unit.

The mesh transceiver 1311 may communicate using multiple standards or radios for communications at different ranges. For example, the platform 1300 may communicate with close/proximate devices, e.g., within about 10 meters, using a local transceiver based on BLE, or another low power radio, to save power. More distant mesh devices 1364, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

The RF circuitry 1312 (also referred to as a "wireless network transceiver," a "cloud transceiver," or the like) may be included to communicate with devices or services in the cloud 1301 via local or wide area network protocols. The wireless network transceiver 1312 includes one or more radios to communicate with devices in the cloud 1301. The cloud 1301 may be the same or similar to cloud 204 discussed previously. The wireless network transceiver 1312 may be a LPWA transceiver that follows the IEEE 802.15.4, or IEEE 802.15.4g standards, among others, such as those discussed herein. The platform 1300 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 1311 and wireless network transceiver 1312, as described herein. For example, the radio transceivers 1311 and 1312 may include an LTE or other cellular transceiver that uses spread spectrum (SPA/SAS) communications for implementing high-speed communications. Further, any number of other protocols may be used, such as WiFi® networks for medium speed communications and provision of network communications.

The transceivers 1311 and 1312 may include radios that are compatible with, and/or may operate according to any one or more of the following radio communication technologies and/or standards including but not limited to those discussed herein.

Network interface circuitry/controller (NIC) 1316 may be included to provide wired communication to the cloud 1301 or to other devices, such as the mesh devices 1364 using a standard network interface protocol. The standard network interface protocol may include Ethernet, Ethernet over GRE Tunnels, Ethernet over Multiprotocol Label Switching (MPLS), Ethernet over USB, or may be based on other types of network protocols, such as Controller Area Network (CAN), Local Interconnect Network (LIN), DeviceNet, ControlNet, Data Highway+, PROFIBUS, or PROFINET, among many others. Network connectivity may be provided to/from the platform 1300 via NIC 1316 using a physical connection, which may be electrical (e.g., a "copper interconnect") or optical. The physical connection also includes suitable input connectors (e.g., ports, receptacles, sockets, etc.) and output connectors (e.g., plugs, pins, etc.). The NIC 1316 may include one or more dedicated processors and/or FPGAs to communicate using one or more of the aforementioned network interface protocols. In some implementations, the NIC 1316 may include multiple controllers to provide connectivity to other networks using the same or different protocols. For example, the platform 1300 may include a first NIC 1316 providing communications to the cloud over Ethernet and a second NIC 1316 providing communications to other devices over another type of network.

The interconnect 1306 may couple the processor circuitry 1302 to an external interface 1318 (also referred to as "I/O interface circuitry" or the like) that is used to connect external devices or subsystems. The external devices include, inter alia, sensor circuitry 1321, actuators 1322, and positioning circuitry 1345. The sensor circuitry 1321 may include devices, modules, or subsystems whose purpose is to detect events or changes in its environment and send the information (sensor data) about the detected events to some other a device, module, subsystem, etc. Examples of such sensors 1321 include, inter alia, inertia measurement units (IMU) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras); light detection and ranging (LiDAR) sensors; proximity sensors (e.g., infrared radiation detector and the like), depth sensors, ambient light sensors, ultrasonic transceivers; microphones; etc.

The external interface 1318 connects the platform 1300 to actuators 1322, allow platform 1300 to change its state, position, and/or orientation, or move or control a mechanism or system. The actuators 1322 comprise electrical and/or mechanical devices for moving or controlling a mechanism or system, and converts energy (e.g., electric current or moving air and/or liquid) into some kind of motion. The actuators 1322 may include one or more electronic (or electrochemical) devices, such as piezoelectric biomorphs, solid state actuators, solid state relays (SSRs), shape-memory alloy-based actuators, electroactive polymer-based actuators, relay driver integrated circuits (ICs), and/or the like. The actuators 1322 may include one or more electromechanical devices such as pneumatic actuators, hydraulic actuators, electromechanical switches including electromechanical relays (EMRs), motors (e.g., DC motors, stepper motors, servomechanisms, etc.), wheels, thrusters, propellers, claws, clamps, hooks, an audible sound generator, and/or other like electromechanical components. The platform 1300 may be configured to operate one or more actuators 1322 based on one or more captured events and/or instructions or control signals received from a service provider and/or various client systems.

The positioning circuitry 1345 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 1345 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 1345 may include a Micro-Technology for Positioning, Navigation, and Timing (Micro-PNT) IC that uses a master timing clock to perform position tracking/estimation without GNSS assistance. The positioning circuitry 1345 may also be part of, or interact with, the communication circuitry 1309 to communicate with the nodes and components of the positioning network. The positioning circuitry 1345 may also provide position data and/or time data to the application circuitry, which may use the data to synchronize operations with various infrastructure (e.g., radio base stations), for turn-by-turn navigation, or the like.

In some examples, various input/output (I/O) devices may be present within, or connected to, the platform 1300, which are referred to as input device circuitry 1386 and output device circuitry 1384 in FIG. 13. The input device circuitry 1386 and output device circuitry 1384 include one or more user interfaces designed to enable user interaction with the platform 1300 and/or peripheral component interfaces designed to enable peripheral component interaction with the platform 1300. Input device circuitry 1386 may include any physical or virtual means for accepting an input including, inter alia, one or more physical or virtual buttons (e.g., a reset button), a physical keyboard, keypad, mouse, touchpad, touchscreen, microphones, scanner, headset, and/or the like.

The output device circuitry 1384 may be included to show information or otherwise convey information, such as sensor readings, actuator position(s), or other like information. Data and/or graphics may be displayed on one or more user interface components of the output device circuitry 1384. Output device circuitry 1384 may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Crystal Displays (LCD), LED displays, quantum dot displays, projectors, etc.), with the output of characters, graphics, multimedia objects, and the like being generated or produced from the operation of the platform 1300. The output device circuitry 1384 may also include speakers or other audio emitting devices, printer(s), and/or the like. In some embodiments, the sensor circuitry 1321 may be used as the input device circuitry 1386 (e.g., an image capture device, motion capture device, or the like) and one or more actuators 1322 may be used as the output device circuitry 1384 (e.g., an actuator to provide haptic feedback or the like). In another example, near-field communication (NFC) circuitry comprising an NFC controller coupled with an antenna element and a processing device may be included to read electronic tags and/or connect with another NFC-enabled device. Peripheral component interfaces may include, but are not limited to, a non-volatile memory port, a universal serial bus (USB) port, an audio jack, a power supply interface, etc.

A battery 1324 may be coupled to the platform 1300 to power the platform 1300, which may be used in embodiments where the platform 1300 is not in a fixed location. The battery 1324 may be a lithium ion battery, a lead-acid automotive battery, or a metal-air battery, such as a zinc-air battery, an aluminum-air battery, a lithium-air battery, a lithium polymer battery, and/or the like. In embodiments where the platform 1300 is mounted in a fixed location, the platform 1300 may have a power supply coupled to an electrical grid. In these embodiments, the platform 1300 may include power tee circuitry to provide for electrical power drawn from a network cable to provide both power supply and data connectivity to the platform 1300 using a single cable.

Power management integrated circuitry (PMIC) 1326 may be included in the platform 1300 to track the state of charge (SoCh) of the battery 1324, and to control charging of the platform 1300. The PMIC 1326 may be used to monitor other parameters of the battery 1324 to provide failure predictions, such as the state of health (SoH) and the state of function (SoF) of the battery 1324. The PMIC 1326 may include voltage regulators, surge protectors, power alarm detection circuitry. The power alarm detection circuitry may detect one or more of brown out (under-voltage) and surge (over-voltage) conditions. The PMIC 1326 may communicate the information on the battery 1324 to the processor circuitry 1302 over the interconnect 1306. The PMIC 1326 may also include an analog-to-digital (ADC) convertor that allows the processor circuitry 1302 to directly monitor the voltage of the battery 1324 or the current flow from the battery 1324. The battery parameters may be used to determine actions that the platform 1300 may perform, such as transmission frequency, mesh network operation, sensing frequency, and the like. As an example, the PMIC 1326 may be a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX.

A power block 1328, or other power supply coupled to a grid, may be coupled with the PMIC 1326 to charge the battery 1324. In some examples, the power block 1328 may be replaced with a wireless power receiver to obtain the power wirelessly, for example, through a loop antenna in the platform 1300. A wireless battery charging circuit, such as an LTC4020 chip from Linear Technologies of Milpitas, California, among others, may be included in the PMIC 1326. The specific charging circuits chosen depend on the size of the battery 1324, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

Furthermore, the present disclosure may take the form of a computer program product or data to create the computer program, with the computer program or data embodied in any tangible or non-transitory medium of expression having the computer-usable program code (or data to create the computer program) embodied in the medium.

Figure 14:
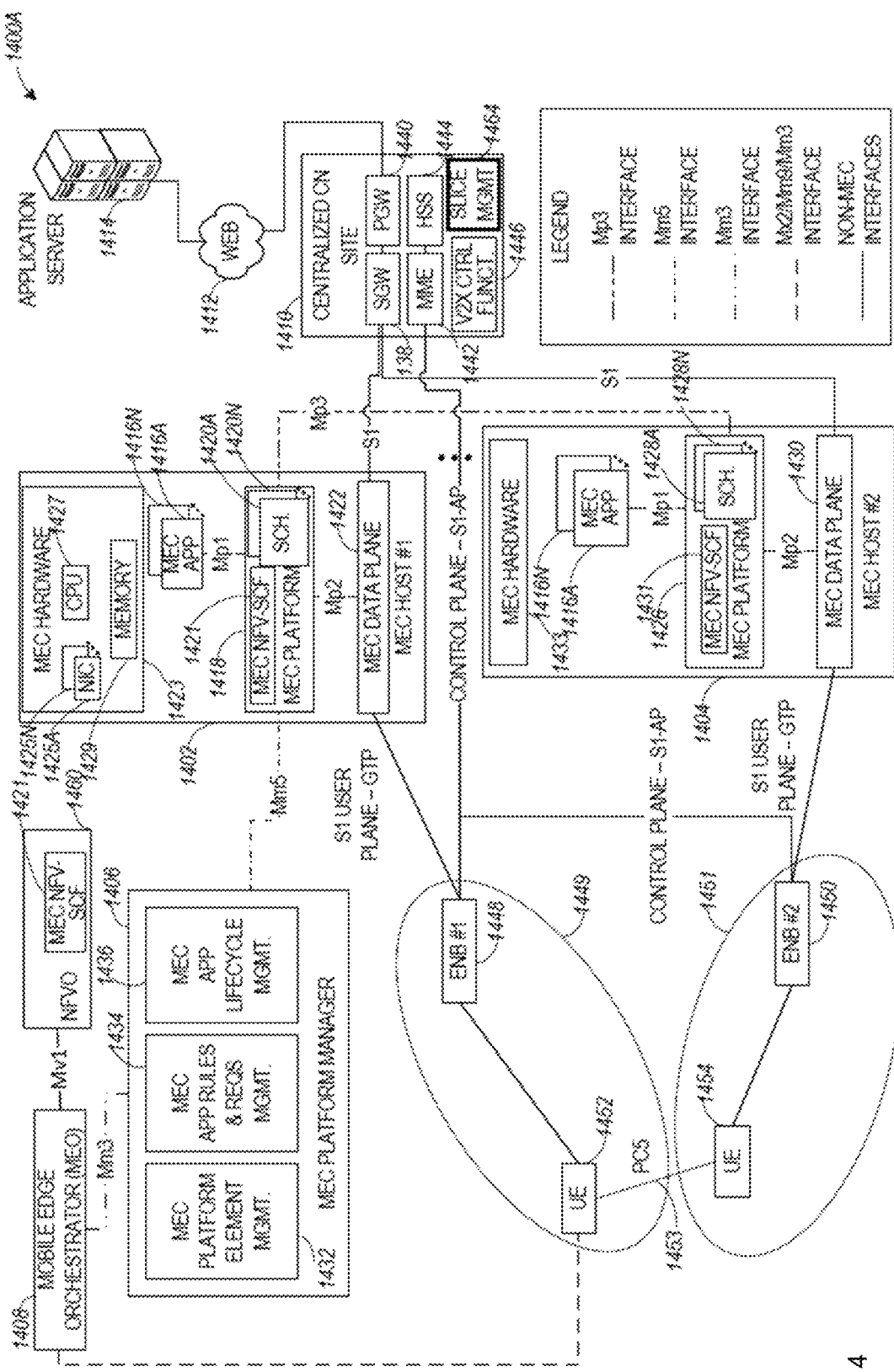
FIG. 14 illustrates a MEC communication infrastructure with a common core network and the MEC infrastructure, in accordance with various embodiments.

FIG. 14 illustrates a MEC communication infrastructure with a common core network and the MEC infrastructure, in accordance with various embodiments. The connections represented by some form of a dashed line (as noted in the legend in FIG. 14) may be defined according to a specification from an ETSI MEC standards family.

The MEC communication infrastructure 1400A can include entities from a MEC-based architecture as well as entities from a third-generation partnership project (3GPP) based architecture. For example, the MEC communication infrastructure 1400A can include a plurality of MEC hosts such as MEC hosts 1402 and 1404, a MEC platform manager 1406, and a MEC orchestrator 1408. The 3GPP based entities can include a centralized core network (CN) 1410 coupled to an application server 1414 via the network 1412 (e.g., the Internet), as well as radio access networks (RANs) represented by base stations 1448 and 1450 coupled to corresponding user equipments (UEs) 1452 and 1454. The base stations 1448 and 1450 can include evolved Node-Bs (eNBs), Next Generation Node-Bs (gNBs), or other types of base stations operating in connection with a 3GPP wireless family of standards or another type of wireless standard.

In some aspects, the MEC communication infrastructure 1400A can be implemented by different network operators in the same country and/or in different countries, using different network traffic types. For example, the radio access network associated with base station 1448 (with a coverage area 1449) can be within a first public land mobile network (PLMN) (i.e., associated with a first mobile services provider or operator and a first network traffic type), and base station 1450 (with a coverage area 1451) can be within a second public land mobile network (PLMN) (i.e., associated with a second mobile services provider or operator and a second network traffic type). As used herein, the terms "mobile services provider" and "mobile services operator" are interchangeable.

In this regard, the MEC communication infrastructure 1400A can be associated with a multi-operator scenario composed by two coverage areas 1449 and 1451 where communication services (e.g., V2X services) can be provided, with each coverage area being operated by a mobile services operator. Additionally, each of the UEs 1452 and 1454 can be configured for network slice operation, where each UE can use one or more types of network slices configured by, e.g., the core network 1410 using the slice management functionality 1464 in coordination with one or more entities of the MEC communication infrastructure 1400A, such as the MEC network function virtualization (NFV) slice control function (SCF) (MEC NFV-SCF) (e.g., 1421 and 1431). Techniques disclosed herein can be used to provide E2E multi-slice support for MEC-enabled 5G deployments using the MEC NFV-SCF. In some aspects, the MEC NFV-SCF 1421 can be within a NFV orchestrator (NFVO) 1460, which can be coupled to the MEC orchestrator 1408.

The solid line connections in FIG. 14 represent non-MEC connections, such as utilizing 3GPP cellular network connections S1, S1-AP, etc. Other connection techniques (e.g., protocols) and connections may also be used. Accordingly, in the scenario of FIG. 1, the system entities (e.g., MEC orchestrator 1408, MEC platform manager 1406, MEC hosts 1402, 1404 are connected by MEC (or NFV) logical links (indicated with dashed lines), in addition to network infrastructure links (e.g., a 5G Long Term Evolution (LTE) network, such as provided among UEs 1452, 1454, eNBs 1448, 1450, a CN site 1410, etc.) (indicated with solid lines). A further connection to cloud services (e.g., an application server 1414 access via the network 1412) may also be connected via backhaul network infrastructure links.

Techniques disclosed herein apply to 2G/3G/4G/LTE/ LTE-A (LTE Advanced) and 5G networks, with the examples and aspects disclosed using 4G/LTE networks. In aspects, the CN 1410 may be an evolved packet core (EPC) network, a NextGen Packet Core (NPC) network (e.g., a 5G network), or some other type of CN (e.g., as illustrated in reference to FIGS. 2A-3E). In EPC (Evolved Packet Core), which is associated with 4G/LTE, the CN 1410 can include a serving gateway (S-GW or SGW) 1438, a packet data network (PDN) gateway (P-GW or PGW) 1440, a mobility management entity (MME) 1442, and a home subscriber server (HSS) 1444 coupled to a V2X control function 1446. In 5G, the Core Network is referred to as the NextGen Packet Network (NPC). In NPC (and as illustrated in FIGS. 3A-3D), the S/P-GW is replaced with a user plane function (UPF), and the MME is replaced with two individual functional components, the Access Management Function (AMF) and the Session Management Function (SMF). The 4G HSS is split into different entities in 5G: the Authentication Server Function (AUSF) and the Universal Data Management (UDM), with the subscription data being managed via the Universal Data Management (UDM) function. In EPC, the S1 interface can be split into two parts: the S1-U (user plane) interface which carries traffic data between the eNBs 1448, 1450 and the S-GW 1438 via the MEC hosts 1402, 1404, and the S1-AP (control plane) interface which is a signaling interface between the eNBs 1448, 1450 and the MME 1442.

The MME 1442 may be similar in function to the control plane of legacy Serving General Packet Radio Service (GPRS) Support Nodes (SGSN). The MME 1442 may manage mobility aspects in access such as gateway selection and tracking area list management. The HSS 1444 may comprise a database for network users, including subscription-related information to support the network entities' handling of communication sessions, including subscription information associated with V2X communications. The CN 1410 may comprise one or several HSSs 1444, depending on the number of mobile subscribers, on the capacity of the equipment, on the organization of the network, etc. For example, the HSS 144 can provide support for routing/ roaming, authentication, authorization (e.g., V2X communication authorization), naming/addressing resolution, location dependencies, etc.

The S-GW 1438 may terminate the S1 interface towards the RANs of eNBs 1448, 1450, and route data packets between the RANs and the CN 1410. In addition, the S-GW 1438 may be a local mobility anchor point for inter-RAN node handovers and also may provide an anchor for inter-3GPP mobility. Other responsibilities may include charging and some policy enforcement.

The P-GW 1440 may terminate an SGi interface toward a PDN. The P-GW 1440 may route data packets between the RANs and external networks such as a network including the application server (AS) 1414 (alternatively referred to as application function (AF)) via an Internet Protocol (IP) interface (e.g., an interface to the network 1412 coupled to the AS 1414. The P-GW 1440 can also communicate data to other external networks, which can include the Internet, IP multimedia subsystem (IPS) network, and other networks. Generally, the application server 1414 may be an element offering applications that use IP bearer resources with the core network (e.g., UMTS Packet Services (PS) domain, LTE PS data services, etc.). The application server 1414 can also be configured to support one or more communication services (e.g., Voice-over-Internet Protocol (VoIP) sessions, PTT sessions, group communication sessions, social networking services, etc.) for the UEs 1452, 1454 via the CN 1410 and one or more of the MEC hosts 1402, 1404.

The P-GW 1440 may further include a node for policy enforcement and charging data collection. A Policy and Charging Enforcement Function (PCRF) (not illustrated in FIG. 1) can be the policy and charging control element of the CN 1410. In a non-roaming scenario, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF may be communicatively coupled to the application server 1414 via the P-GW 1440. The application server 1414 may signal the PCRF to indicate a new service flow and select the appropriate Quality of Service (QoS) and charging parameters.

The V2X control function 1446 is used in connection with authorizing UEs to use V2X services based on HSS information (e.g., subscription information managed by the HSS 1444), assist one or more UEs in obtaining the network address of an application server (e.g., 1414) or a V2X application server, as well as providing V2X configuration parameters for direct communication (i.e., device-to-device communications). The interface for direct device-to-device communication is referred to as PC5. The PC5 parameters may be provided by the V2X control function 1446 to one or more UEs for purposes of configuring V2X communication between the UEs.

The slice management function 1464 can be used for configuring one or more network slices (e.g., 5G slices) for use by UEs or other devices within the communication architecture 1400A, where the slice configuration may be with the assistance of the MEC NFV-SCF (e.g., 1421 and 1431) as discussed herein.

The MEC hosts 1402, . . . , 1404 can be configured in accordance with the ETSI GS MEC-003 specification. The MEC host 1402 can include a MEC platform 1418, which can be coupled to one or more MEC applications (apps) such as MEC apps 1416A, . . . , 1416N (collectively, MEC app 1416) and to MEC data plane 1422. The MEC host 104 can include a MEC platform 1426, which can be coupled to a MEC app 1416 and MEC data plane 1430. The MEC platform manager 1406 can include a MEC platform element management module 1432, MEC application rules and requirements management module 1434, and MEC application lifecycle management module 1436. The MEC host 1402 also includes MEC hardware 1423, such as network interfaces (e.g. network interface cards or NICs) 1425A, . . . , 1425N, one or more CPUs 1427, and memory 1429.

In some aspects, the MEC apps 1416A, . . . , 1416N can each provide an NFV instance configured to process network connections associated with a specific network traffic type (e.g., 2G, 3G, 4G, 5G or another network traffic type). In this regard, the terms "MEC app" and "NFV" (or "MEC NFV") are used interchangeably. Additionally, the term "NFV" and "NFV instance" are used interchangeably. The MEC platform 1418 can further include one or more schedulers 1420A, . . . , 1420N (collectively, a scheduler 1420). Each of the schedulers 1420A, . . . , 1420N may comprise suitable circuitry, logic, interfaces, and/or code and is configured to manage instantiation of NFVs 1416A, . . . , 1416N (collectively, an NFV 1416). More specifically, a scheduler 1420 can select a CPU (e.g., one of the CPUs 1427) and/or other network resources for executing/instantiating the NFV 1416. Additionally, since each of the NFVs 1416A, . . . , 1416N is associated with processing a different network traffic type, the scheduler 1420 can further select a NIC (e.g., from the available NICs 1425A, . . . , 1425N) for use by the NFV 1416. Each of the schedulers 1420A, . . . , 1420N can have a different type of SLA and QoS requirements, based on the network traffic type handled by the associated NFV. For example, each traffic type (e.g., 2G, 3G, 4G, 5G, or any other type of wireless connection to the MEC host) has an associated class of service (CloS) (e.g., 2G_low, 2G_mid, 2G_high, etc.) which can be preconfigured in the MEC host, defining CloS-specific resource requirements (i.e., I/O, memory, processing power, etc.) for different loads of that particular traffic type.

FIG. 14 further illustrates MEC host 1404 including MEC hardware 1433, MEC QoS manager 1431, and schedulers 1428A, . . . , 1428N, which can have the same functionality as MEC hardware 1423, MEC NFV-SCF module 1421, and schedulers 1420A, . . . , 1420N described in connection with MEC host 1402. Even though MEC NFV-SCF module 1421 is illustrated as being implemented within the MEC platform 1418, the present disclosure is not limited in this regard and one or more components of the MEC NFV-SCF module 1421 can be implemented within other modules of the MEC host 1402 (such as the MEC data plane 1422), a network function virtualization infrastructure, a network function virtualization orchestrator, the MEC orchestrator 1408, the MEC platform manager 1406, or another entity within the architecture 1400A.

In some aspects, the MEC architecture 1400A (or any of the MEC architectures discussed herein) can be configured to provide functionalities in accordance with the ETSI GS MEC-003 specification and/or the ETSI GR MEC-017 specification.

Figure 15A:
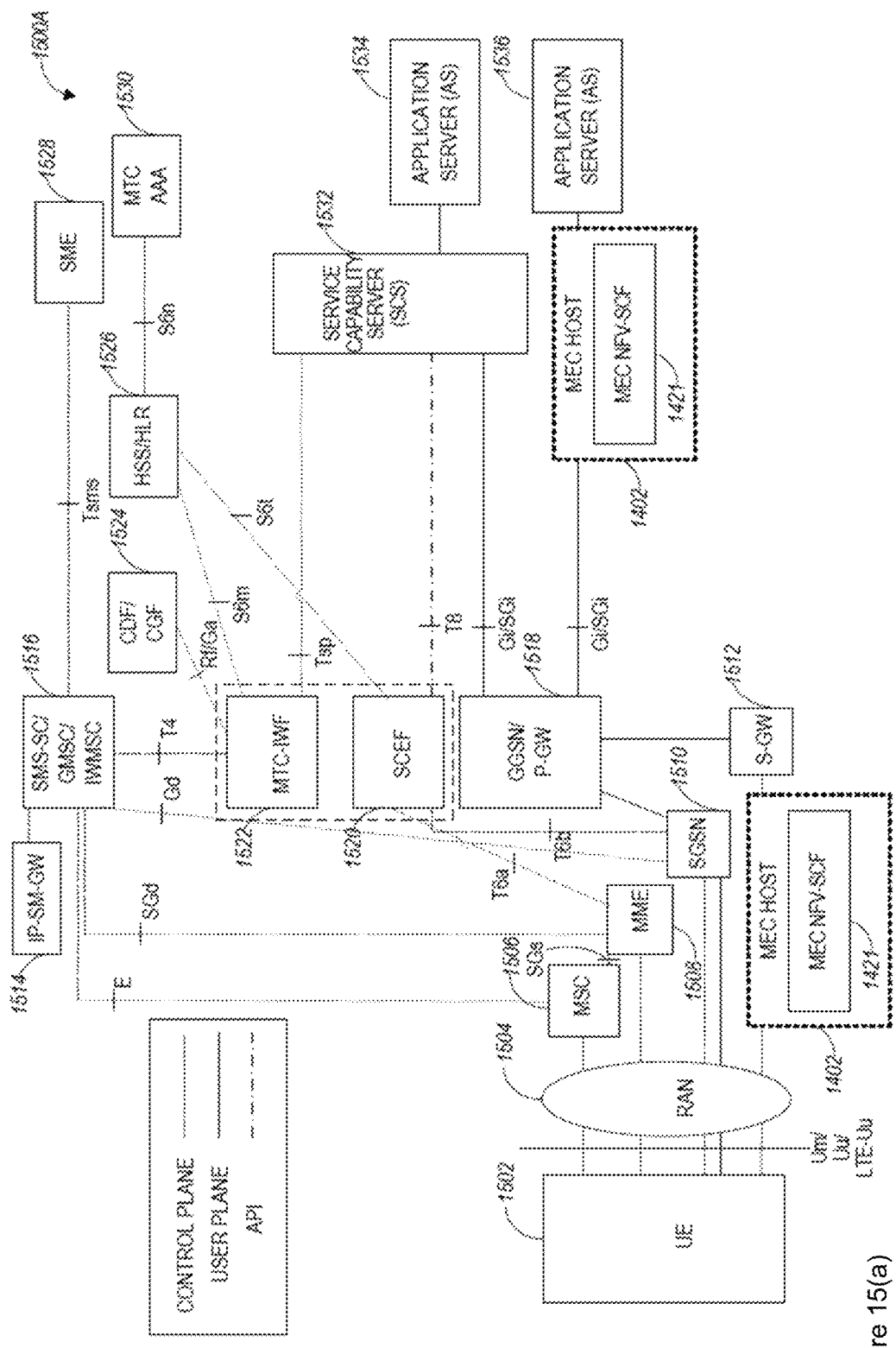
FIG. 15(a)-15(b) illustrate an example Cellular Internet-of-Things (CIoT) network architecture, in accordance with various embodiments.
Figure 15B:
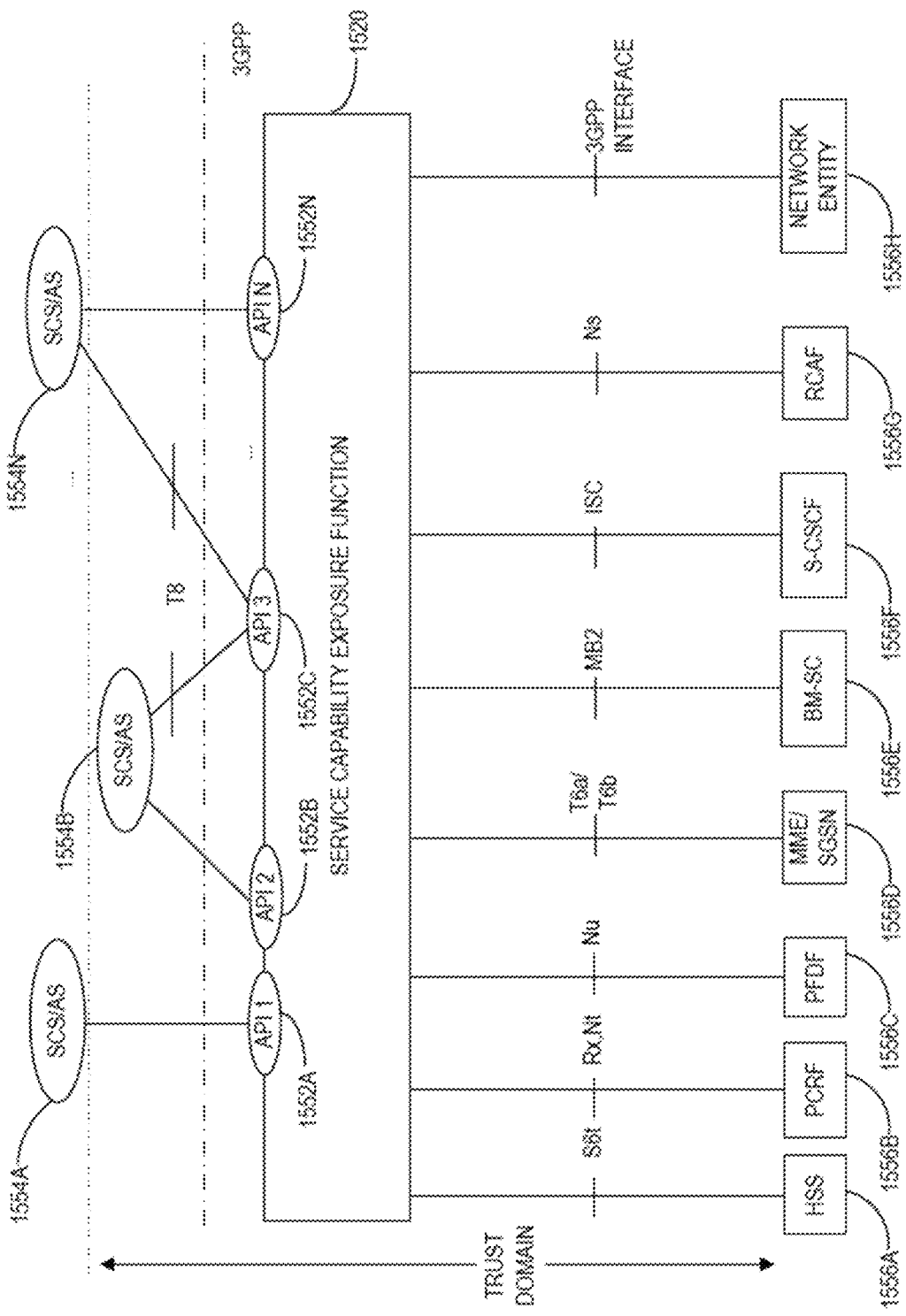

FIG. 15(a)-15(b) illustrate an example Cellular Internet-of-Things (CIoT) network architecture, in accordance with various embodiments.

FIG. 15(a) illustrates an example Cellular Internet-of-Things (CIoT) network architecture with a MEC host using a MEC QoS manager, according to an example. Referring to FIG. 15(a), the CIoT architecture 1500A can include the UE 1502 and the RAN 1504 coupled to a plurality of core network entities. In some aspects, the UE 1502 can be a machine-type communication (MTC) UE. The CIoT network architecture 1500A can further include a mobile services switching center (MSC) 1506, MME 1508, a serving GPRS support node (SGSN) 1510, a S-GW 1512, an IP-Short-Message-Gateway (IP-SM-GW) 1514, a Short Message Service-Service Center (SMS-SC)/gateway mobile service center (GMSC)/Interworking MSC (IWMSC) 1516, MTC interworking function (MTC-IWF) 1522, a Service Capability Exposure Function (SCEF) 1520, a gateway GPRS support node (GGSN)/Packet-GW (P-GW) 1518, a charging data function (CDF)/charging gateway function (CGF) 1524, a home subscriber server (HSS)/a home location register (HLR) 1526, short message entities (SME) 1528, MTC authorization, authentication, and accounting (MTC AAA) server 1530, a service capability server (SCS) 1532, and application servers (AS) 1534 and 1536. In some aspects, the SCEF 1520 can be configured to securely expose services and capabilities provided by various 3GPP network interfaces. The SCEF 1520 can also provide means for the discovery of the exposed services and capabilities, as well as access to network capabilities through various network application programming interfaces (e.g., API interfaces to the SCS 1532).

FIG. 15(a) further illustrates various reference points between different servers, functions, or communication nodes of the CIoT network architecture 1500A. Some example reference points related to MTC-IWF 1522 and SCEF 1520 include the following: Tsms (a reference point used by an entity outside the 3GPP network to communicate with UEs used for MTC via SMS), Tsp (a reference point used by a SCS to communicate with the MTC-IWF related control plane signaling), T4 (a reference point used between MTC-IWF 1522 and the SMS-SC 1516 in the HPLMN), T6a (a reference point used between SCEF 1520 and serving MME 1508), T6b (a reference point used between SCEF 1520 and serving SGSN 1510), T8 (a reference point used between the SCEF 1520 and the SCS/AS 1534, 1536), S6m (a reference point used by MTC-IWF 1522 to interrogate HSS/HLR 1526), S6n (a reference point used by MTC-AAA server 1530 to interrogate HSS/HLR 1526), and S6t (a reference point used between SCEF 1520 and HSS/HLR 1526).

In some aspects, the UE 1502 can be configured to communicate with one or more entities within the CIoT architecture 1500A via the RAN 1504 (e.g., CIoT RAN) according to a Non-Access Stratum (NAS) protocol, and using one or more radio access configuration, such as a narrowband air interface, for example, based on one or more communication technologies, such as Orthogonal Frequency-Division Multiplexing (OFDM) technology. As used herein, the term "CIoT UE" refers to a UE capable of CIoT optimizations, as part of a CIoT communications architecture. In some aspects, the NAS protocol can support a set of NAS messages for communication between the UE 1502 and an Evolved Packet System (EPS) Mobile Management Entity (MME) 1508 and SGSN 1510. In some aspects, the CIoT network architecture 1500A can include a packet data network, an operator network, or a cloud service network, having, for example, among other things, servers such as the Service Capability Server (SCS) 1532, the AS 1534, or one or more other external servers or network components.

The RAN 1504 can be coupled to the HSS/HLR servers 1526 and the AAA servers 1530 using one or more reference points including, for example, an air interface based on an S6a reference point, and configured to authenticate/authorize CIoT UE 1502 to access the CIoT network. The RAN 1504 can be coupled to the CIoT network architecture 1500A using one or more other reference points including, for example, an air interface corresponding to an SGi/Gi interface for 3GPP accesses. The RAN 1504 can be coupled to the SCEF 1520 using, for example, an air interface based on a T6a/T6b reference point, for service capability exposure. In some aspects, the SCEF 1520 may act as an API GW towards a third-party application server such as server 1534. The SCEF 1520 can be coupled to the HSS/HLR 1526 and MTC AAA 1530 servers using an S6t reference point and can further expose an Application Programming Interface to network capabilities.

In certain examples, one or more of the CIoT devices disclosed herein, such as the UE 1502, the RAN 1504, etc., can include one or more other non-CIoT devices, or non-CIoT devices acting as CIoT devices, or having functions of a CIoT device. For example, the UE 1502 can include a smartphone, a tablet computer, or one or more other electronic device acting as a CIoT device for a specific function, while having other additional functionality. In some aspects, the RAN 1504 can include a CIoT enhanced Node B (CIoT eNB) communicatively coupled to a CIoT Access Network Gateway (CIoT GW). In certain examples, the RAN 1504 can include multiple base stations (e.g., CIoT eNBs or other types of base stations) connected to the CIoT GW, which can include MSC 1506, MME 1508, SGSN 1510, or S-GW 1512. In certain examples, the internal architecture of RAN 1504 and the CIoT GW may be left to the implementation and need not be standardized.

In some aspects, the CIoT architecture 1500A can include one or more MEC hosts that can provide a communication link between different components of the CIoT architecture. For example, MEC host 1402 can be coupled between the RAN 1504 and the S-GW 1512. In this case, the MEC host 1402 can use one or more NFV instances to process wireless connections with the RAN 1504 and the S-GW 1512. The MEC host 1402 can also be coupled between the P-GW 1518 and the application server 1536. In this case, the MEC host 1402 can use the one or more NFV instances to process wireless connections originating from or terminating at the P-GW 1518 and the application server 1536. In some aspects, the MEC host 1402 includes a MEC NFV-SCF module 1421, which is configured according to techniques disclosed herein to provide multi-slice support for MEC-enabled 5G deployments.

FIG. 15(b) illustrates an example Service Capability Exposure Function (SCEF) used by the CIoT network architecture of FIG. 15(a), according to an example. Referring to FIG. 15(b), the SCEF 1520 can be configured to expose services and capabilities provided by 3GPP network interfaces to external third-party service provider servers hosting various applications. In some aspects, a 3GPP network such as the CIoT architecture 1500A, can expose the following services and capabilities: a home subscriber server (HSS) 1556A, a policy and charging rules function (PCRF) 1556B, a packet flow description function (PFDF) 1556C, a MME/SGSN 1556D, a broadcast multicast service center (BM-SC) 1556E, a serving call server control function (S-CSCF) 1556F, a RAN congestion awareness function (RCAF) 1556G, and one or more other network entities 1556H. The above-mentioned services and capabilities of a 3GPP network can communicate with the SCEF 220 via one or more interfaces as illustrated in FIG. 15(b). The SCEF 220 can be configured to expose the 3GPP network services and capabilities to one or more applications running on one or more service capability server (SCS)/application server (AS), such as SCS/AS 1554A, 1554B, ..., 1554N. Each of the SCS/AS 1554A-1554N can communicate with the SCEF 220 via application programming interfaces (APIs) 1552A, 1552B, 1552C, ..., 1552N, as seen in FIG. 15(b).

Figure 16:
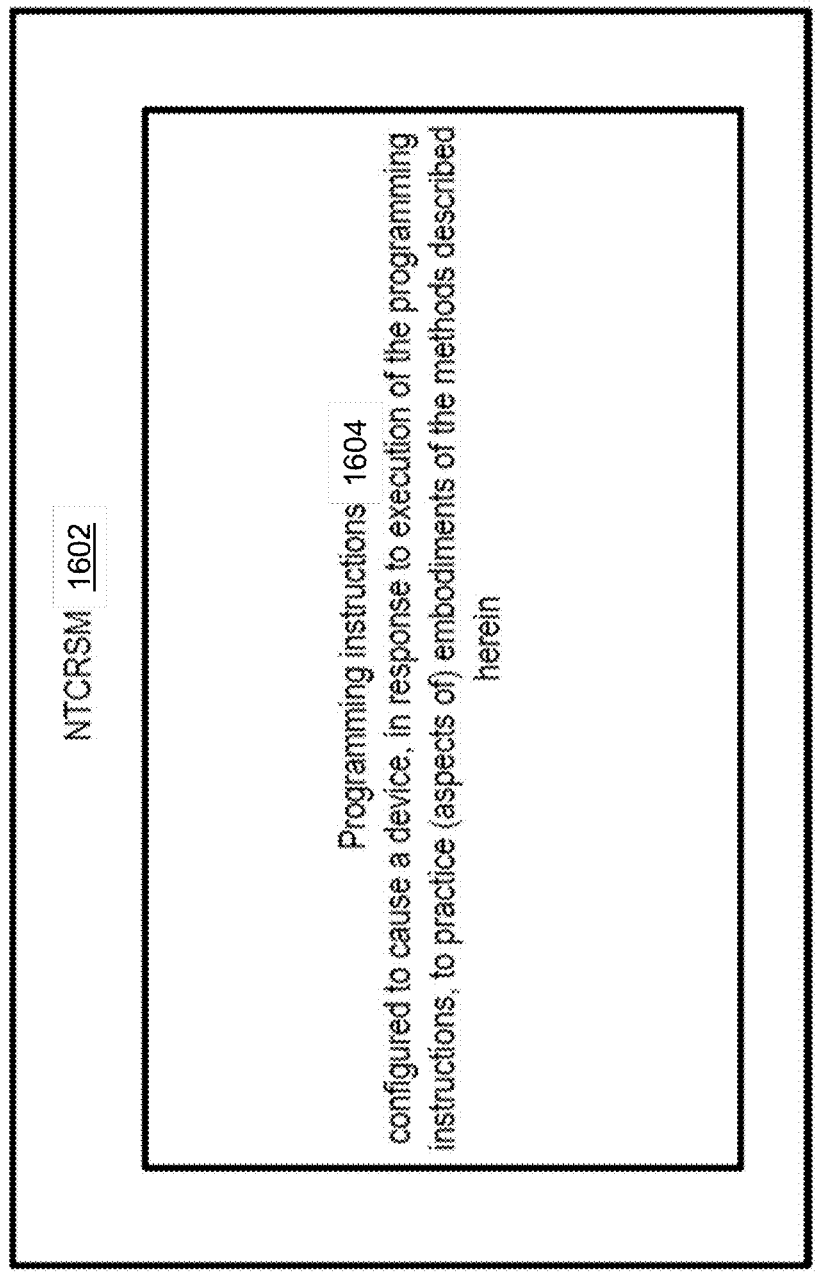
FIG. 16 illustrates an example non-transitory computer-readable storage media, in accordance with various embodiments.

FIG. 16 illustrates an example non-transitory computer-readable storage media (NTCRSM) that may be suitable for use to store instructions (or data that creates the instructions) that cause an apparatus (such as any of the devices/components/systems shown and described herein), in response to execution of the instructions by the apparatus, to practice selected aspects of the present disclosure. As shown, NTCRSM 1602 may include a number of programming instructions 1604 (or data to create the programming instructions). Programming instructions 1604 may be configured to enable a device (e.g., any of the devices/components/systems described herein), in response to execution of the programming instructions, to perform various programming operations associated with operating system functions, one or more applications, and/or aspects of the present disclosure. In some embodiments, the programming instructions 1604 (or data to create the programming instructions) to be executed may be in a pre-configured form that may require configuration instructions to install or provision the programming instructions 1604 to an apparatus (such as any of the devices/components/systems described herein). When installed/provisioned, configured and executed, the programming instructions 1604 can complete or perform various programming operations associated with operating system functions, one or more applications, and/or aspects of the present disclosure.

In alternate embodiments, programming instructions 1604 (or data to create the instructions) may be disposed on multiple NTCRSM 1602. In alternate embodiments, programming instructions 1604 (or data to create the instructions) may be disposed on computer-readable transitory storage media, such as, signals. The instructions embodied by a machine-readable medium may further be transmitted or received over a communications network using a transmission medium via a network interface device utilizing any one of a number of transfer protocols (e.g., HTTP). For example, the programming instructions 1604 (or data to create the instructions) may be network deployment software having a pre-deployment version of the instructions stored in one or more NTCRSM 1602. Any combination of one or more computer usable or computer readable medium(s) may be utilized. The computer-usable or computer-readable medium may be, for example but not limited to, one or more electronic, magnetic, optical, electromagnetic, infrared, or semiconductor systems, apparatuses, devices, or propagation media. For instance, the NTCRSM 1602 may be embodied by devices described for the storage circuitry 1308 and/or memory circuitry 1304 described with regard to FIG. 13. More specific examples (a non-exhaustive list) of a computer-readable medium would include the following: an electrical connection having one or more wires, a portable computer diskette, a hard disk, a random access memory (RAM), a read-only memory (ROM), an erasable programmable read-only memory (EPROM, Flash memory, etc.), an optical fiber, a portable compact disc read-only memory (CD-ROM), an optical storage device and/or optical disks, a transmission media such as those supporting the Internet or an intranet, a magnetic storage device, or any number of other hardware devices. Note that the computer-usable or computer-readable medium could even be paper or another suitable medium upon which the program (or data to create the program) is printed, as the program (or data to create the program) can be electronically captured, via, for instance, optical scanning of the paper or other medium, then compiled, interpreted, or otherwise processed in a suitable manner, if necessary, and then stored in a computer memory (with or without having been staged in or more intermediate storage media). In the context of this document, a computer-usable or computer-readable medium may be any medium that can contain, store, communicate, propagate, or transport the program (or data to create the program) for use by or in connection with the instruction execution system, apparatus, or device. The computer-usable medium may include a propagated data signal with the computer-usable program code (or data to create the program code) embodied therewith, either in baseband or as part of a carrier wave. The computer usable program code (or data to create the program) may be transmitted using any appropriate medium, including but not limited to wireless, wireline, optical fiber cable, RF, etc.

In various embodiments, the program code (or data to create the program code) described herein may be stored in one or more of a compressed format, an encrypted format, a fragmented format, a packaged format, etc. Program code (or data to create the program code) as described herein may require one or more of installation, modification, adaptation, updating, combining, supplementing, configuring, decryption, decompression, unpacking, distribution, reassignment, etc. in order to make them directly readable and/or executable by a computing device and/or other machine. For example, the program code (or data to create the program code) may be stored in multiple parts, which are individually compressed, encrypted, and stored on separate computing devices, wherein the parts when decrypted, decompressed, and combined form a set of executable instructions that implement the program code (the data to create the program code such as that described herein. In another example, the Program code (or data to create the program code) may be stored in a state in which they may be read by a computer, but require addition of a library (e.g., a dynamic link library), a software development kit (SDK), an application programming interface (API), etc. in order to execute the instructions on a particular computing device or other device. In another example, the program code (or data to create the program code) may need to be configured (e.g., settings stored, data input, network addresses recorded, etc.) before the program code (or data to create the program code) can be executed/used in whole or in part. In this example, the program code (or data to create the program code) may be unpacked, configured for proper execution, and stored in a first location with the configuration instructions located in a second location distinct from the first location. The configuration instructions can be initiated by an action, trigger, or instruction that is not co-located in storage or execution location with the instructions enabling the disclosed techniques. Accordingly, the disclosed program code (or data to create the program code) are intended to encompass such machine readable instructions and/or program(s) (or data to create such machine readable instruction and/or programs) regardless of the particular format or state of the machine readable instructions and/or program(s) when stored or otherwise at rest or in transit.

Computer program code for carrying out operations of the present disclosure (e.g., computational logic 1383, instructions 1382, 1370 discussed previously with regard to FIG. 13) may be written in any combination of one or more programming languages, including an object oriented programming language such as Python, Ruby, Scala, Smalltalk, Java™, C++, C#, or the like; a procedural programming languages, such as the "C" programming language, the Go (or "Golang") programming language, or the like; a scripting language such as JavaScript, Server-Side JavaScript (SSJS), JQuery, PHP, Pearl, Python, Ruby on Rails, Accelerated Mobile Pages Script (AMPscript), Mustache Template Language, Handlebars Template Language, Guide Template Language (GTL), PHP, Java and/or Java Server Pages (JSP), Node.js, ASP.NET, and/or the like; a markup language such as Hypertext Markup Language (HTML), Extensible Markup Language (XML), Java Script Object Notion (JSON), Apex®, Cascading Stylesheets (CSS), JavaServer Pages (JSP), MessagePack™, Apache® Thrift, Abstract Syntax Notation One (ASN.1), Google® Protocol Buffers (protobuf), or the like; some other suitable programming languages including proprietary programming languages and/or development tools, or any other languages tools. The computer program code for carrying out operations of the present disclosure may also be written in any combination of the programming languages discussed herein. The program code may execute entirely on the system 1300, partly on the system 1300, as a stand-alone software package, partly on the system 1300 and partly on a remote computer or entirely on the remote computer or server (e.g., system 1200). In the latter scenario, the remote computer may be connected to the system 1300 through any type of network, including a LAN or WAN, or the connection may be made to an external computer (e.g., through the Internet using an Internet Service Provider).

Illustrative examples of the devices, systems, and methods disclosed herein are provided below. An embodiment of the devices, systems, and methods may include any one or more, and any combination of, the examples described below.

Example 1 may include one or more computer-readable medium (CRM) having instructions stored therein to cause an apparatus, in response to execution of the instructions by one or more processors of the apparatus, to: receive a request for service that includes a workload from a user agent; and in response to receipt of the request, facilitate formation of a service level agreement (SLA) for servicing the workload; wherein to facilitate includes to: obtain, via a decentralized contracting system, bids from a plurality of service providers to respectively service a plurality of functions or tasks of the workload; relay the bids to the user agent; receive one or more selections of the bids from the user agent; and propose to the user agent, the SLA for respectively servicing the functions or tasks of the workload with one or more of the plurality of bidding service providers, based at least in part on the one or more selections of the bids by the user agent, for acceptance by the user agent.

Example 2 may include the one or more computer-readable medium of example 1 and/or some other examples herein, wherein to facilitate further includes to: receive an acceptance of the proposed SLA from the user agent.

Example 3 may include the one or more computer-readable medium of example 1 and/or some other examples herein, wherein to propose the SLA includes to propose the SLA with description of the workload, resources to perform the workload, performance parameters for the workload, quality of service (QoS) for the workload, cost for performing the workload, payment for performing the workload, or contract terms determined by the decentralized contracting system.

Example 4 may include the one or more computer-readable medium of example 3 and/or some other examples herein, wherein the description of the workload includes a list of functions of the workload, resource requirements for the workload, or data dependencies between inputs and outputs for the workload; the resources to perform the workload include computing resources, communication resources, acceleration resources, memory, or storage; the performance parameters for the workload include amount of memory space used, amount of computing resources in terms of core areas or number of accelerators, amount of input/output bandwidth, or amount of latency; the cost includes financial cost or latency used in performing the workload; and the contract terms include relationship among the workload, the resources to perform the workload, the performance parameters for the workload, the quality of service (QoS) for the workload, the cost for performing the workload, or the payment for performing the workload.

Example 5 may include the one or more computer-readable medium of example 3 and/or some other examples herein, wherein to obtain bids includes to obtain bids with each bid having at least performance indicators for a function or a task of the workload, and a price to perform the function or task of the workload.

Example 6 may include the one or more computer-readable medium of example 3 and/or some other examples herein, wherein to obtain bids includes to obtain bids with each bid having contract terms determined by the decentralized contracting system.

Example 7 may include the one or more computer-readable medium of example 1 and/or some other examples herein, comprising further instructions therein to cause the apparatus, in response to execution of the further instructions by one or more processors of the apparatus, further to validate that the SLA has been fulfilled based on telemetry and statistics data collected for the plurality of service providers to respectively service the plurality of functions or tasks of the workload.

Example 8 may include the one or more computer-readable medium of example 1 and/or some other examples herein, comprising further instructions therein to cause the apparatus, in response to execution of the further instructions by one or more processors of the apparatus further to calculate a reputation statistics for the plurality of service providers based on their servicing the plurality of functions or tasks of the workload.

Example 9 may include the one or more computer-readable medium of example 1 and/or some other examples herein, wherein to obtain bids from via a decentralized contracting system includes to obtain bids via a blockchain contract system.

Example 10 may include an apparatus for multi-access edge computing (MEC), comprising: a communication interface to interface with a user agent and a plurality of service providers including a plurality of edge computing devices, wherein to interface with the user agent includes to receive, from the user agent, a request for service that includes a workload, and to receive a service level agreement (SLA) or an acceptance of a SLA for distributive servicing of the workload by one or more of the plurality of service providers including one or more of the plurality of edge computing devices; one or more computer processors coupled to the communication interface; and a service allocation module operated by the one or more computer processors to: translate the workload into a set of functions or tasks; and schedule servicing of the functions or tasks with the one or more service providers, including the one or more edge computing devices, in accordance with the SLA.

Example 11 may include the apparatus of example 10 and/or some other examples herein, wherein the service allocation module is to further: create an execution plan to manage the one or more service providers for servicing the functions or tasks of the workload.

Example 12 may include the apparatus of example 11 and/or some other examples herein, further comprising: an execution management module operated by the one or more computer processors to, based on the execution plan, manage the one or more service providers for servicing the functions or tasks of the workload.

Example 13 may include the apparatus of example 12 and/or some other examples herein, wherein the execution plan includes a security plan, and the execution management module is to manage the one or more service providers for servicing the functions or tasks of the workload accord to the security plan.

Example 14 may include the apparatus of example 12 and/or some other examples herein, wherein the execution management module is to record at least data related to the one or more service providers for servicing the functions or tasks of the workload.

Example 15 may include the apparatus of example 12 and/or some other examples herein, further comprising: a telemetry module to collect telemetry and statistics data produced one or more service providers for servicing the functions or tasks of the workload, to be used for validating the SLA has been fulfilled.

Example 16 may include the apparatus of example 10 and/or some other examples herein, wherein to receive an SLA or an acceptance of the SLA comprises to receive an acceptance of the SLA subsequent to the receipt of the request, the SLA being proposed to the user agent in response to the receipt of the request after the translation of the workload into the functions or tasks, and to schedule being performed in response to the receipt of the acceptance of the SLA.

Example 17 may include the apparatus of example 10 and/or some other examples herein, wherein the edge computing devices comprises one or more of a WiFi® or cellular network access point, or an edge server dispose at an edge of a network.

Example 18 may include an apparatus for multi-access edge computing (MEC), comprising: one or more computer processors; and a service provision manager operated by the one or more processors to: manage a set of workers disposed at edges of a network, wherein a worker of the set of workers is equipped to service at least a function or a task of a workload of a user agent of a multi-access edge computing service, the function or task being among a set of functions or tasks of the workload included in a service level agreement (SLA) formed for the user agent via a decentralized contracting system; register the workers with the decentralized contracting system, wherein each registration includes capabilities of the corresponding worker; and submit one or more bids to service the function or task of the workload, wherein a bid of the one or more bids for the function or task of the workload includes service performance indicators and service price.

Example 19 may include the apparatus of example 18 and/or some other examples herein, wherein the SLA includes description of the workload, resources to perform the workload, performance parameters for the workload, quality of service (QoS) for the workload, cost for performing the workload, payment for performing the workload, or contract terms determined by the decentralized contracting system.

Example 20 may include the apparatus of example 18 and/or some other examples herein, wherein the service provision manager is to manage the set of workers to perform the function or task of the workload according to an execution plan determined by an orchestrator orchestrated the formation of the SLA.

Example 21 may include the apparatus of example 20 and/or some other examples herein, wherein execution plan includes a security plan, and the service provision manager is to manage the set of workers to perform the function or task of the workload according to the security plan.

Example 22 may include the apparatus of example 18 and/or some other examples herein, wherein the service provision manger is further operated to collect telemetry and statistics data produced by the set of workers servicing the function or task of the workload.

Example 23 may include a system for multi-access edge computing (MEC), comprising: a contract module, wherein the contract module is arranged to: receive a request from a MEC orchestrator for a function to be performed, wherein the function is among a set of functions of a workload included in a service level agreement (SLA) from a user agent, and the orchestrator is to decompose the workload into the set of functions based on the SLA; and receive one or more bids for the function by one or more service providers for one or more workers managed by the one or more service providers to perform the function.

Example 24 may include the system of example 23 and/or some other examples herein, wherein the contract module is to receive a registration from the one or more service providers for the one or more workers managed by the one or more service providers, and wherein the registration includes an indication of a capability of a worker of the one or more workers to provide the function.

Example 25 may include the system of example 24 and/or some other examples herein, wherein the contract module is further to: forward the one or more bids for the function to the orchestrator, wherein the orchestrator or the user agent is to select a service provider and a worker managed by the selected service provider to perform the function based on the one or more bids.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

What is claimed is:

1. A system for edge computing orchestration, comprising:
    a communication interface to receive, from a user agent, a request for a service that corresponds to a workload;
    one or more computer processors coupled to the communication interface, wherein the one or more computer processors are to:
    translate the workload into a set of functions,
    identify a set of worker nodes capable of performing the set of functions,
    receive a set of bids to satisfy the workload, wherein each bid of the set of bids includes a set of key performance indicators (KPIs) and a service price to satisfy the workload,
    select, according to terms of a smart contract, an individual bid from among the set of bids based on a set of KPIs and a service price included in the individual bid,
    create a service level agreement (SLA) based on capabilities of the identified set of worker nodes to execute respective functions of the set of functions to provide a quality of service for distributed servicing of the workload and on the set of KPIs and the service price included in the individual bid, and
    cause scheduling of the distributed servicing of the set of functions by the identified set of worker nodes in accordance with the SLA.

2. The system of claim 1, wherein the capabilities of each worker node of the set of worker nodes is registered on a blockchain, and wherein the one or more computer processors are to:
    identify the set of worker nodes based on the capabilities registered on the blockchain.

3. The system of claim 1, wherein the one or more computer processors are to:
    translate the workload into the set of functions and an execution plan to manage the distributed servicing of the workload by the set of worker nodes; and
    manage, based on the execution plan, the set of worker nodes for servicing the set of functions.

4. The system of claim 3, wherein the execution plan includes a security plan, and the one or more computer processors are to:
    manage a set of service providers for servicing the set of functions according to the security plan.

5. The system of claim 4, wherein the one or more computer processors are to:
    record at least data related to the set of service providers for servicing the set of functions.

6. The system of claim 3, wherein the one or more computer processors are to:
    collect telemetry and statistics data produced by the set of worker nodes based on execution of the set of functions; and
    validate that the SLA has been fulfilled based on the collected telemetry and statistics data.

7. The system of claim 1, wherein the one or more computer processors are to:
    send the SLA to the user agent;
    receive, from the user agent, an acceptance of the SLA; and
    trigger the scheduling in response to the acceptance of the SLA.

8. The system of claim 1, wherein the set of worker nodes includes one or more of one or more edge compute nodes and one or more network access nodes.

9. A cloud computing service, comprising:
    a set of cloud compute nodes to:
    register a set of workers with a decentralized contracting system, wherein each registration includes capabilities of a corresponding worker of the set of workers; and
    submit a bid to satisfy a workload, wherein the bid includes a set of key performance indicators (KPIs) and a service price to satisfy the workload, wherein the set of KPIs are used by an orchestrator to create a service level agreement (SLA), for execution, by the set of workers, of a set of functions to provide a quality of service to satisfy the workload;
    when the bid is accepted according to terms of a smart contract, receive a set of functions corresponding to the workload; and
    manage the set of workers to perform the set of functions according to the SLA.

10. The cloud computing service of claim 9, wherein the SLA includes one or more of a description of the workload, resources to perform the workload, performance parameters for the workload, a quality of service (QoS) for the workload, a cost for performing the workload, payment for performing the workload, and contract terms determined by the decentralized contracting system.

11. The cloud computing service of claim 9, wherein the set of cloud compute nodes is to manage the set of workers to perform the set of functions according to an execution plan determined by an orchestrator that created the SLA.

12. The cloud computing service of claim 11, wherein execution plan includes a security plan, and the set of cloud compute nodes is to manage the set of workers to perform the set of functions according to the security plan.

13. The cloud computing service of claim 9, wherein the set of cloud compute nodes is to collect telemetry and statistics data produced by the set of workers based on execution of the set of functions.

14. One or more non-transitory computer-readable media (NTCRM) comprising instructions for providing edge computing orchestration, wherein execution of the instructions by one or more processors is to cause a compute node to:
    translate the workload into a set of functions,
        identify a set of worker nodes capable of performing the set of functions,
        receive a set of bids to satisfy the workload, each bid of the set of bids including a set of key performance indicators (KPIs) and a service price to satisfy the workload;
        select, according to terms of a smart contract, an individual bid from the set of bids based on the set of KPIs and the service price included in each bid;
    create a service level agreement (SLA) based on capabilities of the identified set of workers to execute respective functions of the set of functions to provide a quality of service for distributed servicing of the workload and the set of KPIs and the service price in the selected bid, and
    cause scheduling of the distributed servicing of the set of functions by the identified set of worker nodes in accordance with the SLA.

15. The one or more NTCRM of claim 14, wherein each worker node of the set of worker nodes has their capabilities registered on a blockchain, and execution of the instructions is to cause the compute node to:
    identify the set of worker nodes based on the capabilities registered on the blockchain.

16. The one or more NTCRM of claim 14, wherein execution of the instructions causes the compute node to:
    send the SLA to the user agent;
    receive, from the user agent, an acceptance of the SLA; and
    trigger the scheduling in response to the acceptance of the SLA.

17. The one or more NTCRM of claim 14, wherein execution of the instructions is to cause the compute node to:
    collect telemetry and statistics data produced by the set of worker nodes for executing the set of functions; and
    validate that the SLA has been fulfilled based on the collected telemetry and statistics data.

18. The one or more NTCRM of claim 17, wherein the telemetry and statistics data contains an amount of time and an amount resources utilized to accomplish individual tasks of respective functions of the set of functions, and execution of the instructions is to cause the compute node to:
    record the collected telemetry and statistics data as respective records in a blockchain.

19. The one or more NTCRM of claim 14, wherein the set of worker nodes include one or more of a set of edge compute nodes and a set of network access nodes.

* * * * *

UNITED STATES PATENT AND TRADEMARK OFFICE
CERTIFICATE OF CORRECTION

| | |
|---|---|
| PATENT NO. | : 11,924,060 B2 |
| APPLICATION NO. | : 16/570153 |
| DATED | : March 5, 2024 |
| INVENTOR(S) | : Ned M. Smith et al. |

It is certified that error appears in the above-identified patent and that said Letters Patent is hereby corrected as shown below:

In the Claims

Column 63
Line 59 "....and on the set..." should read --....and the set...--

Column 64
Lines 64-65 "....wherein execution plan..." should read --....where the execution plan...--

Column 65
Lines 8-9 "node to: translate" should read --node to: receive, from a user agent, a request for a service that corresponds to a workload; translate--
Line 9 "...functions," should read --...functions;--
Line 11 "...functions," should read --...functions;--
Line 12 "...workload, each..." should read --...workload, wherein each...--
Line 13 "...bids including..." should read --...bids includes...--
Line 17 "...bid from the..." should read --...bid from among the...--
Line 18 "...in each bid;" should read --...in the individual bid;--
Line 20 "...set of workers to..." should read --...set of worker nodes to...--
Line 23 "...price in" should read --...price included in--
Line 24 "the selected bid, and" should read --the individual bid; and--

Column 66
Line 6 "...instructions causes the..." should read --...instructions is to cause the...--

Signed and Sealed this
Thirteenth Day of August, 2024

Katherine Kelly Vidal
*Director of the United States Patent and Trademark Office*